United States Patent
Ding et al.

(10) Patent No.: US 12,501,254 B2
(45) Date of Patent: Dec. 16, 2025

(54) COMPUTING WORKLOAD MANAGEMENT IN NEXT GENERATION CELLULAR NETWORKS

(71) Applicant: Intel Corporation, Santa Clara, CA (US)

(72) Inventors: Zongrui Ding, Portland, OR (US); Qian Li, Beaverton, OR (US); Puneet Jain, Portland, OR (US); Sudeep Palat, Gloucestershire (GB); Alexandre Saso Stojanovski, Paris (FR); Ching-Yu Liao, Portland, OR (US); Abhijeet Kolekar, Portland, OR (US); Thomas Luetzenkirchen, Taufkirchen BY (DE); Sangeetha L. Bangolae, Portland, OR (US); Youn Hyoung Heo, San Jose, CA (US); Xiaopeng Tong, Beijing (CN); Geng Wu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 18/007,898

(22) PCT Filed: Jul. 23, 2021

(86) PCT No.: PCT/US2021/043057
§ 371 (c)(1),
(2) Date: Dec. 2, 2022

(87) PCT Pub. No.: WO2022/020770
PCT Pub. Date: Jan. 27, 2022

(65) Prior Publication Data
US 2023/0308853 A1  Sep. 28, 2023

Related U.S. Application Data

(60) Provisional application No. 63/067,241, filed on Aug. 18, 2020, provisional application No. 63/056,406, filed on Jul. 24, 2020.

(51) Int. Cl.
*H04W 8/18* (2009.01)

(52) U.S. Cl.
CPC .................................. *H04W 8/18* (2013.01)

(58) Field of Classification Search
CPC ...................................................... H04W 8/18
(Continued)

(56) References Cited

U.S. PATENT DOCUMENTS

| 10,652,809 B2 * | 5/2020 | Xu ...................... H04W 12/088 |
| 2020/0167196 A1 | 5/2020 | Smith et al. |
| 2020/0195521 A1 | 6/2020 | Bogineni et al. |

FOREIGN PATENT DOCUMENTS

| WO | WO 2017-220158 A1 | 12/2017 | |
| WO | WO 2020-009630 A1 | 1/2020 | |
| WO | WO-2020041368 A1 * | 2/2020 | ......... H04L 12/4645 |

OTHER PUBLICATIONS

International Search Report and Written Opinion mailed Nov. 28, 2021 for International Patent Application No. PCT/US2021/043057, 9 pages.

(Continued)

*Primary Examiner* — Ahmad F. Matar
*Assistant Examiner* — Jirapon Tulop
(74) *Attorney, Agent, or Firm* — Schwegman Lundberg & Woessner, P.A.

(57) ABSTRACT

Various embodiments generally may relate to the field of wireless communications. For example, some embodiments may relate to enabling augmented computing as a service or network capability for sixth-generation (6G) networks. For example, some embodiments may be directed to the operation of a compute control client (Comp CC) at the UE side, and a compute control function (Comp CF) and compute service function (Comp SF) at the network side, which are (Continued)

referred to herein as "compute plane" functions to handle computing related control and user traffic.

21 Claims, 28 Drawing Sheets

(58) Field of Classification Search
USPC .......................................................... 455/418
See application file for complete search history.

(56) References Cited

OTHER PUBLICATIONS

3GPP, "3rd Generation Partnership Project; Technical Specification Group Services and System Aspects; System architecture for the 5G System (5GS); Stage 2 (Release 15)", 3GPP TS 23.501 V15.10.0 (Jul. 2020), 249 pages.
3GPP, "3rd Generation Partnership Project; Technical Specification Group Services and System Aspects; Study on Enhancements to the Service-Based Architecture (Release 16)", 3GPP TR 23.742 V16.0.0 (Dec. 2018), 131 pages.
3GPP, "3rd Generation Partnership Project; Technical Specification Group Radio Access Network; NG-RAN; Architecture description (Release 15)", 3GPP TS 38.401 V15.8.0 (Jul. 2020), 47 pages.

\* cited by examiner

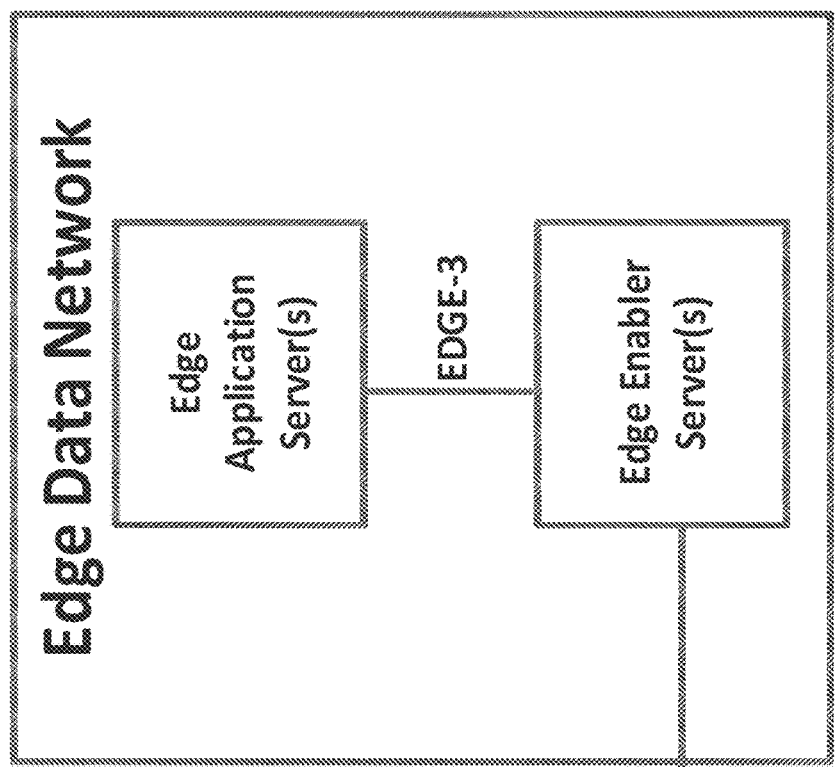
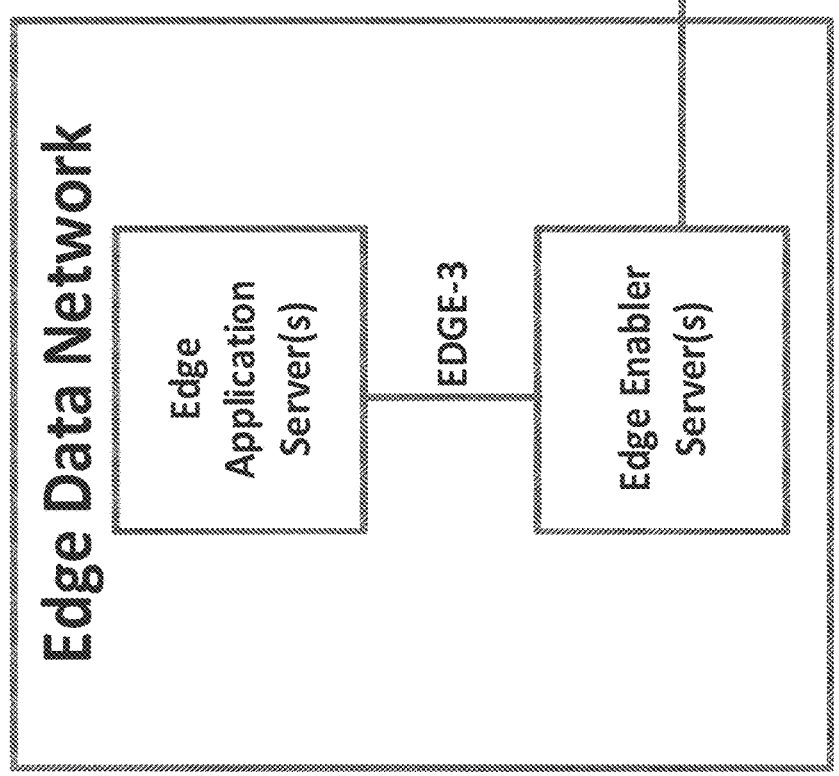
Figure 20

2500 encoding a radio resource control (RRC) message for transmission to a next-generation NodeB (gNB) that includes an RRC radio access network (RAN) compute setup request including UE compute-specific identification (ID) information and an encapsulated message to be transported onto an interface between a RAN computing control function (Comp CF) and a central unit control plane (CU-CP)
2505 receiving, from the RAN Comp CF, a RAN compute session establishment response
2510

Figure 25

COMPUTING WORKLOAD MANAGEMENT IN NEXT GENERATION CELLULAR NETWORKS

CROSS REFERENCE TO RELATED APPLICATIONS

The present application is a national phase entry under 35 U.S.C. § 371 of International Application No. PCT/US2021/043057, filed 23 Jul. 2021, entitled "COMPUTING WORKLOAD MANAGEMENT IN NEXT GENERATION CELLULAR NETWORKS", which claims priority to U.S. Provisional Patent Application No. 63/056,406, which was filed 24 Jul. 2020; and U.S. Provisional Patent Application No. 63/067,241, which was filed 18 Aug. 2020. The applications are hereby incorporated by reference in their entireties for all purposes, except for those sections, if any, that are inconsistent with this application.

FIELD

Various embodiments generally may relate to the field of wireless communications. For example, some embodiments may relate to enabling augmented computing as a service or network capability for sixth-generation (6G) networks. For example, some embodiments may be directed to the operation of a compute control client (Comp CC) at the UE side, and a compute control function (Comp CF) and compute service function (Comp SF) at the network side, which are referred to herein as "compute plane" functions to handle computing related control and user traffic.

BACKGROUND

Modern cloud computing has become extremely popular to provide computing/storage capability to customers who can focus more on the SW development and data management without worrying too much about the underlying infrastructure. Edge computing is believed to extend this capability close to the customers to optimize performance metrics such as latency. The 5G architecture design took these scenarios into consideration and developed multihoming, ULCL framework to offload compute tasks to different data networks (DNs), which may be at the network edge. For the UE with limited computing capabilities, the application can be rendered at the cloud/edge for computing offloading based on application level logic above OS.

With the trend of Telco network cloudification, the cellular network is foreseen to be built with flexibility and scalability by virtualized network functions (VNFs) or containerized network functions (CNFs) running on general purpose hardware. Heterogenous computing capabilities provided by hardware and software, naturally coming with this trend, can be leveraged to provide augmented computing to end devices across device and network. These computing tasks generally have different requirements in resource and dependencies in different scenarios. For example, it can be an application instance either standalone or serving one or more UEs. It can also be a generic function like AI training or inference or a micro-service function using specific accelerators. In addition, the computing task can be semi-static or dynamically launched. To enable these scenarios, this disclosure proposes solutions to enable augmented computing across the device and RAN in order to dynamically offload workload and execute compute tasks at the network computing infrastructure with low latency and better computing scaling. Among other things, embodiments of the present disclosure are directed to RAN Compute transport options over a user plane to address transport of augmented computing and dynamic workload migration in the cellular network.

BRIEF DESCRIPTION OF THE FIGURES

FIG. 20 illustrates an example of an EDGE-9 reference point being provided between EES within different EDNs in accordance with various embodiments.

FIG. 25 depicts another example procedure for practicing the various embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

In some embodiments, to enable augmented computing as a service or network capability in 6G networks, compute control client (Comp CC) at the UE side, compute control function (Comp CF) and compute service function (Comp SF) at the network side are collectively referred to herein as "compute plane" functions to handle computing related control and user traffic.

The compute task generated at the UE/Comp CC needs to be transported to the RAN Comp SF. Embodiments of the present disclosure are directed to transporting this task for RAN-based computation offloading such as over user plane, control plane and in a dynamic connectionless way along with initial RAN compute session establishment procedure.

There are a variety of advantages of providing computing either as a new service or as a network capability based on different scenarios. First, the computing tasks can be completed at the network edge to optimize latency. This latency includes communication latency as well as the compute task launch and execution latency. Second, the end device can augment the computing by providing compute service requirements, e.g. the computing environment and the compute task. Third, the resource efficiency and latency can also be optimized using paradigms like server-less computing to handle more dynamic workload.

Figure 1:
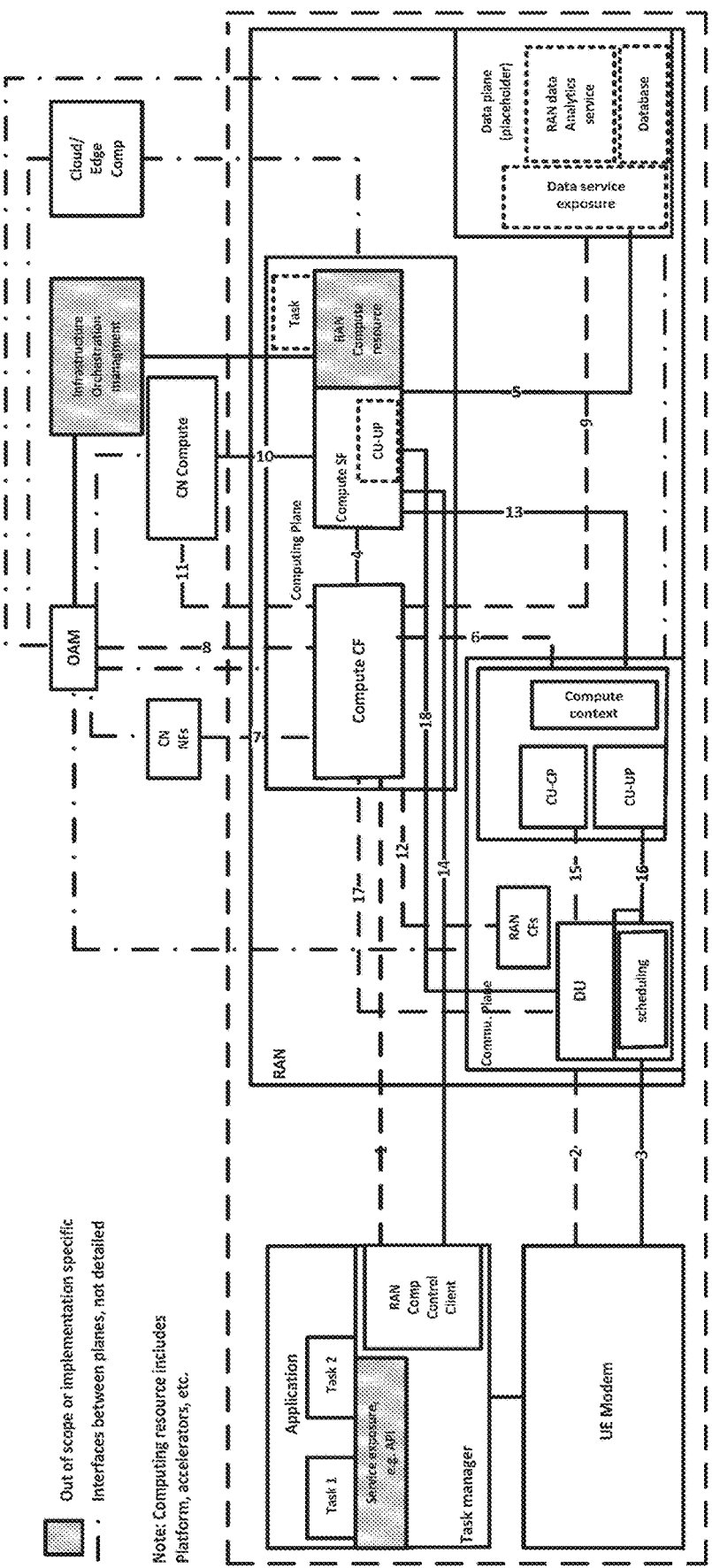
FIG. 1 illustrates an example of a detailed RAN Architecture with computing functions in accordance with various embodiments.

An example of a detailed RAN Architecture with Computing Functions is shown in FIG. 1. As shown in FIG. 1, the overall architecture of RAN is inside the black box and may include a communication plane, computing plane and data plane. The functions proposed to enable network computing are RAN computing control client (Comp CC) at the UE side, the RAN computing control function (Comp CF) and the RAN computing service function (Comp SF) at the network side.

Figure 2:
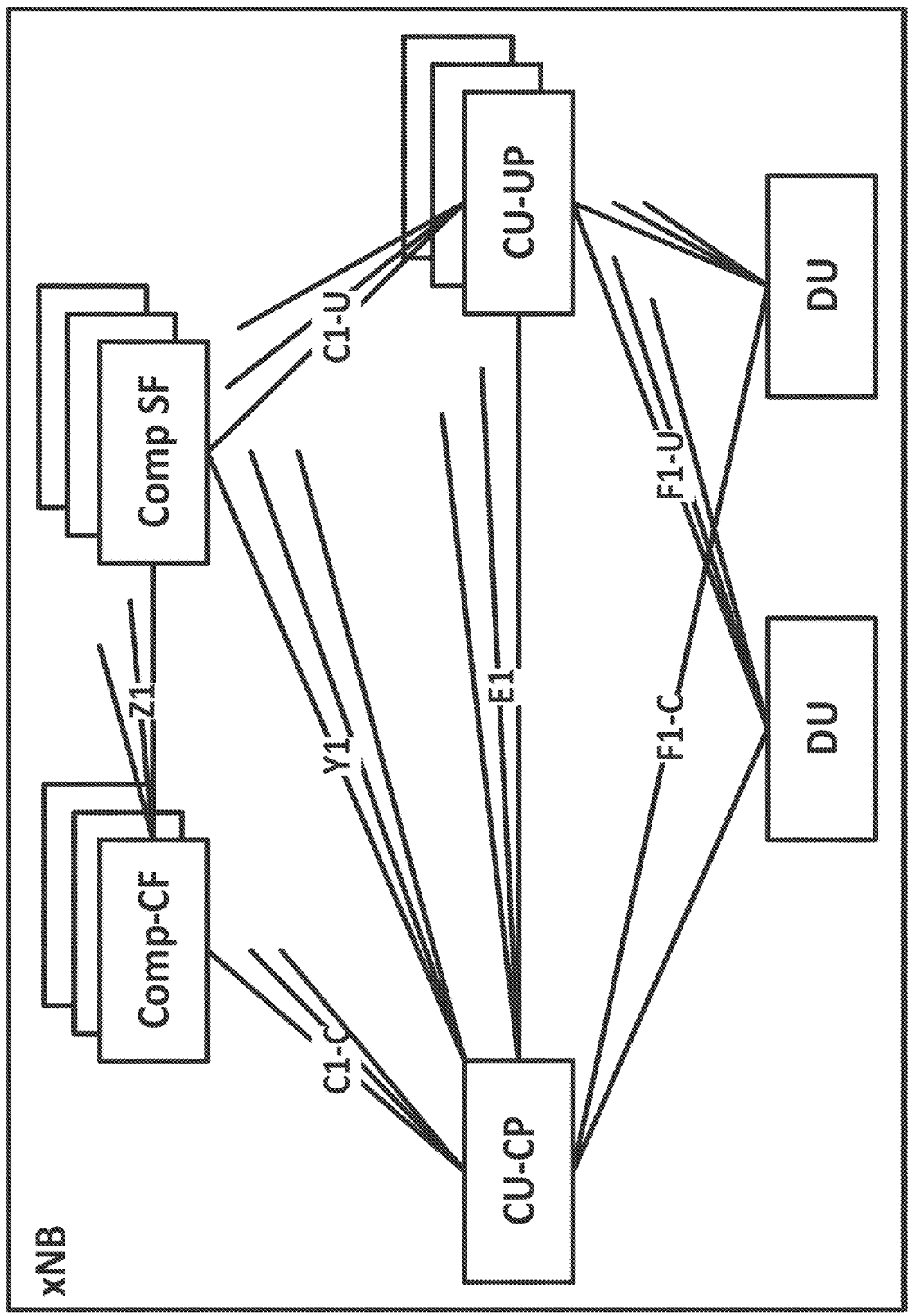
FIG. 2 illustrates an example of a RAN architecture with split RAN and computing functions in accordance with various embodiments.

The reference points are as follow:
1. Between RAN Comp client and RAN Comp CF
2. Between UE and Comp SF
3. Between UE and RAN DU
4. Between RAN Comp CF and SF
5. Between RAN Comp SF and data plane
6. Between RAN Comp CF and RAN CU-CP or CU-UP
7. Between RAN Comp CF and CN NFs, e.g., NEF, PCF, AMF
8. Between RAN Comp CF and OAM
9. Between RAN Comp CF and data plane
10. Between RAN Comp SF and CN Comp SF
11. Between RAN Comp CF and CN Comp CF
12. Between RAN Comp CF and RAN CF, e.g., NEF, PCF, AMF
13. Between RAN Comp SF and RAN CU-CP or CU-UP
14. Between RAN Comp Client and RAN Compute SF
15. Between RAN DU and RAN CU-CP
16. Between RAN DU and RAN CU-UP
17. Between RAN DU and RAN Comp CF
18. Between RAN DU and RAN Comp SF Note: Reference point 1 and 14 are logical and shall be mapped to a combination of other reference points Detailed Architecture with RAN Split FIG. 2 shows an example of a RAN architecture with split RAN and computing functions. As illustrated in FIG. 2, a xNB (6G NB) may include a CU-CP, multiple CU-UPs, and multiple DUs on the communication plane.

The CU-CP is connected to the DU through the F1-C interface, and CU-UP is connected to the DU through the F1-U interface.

One CU-UP is connected to only one CU-CP, but implementations allowing a CU-UP to connect to multiple CU-CPs e.g. for added resiliency, are not precluded.

One DU can be connected to multiple CU-UPs under the control of the same CU-CP.

One CU-UP can be connected to multiple DUs under the control of the same CU-CP.

The basic functions of the E1 interface include E1 interface management function and E1 bearer context management function.

On the computing plane, the xNB may include multiple Comp CFs and multiple Comp SFs with the following principles:

One CU-CP can be connected to multiple Comp CFs, e.g., for different network slices, and multiple Comp SFs, e.g., for different computing hardware/software capabilities through interface C1-C and Y1 respectively.

One Comp CF can be connected to multiple Comp SFs through interface Z1 and one CU-UP can be connected to multiple Comp SFs through interface C1-U.

Throughout this disclosure, xNB refers to the base station or RAN node such as gNB or NG-RAN in the case of 5G architecture. Considering the split aspect of the RAN node, CU-CP refers to the Control plane of the control unit and CU-UP refers to the user plane of the control unit. DU refers to the distributed unit. All of the discussions still apply to different architecture of the xNB correspondingly depending on the split architecture assumed for future cellular generation RAN nodes.

Transport for Compute Task

Figure 3:
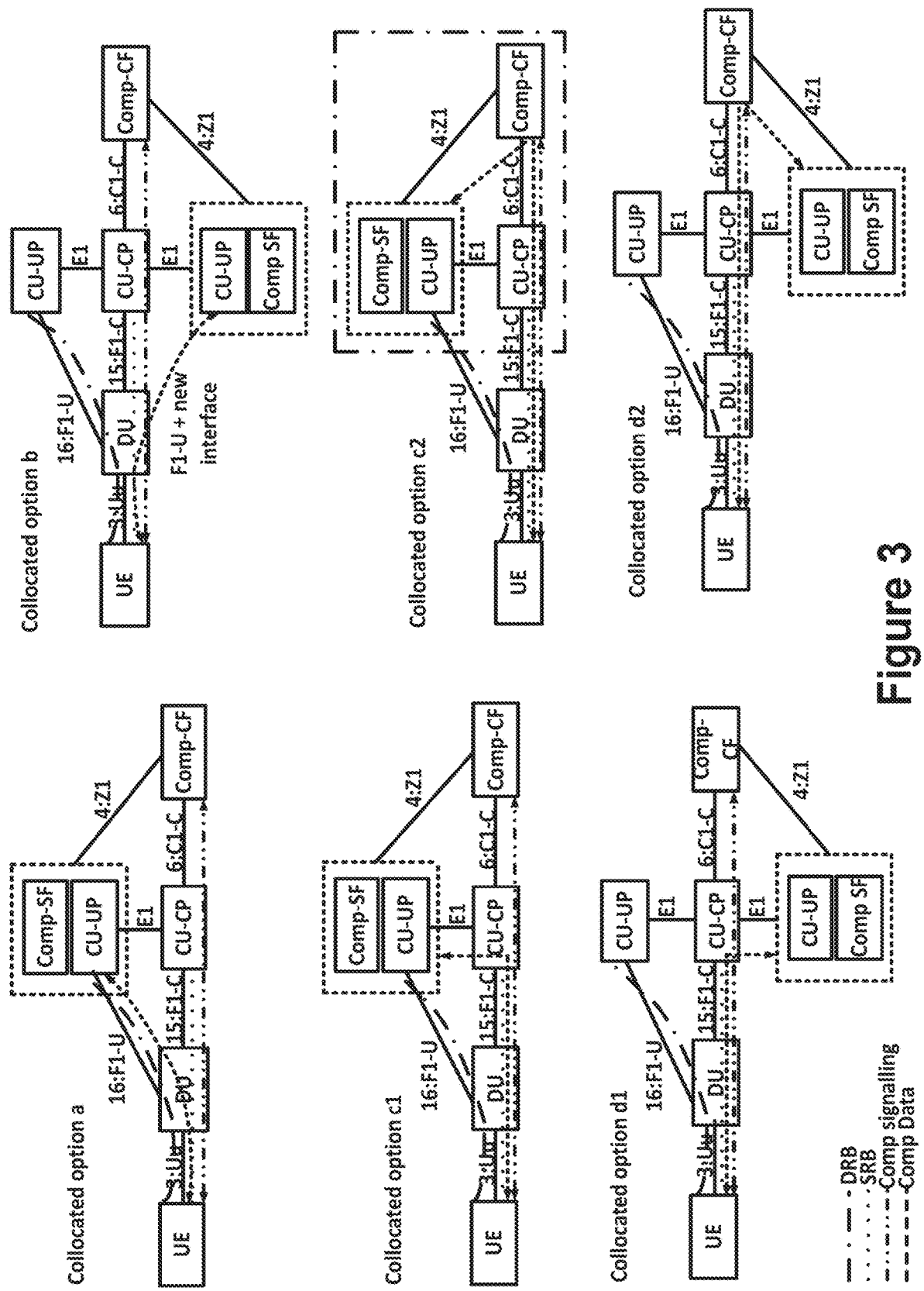
FIG. 3 illustrates an example of scenarios for RAN compute message transport (collocated case) in accordance with various embodiments.
Figure 4:
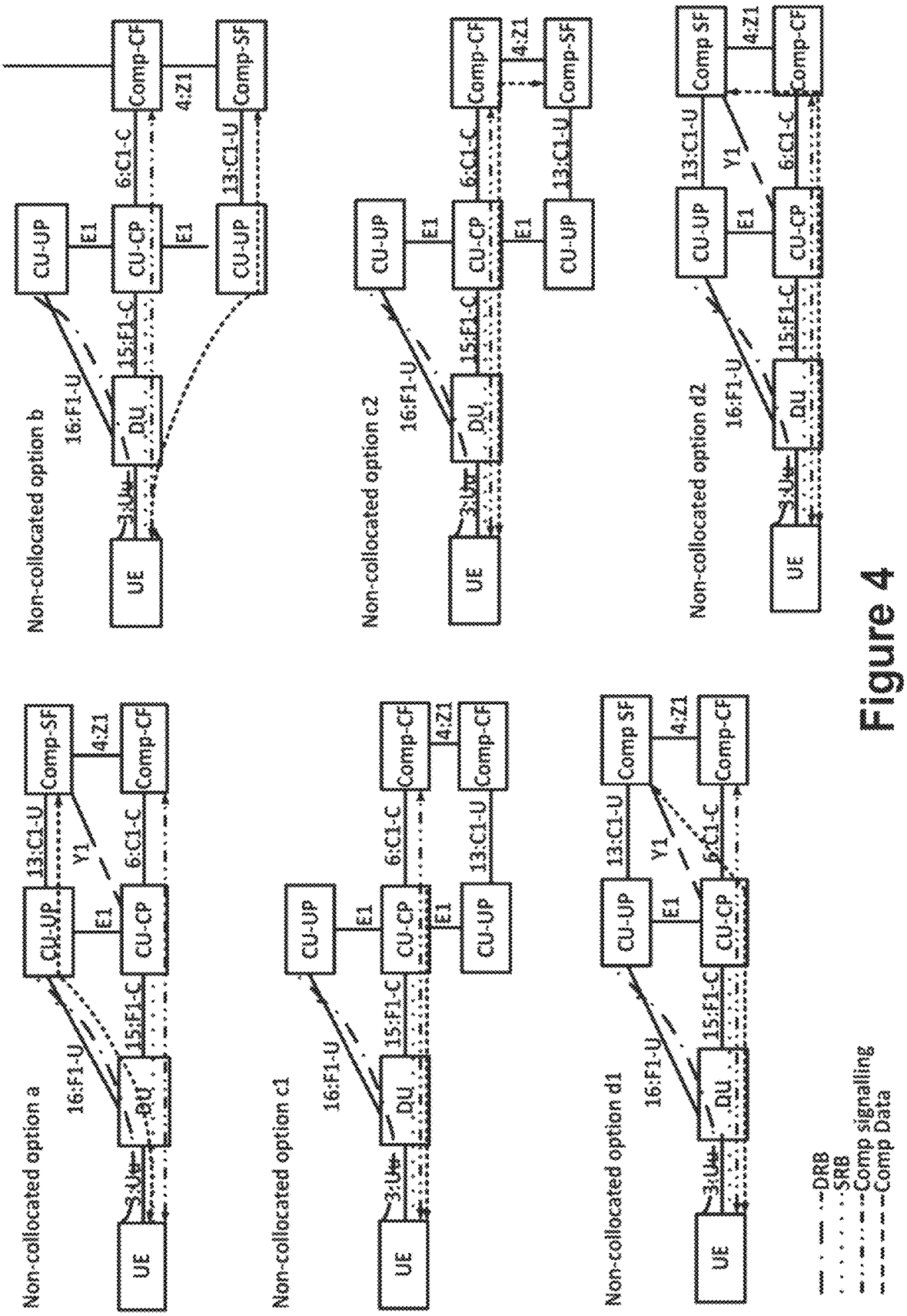
FIG. 4 illustrates an example of scenarios for RAN compute message transport (non-collocated case) in accordance with various embodiments.

As part of the dynamic distribution of compute intensive workload between UE and Network, the following aspects are considered and described in this disclosure:

- Transport protocol design options for offloading compute intensive workload (two options over user plane are provided)
- Collocated and non-collocated scenario considerations for the compute service function (whether it is collocated with the CU-UP or the xNB).
- RAN compute session establishment procedure
- Support of IP and Non-IP based radio interface protocol design with the help of protocol stacks between UE and Network including discussion on compute specific radio bearers The main ideas as depicted in FIG. 3 and FIG. 4 showing scenarios for collocated and non-collocated include:

- Whether RAN Comp SF is collocated with CU-UP or not (all options)
- Whether the CU-UP+RAN Comp SF serve only compute messages (other normal SRBs and DRBs are served by another instance of CU-UP) (all except option a, c1 and c2)
- Whether the compute radio bearer for UP goes via CU-CP or not For this disclosure, the most relevant scenarios are those in options a, and b in both the FIGS. 3 and 4 corresponding to the compute data going through CU-UP, e.g., over user plane. The functions mentioned/described herein could generally be similar or different RAN functions in the final specification. The RAN Compute CF may directly interact with the UE or consult a Service Orchestration and Control Function (SOCF) for RAN Compute session establishment and RAN Compute SF selection, UE service verification and authorization.

Although the UE's RRC state is mentioned in the steps, it may be irrelevant as the UE could technically be in any RRC state and the RAN compute setup procedure could be independent of the UE's communication RRC state.

Among other things, the following embodiments include stage-2 details along with some stage-3 details.

Embodiment 0) Establishment of RAN Compute Session

Figure 5:
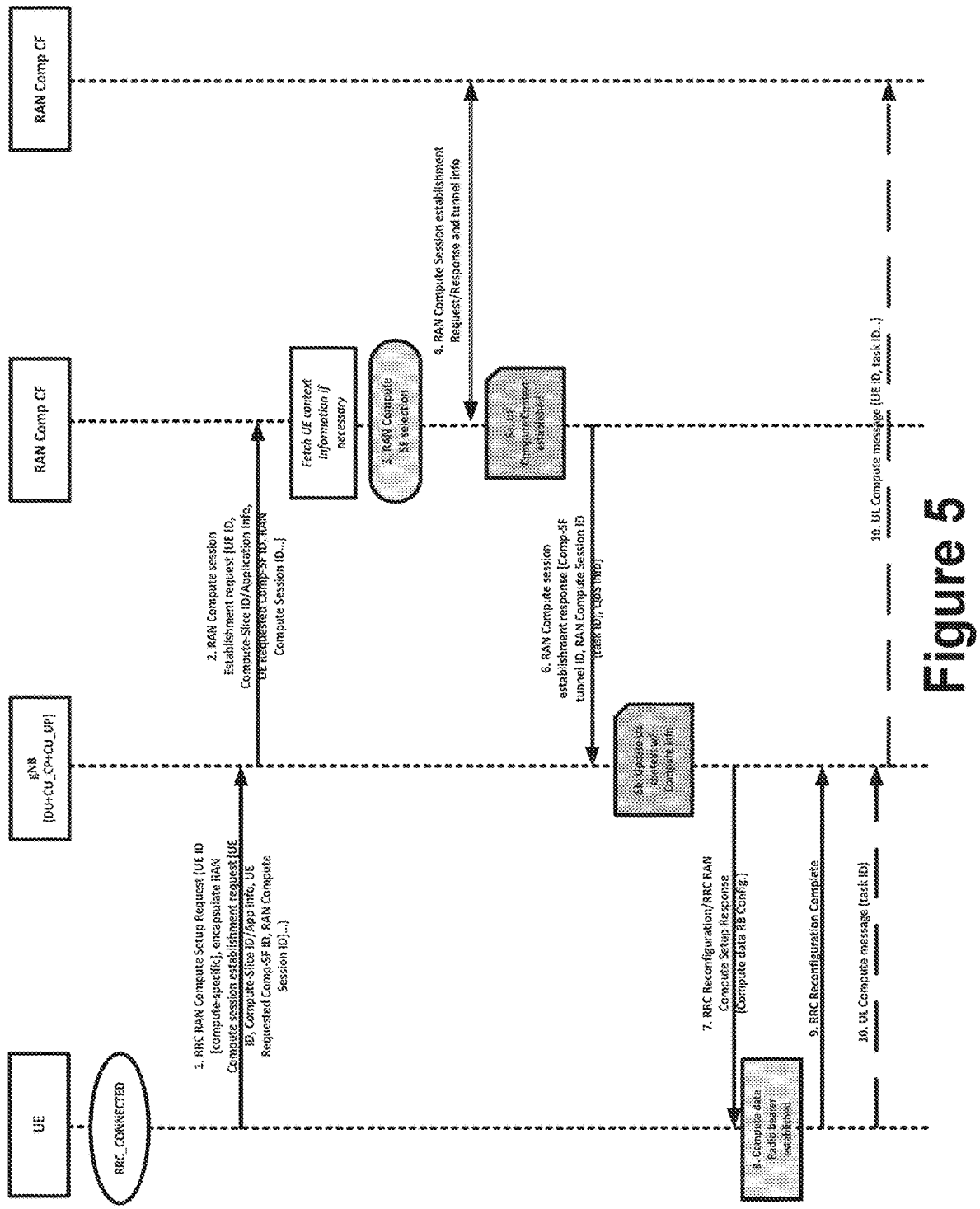
FIG. 5 illustrates an example of a RAN compute session establishment procedure in accordance with various embodiments.

A UE in RRC_CONNECTED mode initiates establishment of a RAN Compute Session establishment procedure for being able to send computation request messages towards the Comp-CF/Comp-SF as shown in FIG. 5. A specific RAN-based slice may be defined for the purpose of compute service and a new QoS mechanism may be defined to support computing within RAN as well. The UE provides relevant information as part of the session establishment procedure along with its UE ID (either regular UE ID or compute service specific ID as described above). This message is checked by the xNB (as depicted as gNB in the figure (including DU, CU-CP and CU-UP) and passed to a relevant RAN compute control function which then confirms the request based on available resources in the RAN compute service function under its control and upon verification of the UE's inputs.

The message flow for establishing RAN Compute session apriori to enable a UE to send computation request at any time by establishing a Computes-specific UE context at the network, are provided in the below steps:

While in RRC_CONNECTED state, the UE sends a newly defined RRC message RRC RAN Compute Setup Request towards the xNB with at least some of the following parameters: (UE ID [compute-specific], some form of security information and encapsulate within a container the message to be transported onto C1-C interface: RAN Compute session establishment request including but not limited to: [UE ID, Compute-Slice ID/App Info, UE Requested Comp-SF ID (if known to the UE through pre-configuration or upon obtaining this info during registration), RAN Compute Session ID] . . . . The message provides details on the application/task information, requested QoS requirement (represented by an indicator that may be defined for compute services), optionally, the service function ID if the UE is aware of it, and a new session identifier along with its own ID (if necessary).

In step 2, the container within the RRC message is extracted by the xNB (CU-CP) and forwarded to the RAN Compute CF as defined in the high-level architecture for processing. Since the UE is in RRC_CONNECTED, we can assume that the UE's compute context is already available at the RAN Comp CF or it may be fetched from the xNB CU-CP over the C1 interface.

RAN Comp CF chooses an appropriate RAN Comp SF based on the required computation service request details obtained from the UE.

Once the RAN Comp CF selects the SF, it exchanges UE's details with the RAN Comp SF over the Z1 interface (as shown in FIG. 2). The details of the message are out of scope of this disclosure.

UE Compute context is thus established at the RAN Comp CF and may also be transferred to the xNB for updating UE's context at CU-CP.

The RAN Comp CF sends response to the xNB after exchanging necessary communication with the RAN Comp SF with a newly defined message of RAN Compute session establishment response containing at least some of the following parameters: UE ID, Comp-SF tunnel ID, RAN Compute Session ID (potentially along with or in place of a task ID corresponding to the task that the UE generated), QoS info. The tunnel information is provided to the xNB for forwarding UL compute messages and routing the DL compute related responses.

xNB forwards the RAN compute session establishment response to the UE along with compute data radio bearer configuration after updating its own context with compute information received from the RAN Comp CF (as per step 5b).

The UE establishes corresponding data radio bearer for compute purpose. This radio bearer is further discussed later.

UE sends RRC Reconfiguration complete message towards xNB to indicate successful set up of the compute specific data radio bearer Compute messages can now be sent in uplink.

The xNB forwards the UL compute message along with the RAN compute session ID and/or task ID to keep track of the message towards the RAN Comp SF using the tunnel ID corresponding to the session ID from the UE compute context information.

Transport Protocol Design Details for Offloading Compute Intensive Workload and Related Procedures Initial Conditions/Assumptions

- UE can be in RRC_INACTIVE or RRC_CONNECTED to invoke compute service procedure (Only RACH based is considered). The compute service message format/header is out of scope of this disclosure.
- UE is assumed to be have registered with the Core network and authenticated and authorized and the subscription information is obtained and stored as part of its UE context which may include support of a specific slice instance for compute services at RAN (how the UE obtains this information is out of scope).

The UE context is available at the RAN (which is updated with compute related context from RAN Comp CF upon Compute session establishment) while the UE is inactive. Whether the UE compute specific context is always kept at the RAN Comp CF is FFS (Or it is fetched from the xNB for every Comp Request or periodically).

Although mobility is not covered in detail, it can be assumed that the UE context may be fetched between xNBs.

Security details other than that discussed in option 2 are out of scope of this disclosure.

In all the options, it is assumed that the RAN advertises support of RAN-based computation support using system information (as shown in the figures).

Compute Request Specific UE ID

The UE that has registered for RAN-based compute service, may be provided with a compute service specific UE ID that may be defined similarly to 5G Resume ID/I-RNTI with additional information to identify the 'compute service support' or the previously accessed RAN compute control function (Comp-CF).

Compute Radio Bearer

Compute radio bearers can include a data-specific radio bearer and signalling-specific radio bearer. The existing 5G based SRB and DRBs can be extended to support compute radio bearer purposes unless there is a specific need to handle these bearers separately (without multiplexing at MAC layer or based on other requirements).

Figure 6:
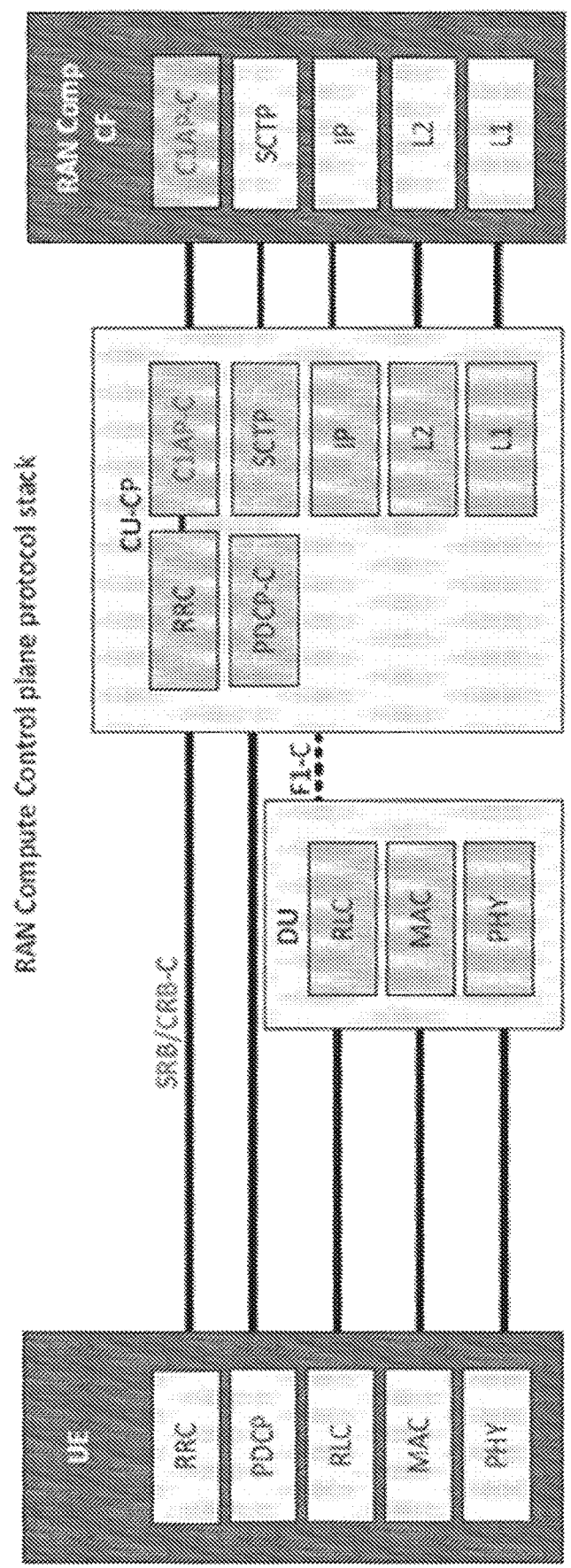
FIG. 6 illustrates an example of a RAN compute control plane protocol stack in accordance with various embodiments.

The signalling radio bearer for computation refers to new (e.g. CRB-C) or existing SRBs:

Carrying new RRC messages for specifically sending computation message over RAN control plane (e.g., CU-CP). The message is then carried in a container towards RAN Comp CF Carrying new IEs within existing RRC messages for supporting general computation requests The control plane protocol stack is shown in FIG. 6 below. As shown here, the RRC messages between the UE and the CU-CP can be carried using existing SRB or newly defined SRB or newly defined Compute radio bearer for control messages [aforementioned as CRB-C] or CRB-S for signalling. Between CU-CP and RAN Comp CF C1 interface is defined to carry these control messages.

The data radio bearer for computation refers to new (e.g. CRB-U) or existing DRBs:

Carrying Computation messages with each DRB having the same packet treatment over Uu.

It terminates at CU-UP and then forwarded to the RAN Comp SF over the established tunnel. In collocated scenario, it will be passed to the Comp SF entity directly.

Some different options for how the computation message or request is carried over the RAN are explained below:

Embodiment 1) Option 1) Using Pre-Established RAN Compute Session (Per Embodiment 0) with Data Sent Over User Plane (Both IP and Non-IP)

Figure 7A:
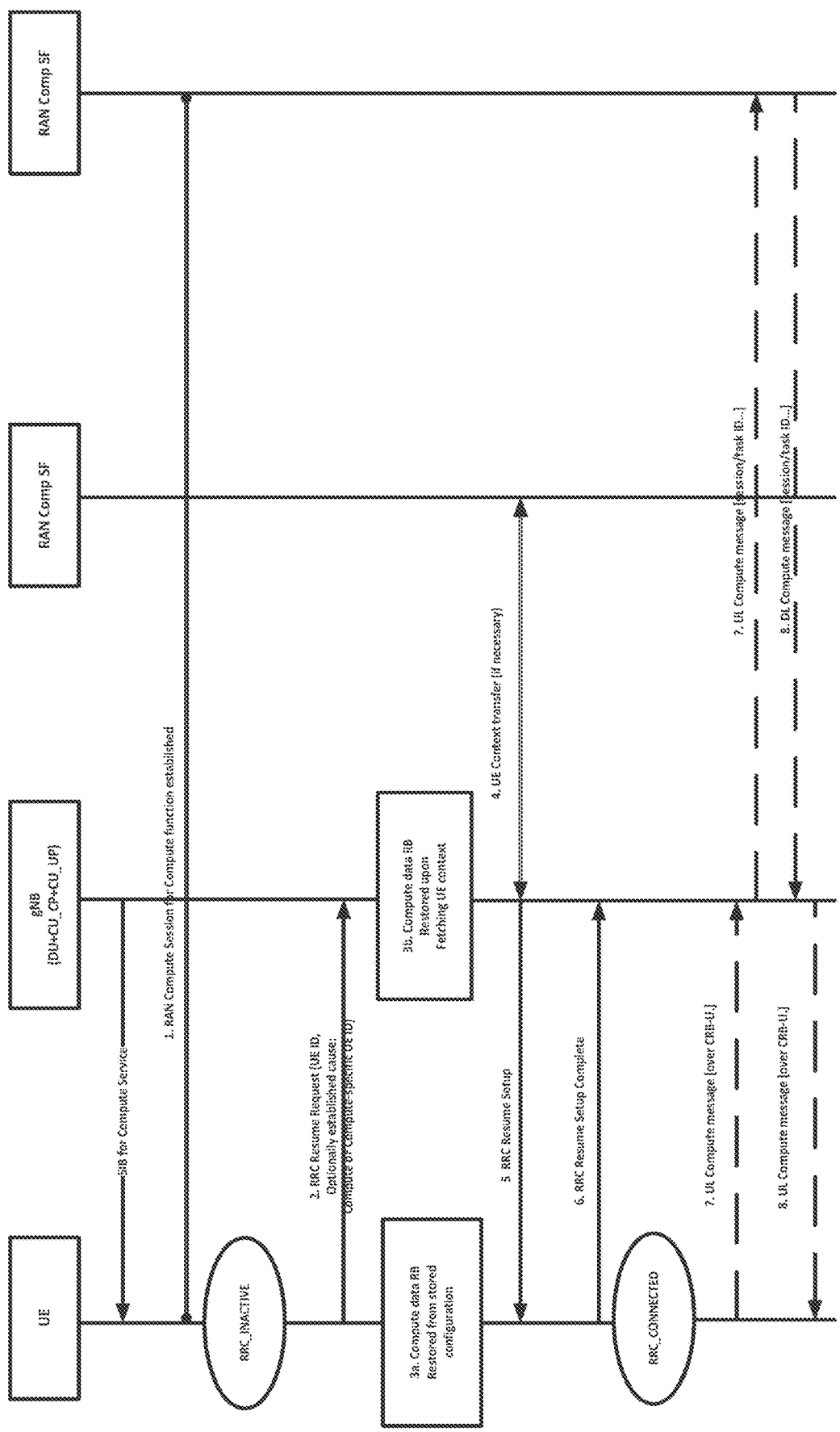
FIG. 7A illustrates an example of a procedure for a UE to send a computation message in accordance with various embodiments.
Figure 7B:
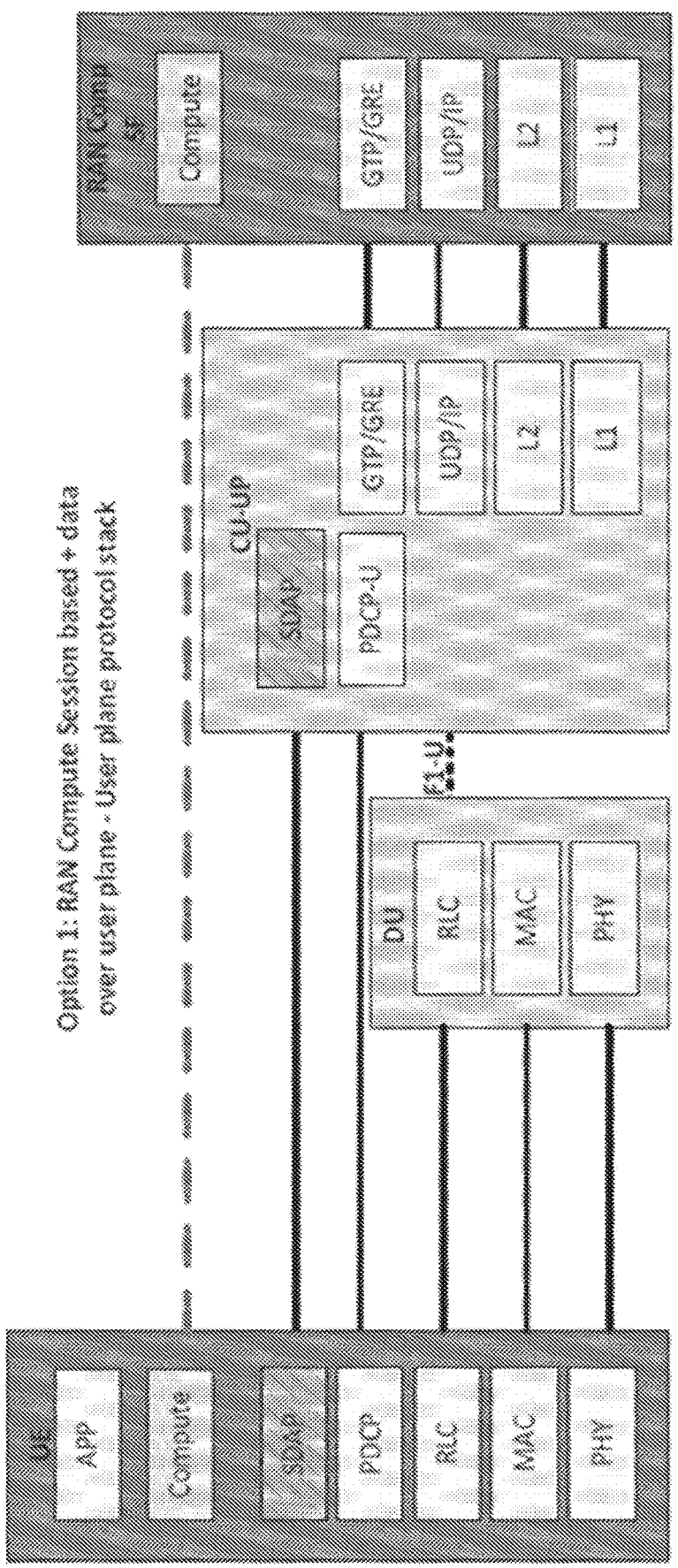
FIG. 7B illustrates an example of a UP protocol stack (non-collocated scenario) in accordance with various embodiments.
Figure 7C:
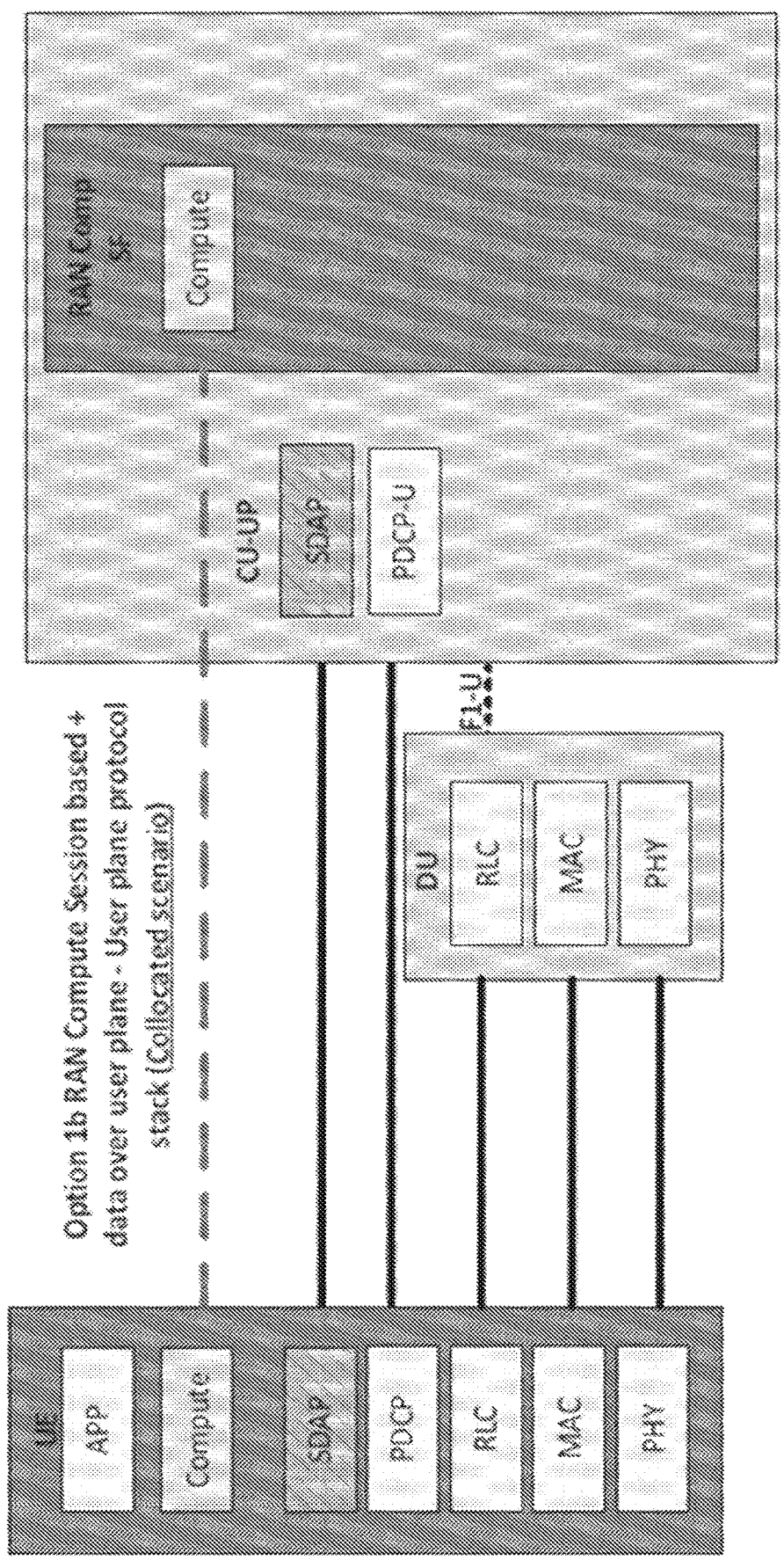
FIG. 7C illustrates an example of a UP protocol stack (collocated scenario) in accordance with various embodiments.
Figure 8:
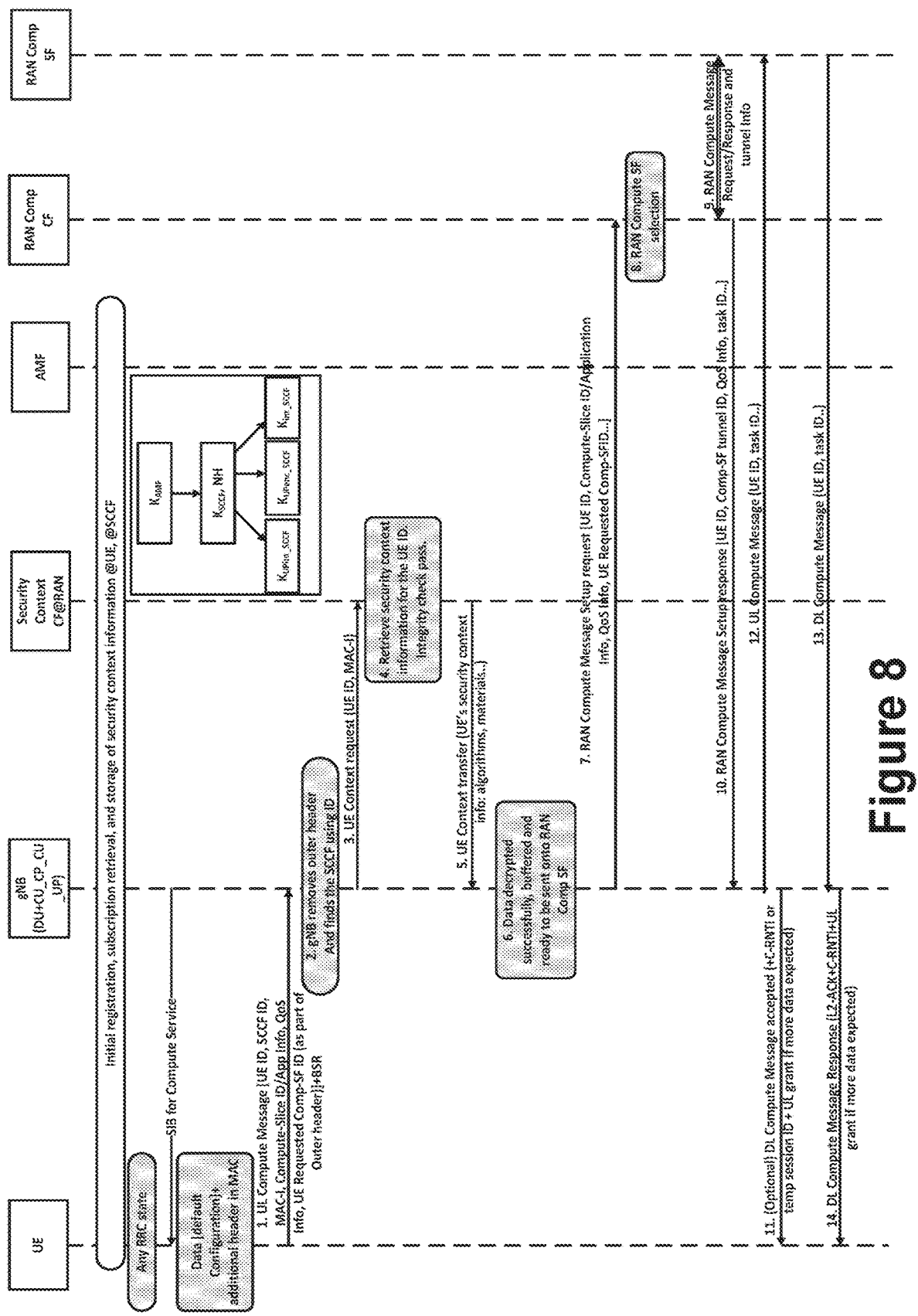
FIG. 8 illustrates an example of a procedure for a UE to send a computation message in accordance with various embodiments.

In this option, the computation task is sent over user plane using pre-established data path using RAN Compute session establishment procedure. As shown in FIG. 7a, a UE in RRC_INACTIVE can resume the RRC connection to perform computation message transmission only. The steps for this procedure are provided below. The corresponding protocol stack for this option is provided in FIG. 7b. In this option, the RAN Comp SF is assumed to have an explicit interface with the CU-UP and the PDCP of the compute data radio bearer terminates at the CU-UP and message is then forwarded to the RAN Comp SF. FIG. 7c showcases the scenario wherein we can assume that the RAN Comp SF is collocated with the CU-UP or an instance of CU-UP for the specific compute radio bearer is at the RAN Comp SF and there is no explicit interface necessary between the two entities. Although GTP/GRE tunneling between the entities is assumed, it is exemplary, and any other protocol may also apply. The link between the 'compute' entities end-to-end refer to the RAN compute session that is pre-established and present. The collocated and non-collocated scenarios are depicted in detail in FIG. 3 and FIG. 4.

1. RAN Compute session for different applications/tasks as expected by the UE can be pre-established as per the procedure in FIG. 5. These sessions can be suspended while the UE is in RRC_INACTIVE and can be resumed when UE is in RRC_CONNECTED.
2. UE sends Resume Request message towards the xNB with compute-specific indication to enable computation only (to ensure that other radio bearers remain suspended).
3. The corresponding UE context is restored at UE and xNB with the stored configuration. xNB might have to fetch UE context from another xNB (NG-RAN) node if necessary. UE might resume computation-specific signalling/data radio bearer or all DRBs depending on whether resume request with computation only allows computation-only SRBs/DRBs to be restored.
4. The RAN node might perform context transfer to the RAN Comp CF if necessary.
5. The RAN node sends existing message Resume set up in response to the resume request or using a newly defined similar message. It might include necessary configuration e.g. radio bearer configuration of the computation-specific bearers.
6. The UE responds with existing message resume setup complete or using a newly defined similar message for successful application of the received configuration and restoring corresponding bearers.
7. Compute message can now be sent in UL direction using the compute-specific DRB to the xNB (and corresponding to a specific LCID that was mapped with the configuration) and using the tunnel from xNB to the RAN Comp SF.
8. Compute message response can now be received in reverse, in the DL direction from the RAN Comp SF.

Embodiment 2) Option 2) Using Connectionless Dynamic Data Transfer Mechanism (RAN Compute Session May or May not be Pre-Established)

In this option, a new computation task is sent to the RAN Comp SF with all the necessary information within the data packet itself as there is no pre-established data path (using RAN compute session establishment procedure). As shown in figure, a UE in RRC_INACTIVE or RRC_CONNECTED can perform computation message transmission using user plane messages sent in a default bearer using default configuration for support of dynamic/new computation requests. The steps for this procedure are provided below.

This option may be modified in the following manner:
A) The computation message may be sent as a specially defined MAC CE with the header containing at least the following information.
UE ID
Security context function ID (optional if UE is RRC_CONNECTED)
MAC-I for integrity check (optional if UE is RRC_CONNECTED)
Task/application info/specs
QoS info [from pre-configured information or mapping associated with the task/app]
UE-requested RAN Comp SF ID
B) The computation message may be sent using a pre-defined computation-specific bearer using configuration that is pre-defined or specified in the system information by the network or in the specification for different supported QoS levels.
1. Once the UE has performed initial registration procedure, it is assumed that the UE context, at least the security material is available at the RAN through a newly defined security function such as SCCF (Security Context Control Function). The UE can then prepare a computation message including in an outer header at the MAC layer, all the information outlined above in A).
2. The DU removes the outer header and requests the CU to send context request towards SCCF.
3. The CU (although not explicitly shown) sends the context request to SCCF including at least the UE ID and the MAC-I received from the UE's first message.
4. The SCCF or any function within RAN node that holds UE's security context information, retrieves security context information for the UE ID and performs integrity check.
5. Once the integrity check passes at the RAN-based security function, it sends the relevant security material including the algorithms that were pre-configured for the UE towards the CU.
6. The CU receives the context and performs data decryption upon creating PDCP entity using default configuration and later applying the received security material. It has buffered the data during the process after receiving it from the DU (DU forwards the message towards CU after preparing the RLC bearer using default configuration).
7. xNB sends compute setup request message to the RAN Comp CF to set up the compute service by including information such as UE ID, compute-service or application info or compute slice ID (if any), QoS information, UE requested RAN Comp SF ID, etc.
8. RAN Comp CF performs RAN Comp SF selection taking into account UE requested RAN Comp SF ID (available based on its own pre-configuration) or the Comp SF ID can be directly mapped to a PTP protocol identifier to identify the Comp SF. Alternatively, the Comp SF can be selected based on the computing service type, application type and the information about Comp SF status such as workload.
9. RAN Comp CF communicates over the Z1 interface with the RAN Comp SF to set up relevant resources and task rules and obtains a task ID (if any).
10. RAN Comp CF responds to the xNB with RAN Compute message setup accept (or failure in case it cannot accept) with parameters such as RAN Comp SF tunnel ID, task ID, etc.
11. [optional] xNB may send in DL compute message processing accept to let the UE know that the computation request is accepted.
12. xNB forwards the buffered UL compute message towards the RAN Comp SF.
13. RAN Comp SF responds upon completion of the task with the computation message response.
14. xNB forwards the response to the UE along with a temporary identifier such as C-RNTI for future messages as well as UL grant if BSR was received with the previous message.

All of the above steps are still applicable if according to B) above, compute-specific radio bearer with its own configuration is defined. When a MAC CE is defined for supporting compute message, a specific header and LCID are defined in the specification. The disadvantage with using a MAC CE is that a wide variety of QoS characteristics may not be easily satisfied when using MAC CE based message transmission (even with extended LCID space).

Figure 9:
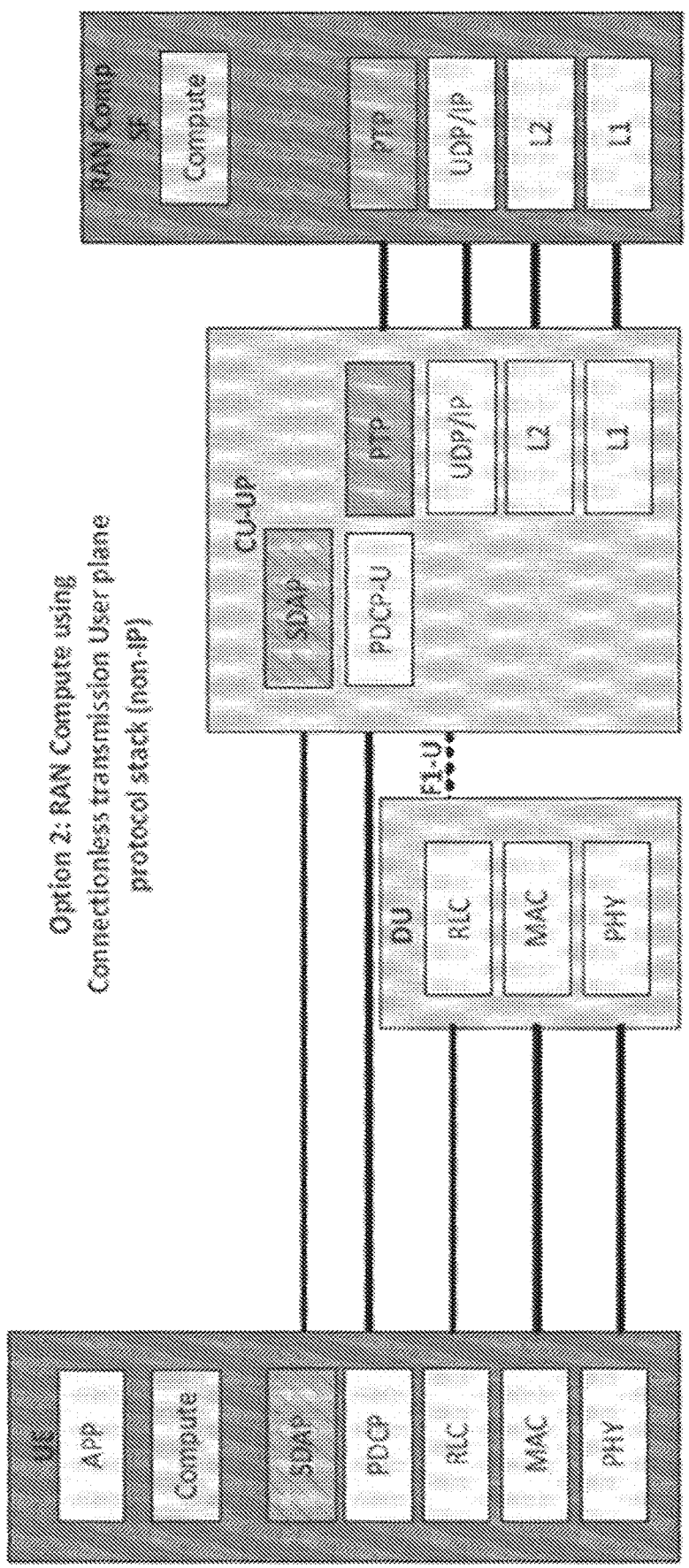
FIG. 9 illustrates an example of a UP protocol stack in accordance with various embodiments.

The UP protocol stack for option 2 of RAN compute message transmission using point-to-point tunneling as an example between CU-UP and RAN Comp SF is shown in FIG. 9. We assume that the message is generated dynamically and the steps discussed above are followed. The link between the end-to-end 'compute' entities refers to the RAN compute session that may be pre-established and present already for a given application or dynamically established or the UE may already the tunnel information associated between the RAN node and the RAN Comp SF that it provides while sending the computation request in which session, a specific session establishment may not be necessary.

Enabling Augmented Computing and Dynamic Offloading in Next-Generation Cellular Networks As introduced above, modern cloud computing has become extremely popular to provide computing/storage capability to customers who can focus more on the SW development and data management without worrying too much about the underlying infrastructure. Edge computing is believed to extend this capability close to the customers to optimize performance metrics such as latency. The 5G architecture design take these scenarios into considerations and developed multi-homing, ULCL framework to offload compute tasks to different data networks (DNs), which may be at the network edge. For the UE with limited computing capabilities, the application can be rendered at the cloud/edge for computing offloading based on application level logic. The traffic routing may be influenced by the application for the traffic transported over the cellular networks to fulfill the QoS requirements of the application.

With the trend of Telco network cloudification, the cellular network is foreseen to be built with flexibility and scalability by virtualized network functions (VNFs) or containerized network functions (CNFs) running on general purpose hardware. Heterogenous computing capabilities provided by hardware and software, naturally coming with this trend, can be leveraged to provide augmented computing to end devices across device and network. These computing tasks generally have different requirements in resource and dependencies in different scenarios. For example, it can be an application instance either standalone or serving one or more UEs. It can also be a generic function like AI training or inference or a micro-service function using specific accelerators. In addition, the computing task can be semi-static or dynamically launched. To enable these scenarios, this disclosure proposes solutions to enable augmented computing across the device and RAN in order to dynamically offload workload and execute compute tasks at the network computing infrastructure with low latency and better computing scaling. the device may need to negotiate with the network about resource and requirements. Besides, the network may need to know more information about the compute task for routing, execution and charging, etc.

The embodiments herein provide a system architecture that supports augmented compute services. The present disclosure also provides embodiments for negotiating between devices and the network about resource and requirements. The present disclosure also provides information of the compute task for the network to handle the traffic routing, compute task execution and charging, etc. Currently, there is no solutions that address augmented computing and dynamic workload migration in cellular networks.

RAN Architecture with Computing Functions

FIG. 1, introduced above, shows an example RAN architecture according to various embodiments. In this example, the RAN includes a communication plane, a computing plane, and a data plane. The functions to enable network computing include a RAN computing control client (Comp CC) at the UE, as well as a RAN computing control function (Comp CF) and the RAN computing service function (Comp SF) at the network side.

The reference points in the RAN architecture of FIG. 1-1 are as described above. Note: Reference point 1 and 14 are logical and shall be mapped to a combination of other reference points.

The embodiments herein are related to functions of the computing plane (e.g., computing functions) and the interaction among these computing functions. The functionalities of Comp CC, Comp CF, and Comp SF are described infra.

Description of the Functions for Computing Plane

The functionalities of Comp CC at the UE side include:
Functions to interact with RAN Comp CF over reference point 1 to:
Request for a compute task to be offloaded to RAN compute
Generate metadata about the requirements for the compute task
Functions to interact with RAN Comp SF over reference point 14 to:
Generate compute task and metadata about how to handle the compute task at a Comp SF
Functions to manage computing offloading related information at UE side to:
Manage compute task information like task ID, task Type, status, requirements, etc.

Figure 10:
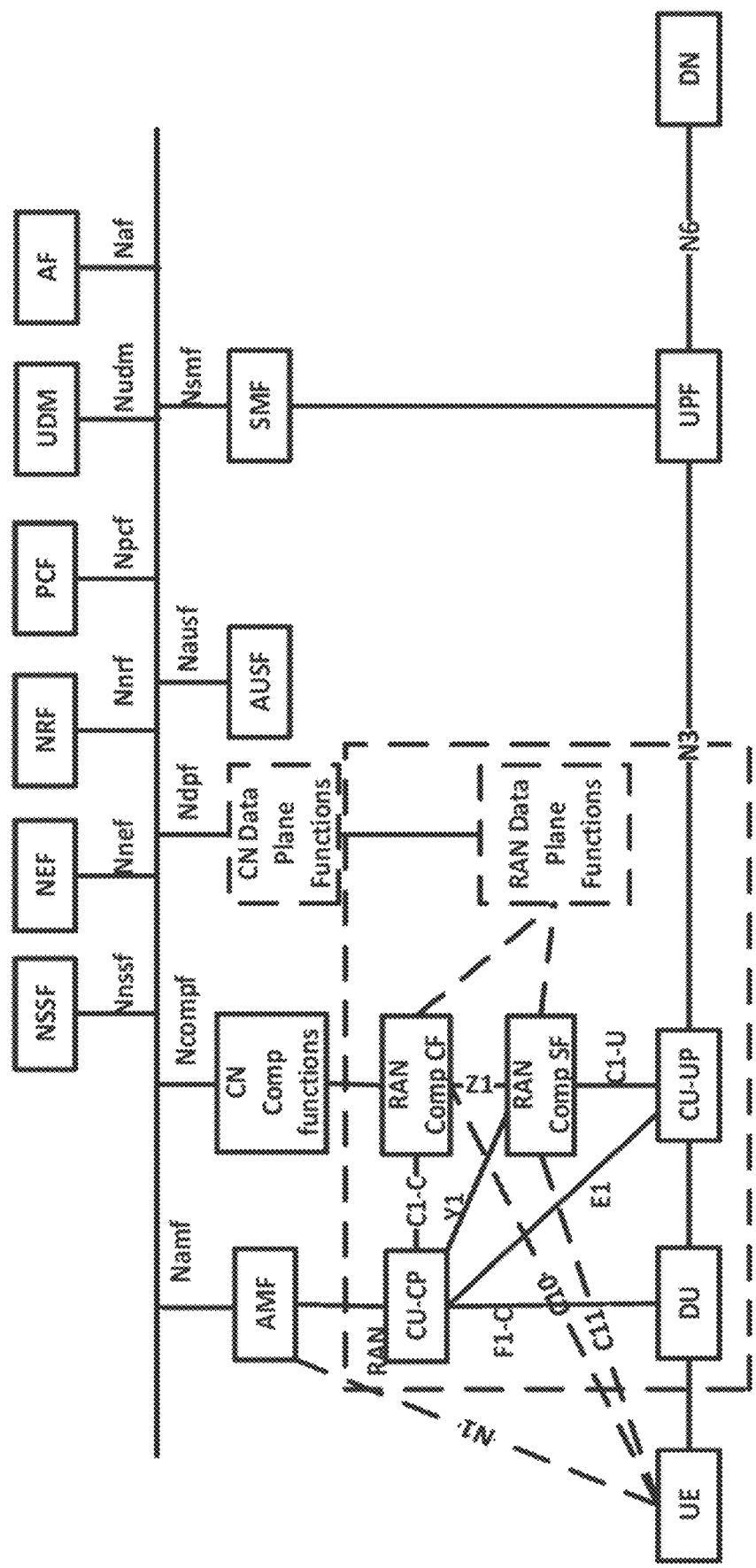
FIG. 10 illustrates an example of a reference architecture to enable augmented computing services to both UE and network functions (NFs) for 5G and B5G in accordance with various embodiments.

The functionalities of Comp CF at the network side include:
Functions for compute task information management to
Generate/manage compute context information about
Compute task description, e.g., task ID, ownership, environment requirements, source of executables and data
Compute task status, e.g., granted, ready, in progress, done
Compute task route info., e.g., assigned compute SF
Functions to interact with RAN compute client over reference point 1 to
decide whether to accept a compute task to be offloaded to RAN Compute based on information like compute task requirements, UE's compute service subscription, RAN compute status, RAN compute access policies, etc.
decide Comp SF selection and load-balancing
Functions to interact with RAN commu. CP/UP over reference point 6 to
Collect information from communication CP/UP functions such as UE's measurements, statistics about channel conditions and link status, etc. to facilitate making decisions about whether to accept a compute task
Send compute context to commu. functions for routing request compute policy generation and delivery, e.g., reject all compute request
Functions to interact with other NFs over reference point 7 to
Expose compute service (e.g., for AI) to other NFs
Interact with CN Compute control functions for offloading compute tasks
Functions to interact with RAN Comp SF over reference point 4 to
Exchange information about compute task, e.g., status
Create rules related to a compute task, e.g., priority, how to handle the compute task
Collect charging data
Functions to interact with OAM over reference point 8 to
Request compute resource status and get notifications about compute parameters and policies from OAM
Adjust access rules or configuration for RAN Compute access
Functions to interact with data plane over reference point 6 to
Store and retrieve data, and verify data access for compute tasks The functionalities of the Comp SF at the network side include
Functions to interact with RAN Comp CF over reference point 4 to
Generate charging data
Report compute task related information like status, errors
Enforce compute task rules set up by RAN Comp CF
Functions to interact with CN Comp SF over reference point 10 to
Send compute task to CN Compute for offloading
Functions to interact with RAN commu. functions over reference point 13 to
Generate Compute context for routing
Send compute data to UE via commu. plane functions
Functions to interact with the underlying computing infrastructure to
be aware about different SW/HW capabilities
send the compute task to the required computing environment The Reference Architecture to Enable Augmented Computing Service for Next Generation Cellular Network Including 5G An example reference architecture to enable augmented computing services to both UE and network functions (NFs) for 5G and B5G is shown by FIG. 10. In this example, the RAN computing functions interface with CU-UP and CU-CP and CN computing functions can connect to other NFs via service-based interface (SBI). There are also interfaces between the RAN and CN computing functions to offload workloads to each other. The Ncompf, CN Comp functions, the RAN Comp CF, RAN Comp SF, C1-C Y1, Z1, C1-U, C10, and C11 content in FIG. 10 are the computing functions and related interfaces added for computing and the Comp CC at UE side is not shown. There are direct interfaces defined for CN computing functions and RAN computing functions to interact with each other for offloading computing tasks from CN to RAN and vice versa.

In some embodiments, the UE can request to offload a computing task through Comp CF and have it executed by the Comp SF through interface C10 and C11. The overall procedure is described below.

The Reference Architecture for 6G to Enable Computing

Figure 11:
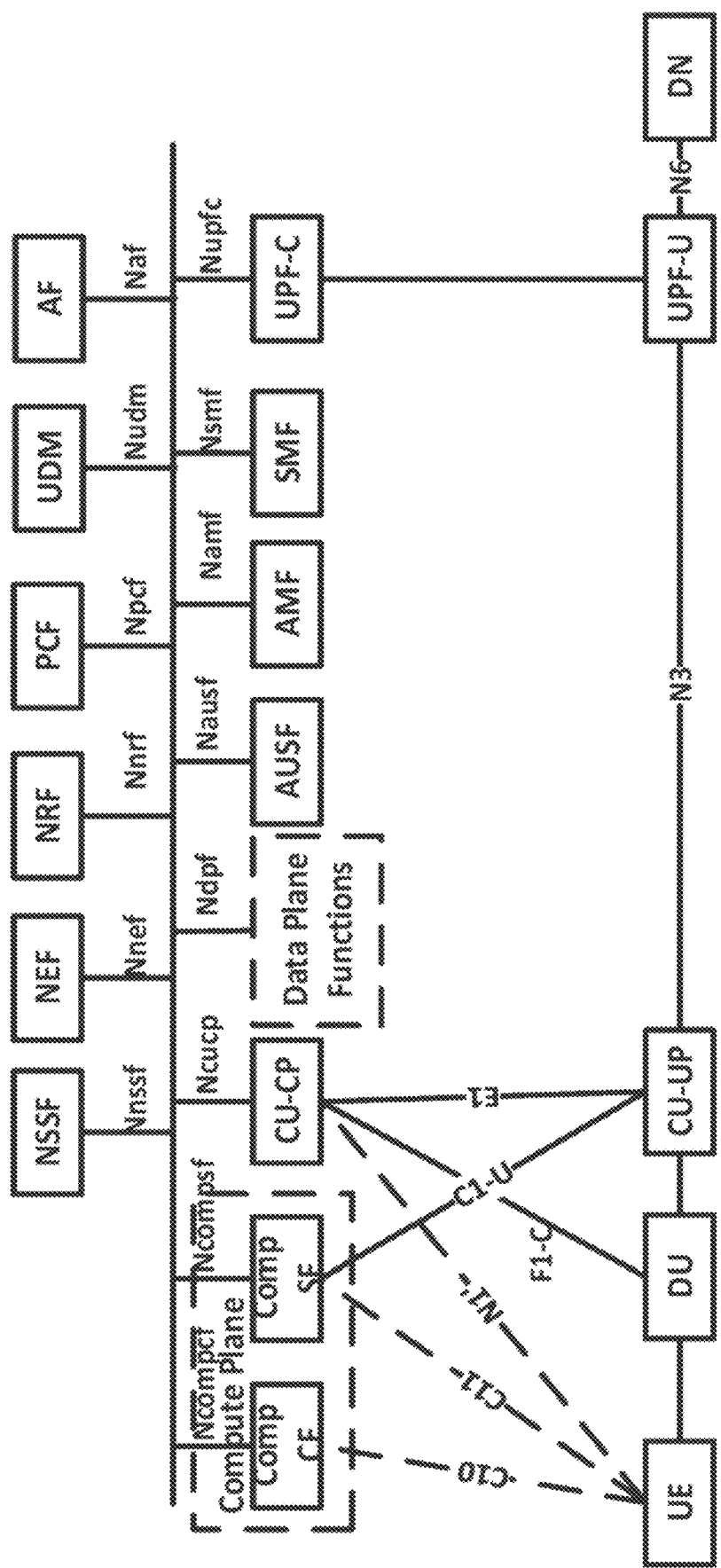
FIG. 11 illustrates an example of an architecture to enable augmented computing in RAN (option 1) in accordance with various embodiments.
Figure 12:
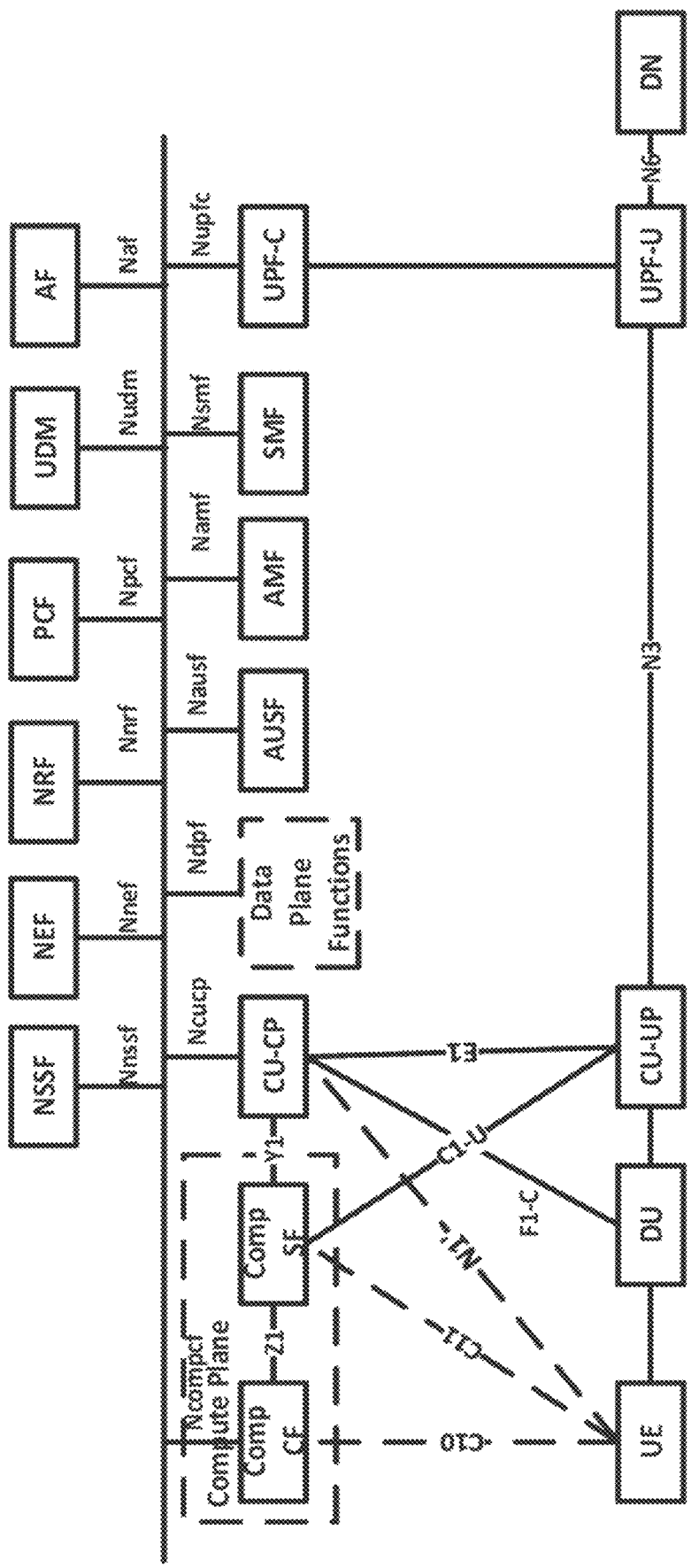
FIG. 12 illustrates an example of an architecture to enable augmented computing in RAN (option 2) in accordance with various embodiments.

There are two architecture options to enable computing for 6G as shown in FIG. 11 and FIG. 12. The difference between option 1 and option 2 are whether Comp SF connects to the other NFs through SBI. Specifically, option 1 and option 2 can coexist in the same cellular network. For example, one CU-CP instance can connect to the computing functions by option 1 and the other CU-CP instance can connect to the computing functions by option 2.

The enhancements to SBA (eSBA) has been studied to evolve the 5G SBA by further modulization of AMF and UPF. In FIGS. 11 and 12, the interaction among computing functions and other RAN/CN functions are illustrated with an example 6G Service Based Architecture (SBA) where the N2 is removed and the CU-CP connects to the other NFs via SBI and the UPF is further split to UPF-C connected to SBI and the UPF-U. However, option 1 and option 2 are to capture how computing functions interact with other functions and not limited to this 6G architecture.

In option 1, the Comp CF and Comp SF connect to the NFs through SBIs to allow the NFs to submit a compute task directly to a Comp SF. For the computing functions deployed in CN, there is no direct interface between RAN functions and the CN computing functions except via CU-CP.

In this option, the compute functions can be requested by the following:

Other NFs can submit a compute task directly to a Comp SF using Comp SF service. Comp SF can request CU-CP service to receive the computing related data over appropriate transport.

UE can request for computing task in a similar manner as discussed previously.

In option 2, only the Comp CF is a control plane NF at SBA, which can be deployed as a RAN function or CN function as shown in FIG. 12. If the computing functions are deployed in CN, there is no direct interface between RAN functions and the comp SF. In this option, the compute functions can be requested by one or more other and/or UEs. The NFs can request for a compute task from Comp CF service, and the UE can request for computing task similar to as described above.

Detailed Architecture with RAN Split

FIG. 2, introduced above, shows an example RAN architecture with split RAN and computing functions according to various embodiments. As illustrated in FIG. 2, an xNB (e.g., a 6G nodeB (NB)) includes a CU-CP, multiple CU-UPs, and multiple DUs.

The CU-CP is connected to the DU through the F1-C interface, and CU-UP is connected to the DU through the F1-U interface.

One CU-UP is connected to only one CU-CP, but implementations allowing a CU-UP to connect to multiple CU-CPs e.g., for added resiliency, are not precluded.

One DU can be connected to multiple CU-UPs under the control of the same CU-CP.

One CU-UP can be connected to multiple DUs under the control of the same CU-CP.

The basic functions of the E1 interface include E1 interface management function and E1 bearer context management function.

On the computing plane, the xNB includes multiple Comp CFs and multiple Comp SFs with the following principles:

One CU-CP can be connected to multiple Comp CFs, e.g., for different network slices, and multiple Comp SFs, e.g., for different computing hardware/software capabilities through interface C1-C and Y1 respectively.

One Comp CF can be connected to multiple Comp SFs through interface Z1 and one CU-UP can be connected to multiple Comp SFs through interface C1-U.

Example Procedure to Enable Dynamic Workload Offloading

Figure 13:
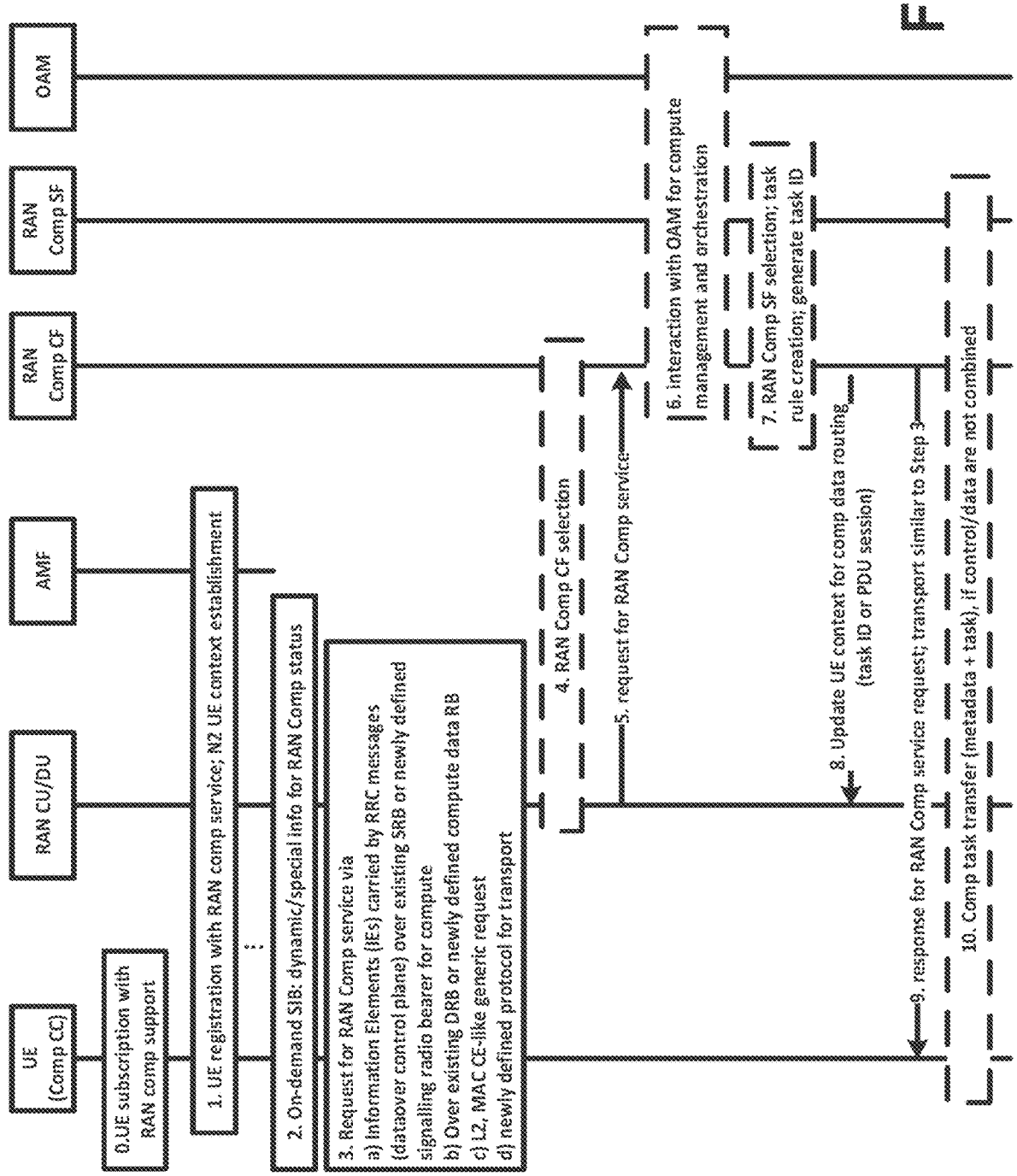
FIG. 13 illustrates an example of a message flow for workload offloading to RAN compute in accordance with various embodiments.

FIG. 13 shows an example of a procedure for dynamic workload offloading according to various embodiments. Note that the Comp CF and Comp SF are deployed in RAN in this overall message flow. However, it can readily extended to the scenario where Comp CF and Comp SF are deployed in CN.

The procedure of FIG. 13 may operate as follows:

0) UE can subscribe RAN compute as a service for augmented computing. The subscription information can include how much computing resource or special HW/SW capabilities that the UE can request.

1) Upon registration, UE gets service authorization and set up security related information with AMF to use RAN Comp service if the UE has service subscription of RAN Comp service. The related context information can be transferred to appropriate entities, e.g., one or more CU-CPs and CU-UPs. Then the UE might enter RRC inactive state after obtaining the indication for allowing RAN Comp services.

2) UE gets dynamic information about RAN Comp status and capability, e.g., by on-demand SIB where a special SIB can be defined to include compute related information, e.g., workload.

3) When needed, UE can resume RRC connection for entering RRC-Connected state and request for dynamic workload offloading to RAN Compute through the following example options:
   a. The request can be carried by RRC message as information elements (IEs) over existing SRB or newly defined signalling radio bearer for compute.
   b. The request can be carried over existing DRB or newly defined compute specific data radio bearer
   c. The request can be embedded into L2 messages, e.g., in the MAC CE BSR-like to indicate the requested compute resource and requirements
   d. The request can also be carried by new protocol to include the information about compute task requirements This request for RAN Comp service shall include information about UE's identity, compute task identifiers like type and special requirements about the compute task. This message can go through DU and CU-CP.

4) [Optional] A Comp CF can be selected based on the compute task related information based on the request message for RAN Comp service if there are more than one Comp CF. The Comp CF selection can be based on different network slice, compute service class, and workload of different Comp CF, etc.

5) The request for RAN Comp service is sent to the selected or default Comp CF to decide whether to accept a compute task based on the rules and policies in the Comp CF and information about RAN comp client status.

6) Comp CF can interact with OAM for compute resource management, compute offloading rule and policy configuration, etc. This step can be asynchronized to the other steps. For example, the Comp CF can get updates about RAN compute resource less frequently than a request is handled. Alternatively, Comp CF may based on its compute capabilities for the compute service orchestration, scheduling, management, or configuration, etc.

7) After a compute task is accepted, the Comp CF can optionally select a Comp SF to handle the UE's compute task. The Comp CF may create task handling rules about the compute task in the selected Comp SF and send information such as task ID, status, etc. to the selected Comp SF.

8) Comp CF can optionally update compute context information in the communication functions, e.g., CU-CP and CU-UP to enable correct routing for compute data. For example, the Comp CF can send the identifiers of a compute task, a compute session or Comp CF/SF.

9) Comp CF sends a response for compute service about whether to accept the compute task and its related information about the task to the UE; the message's transport can be based on options provided in Step 3).

10) [Optional] the UE sends the compute data of the compute task to the assigned Comp SF to have it executed.

Systems and Implementations

Figure 14:
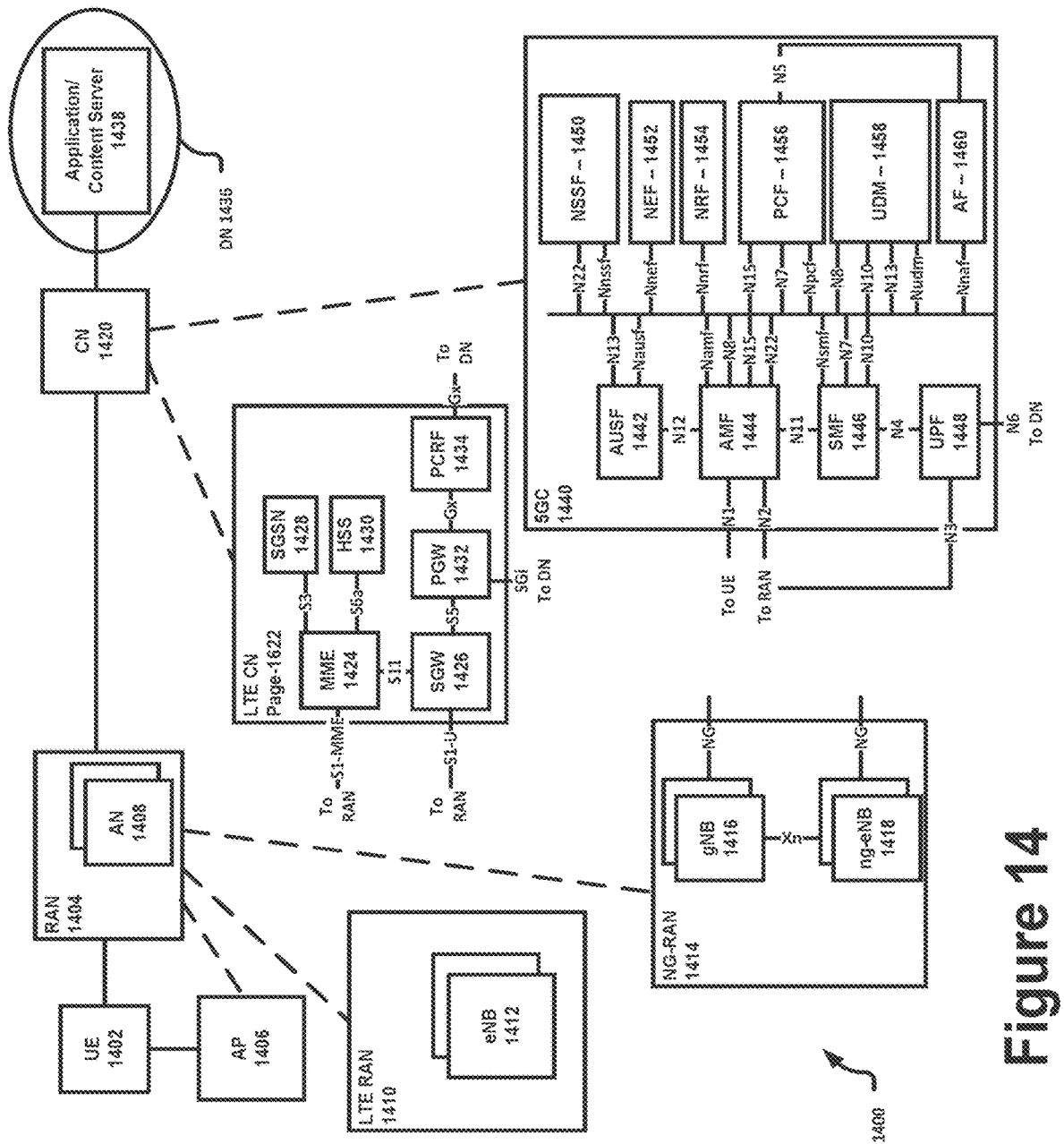
FIG. 14 illustrates a network in accordance with various embodiments.
Figure 15:
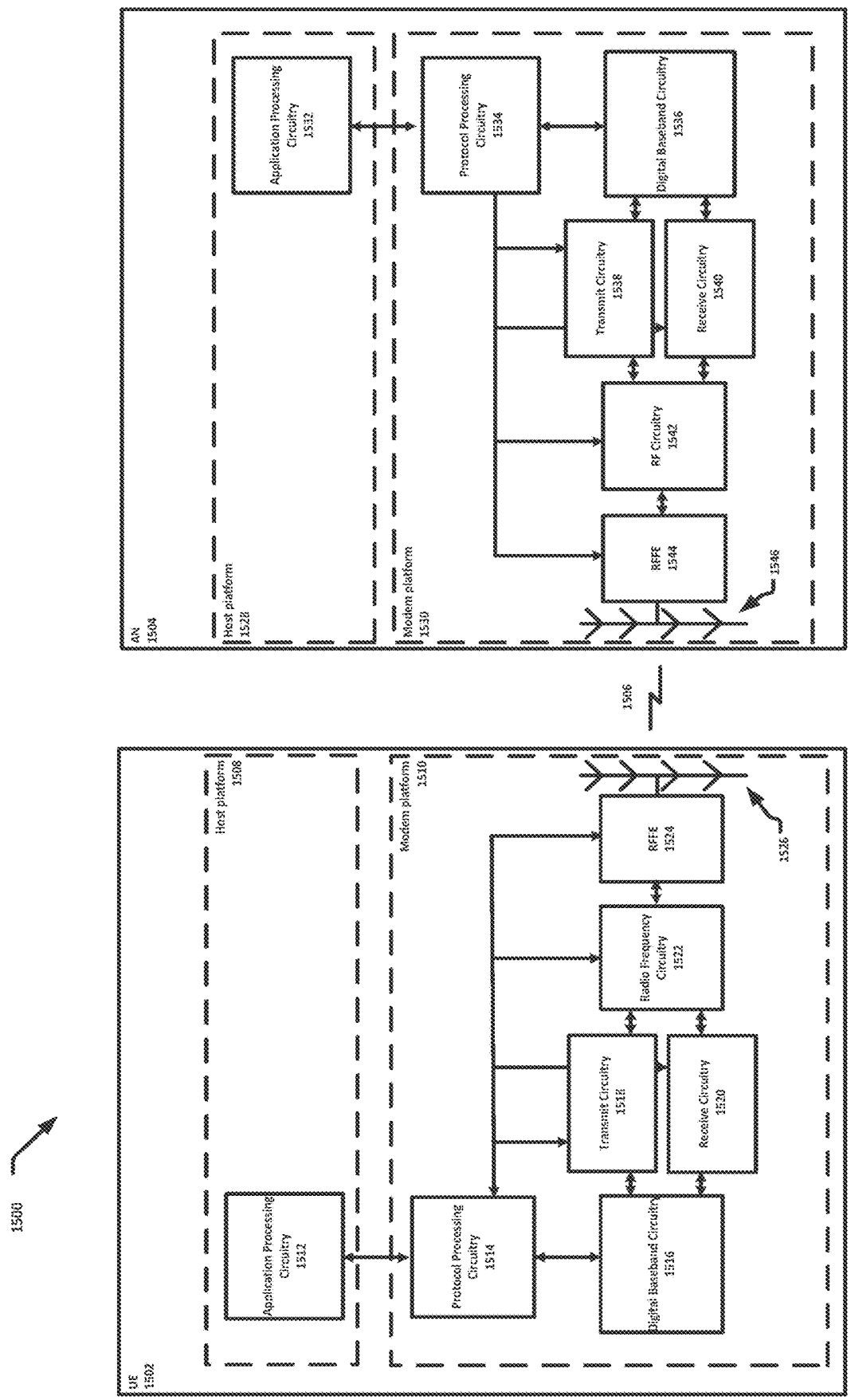
FIG. 15 illustrates a wireless network in accordance with various embodiments.

FIGS. 14-15 illustrate various systems, devices, and components that may implement aspects of disclosed embodiments.

FIG. 14 illustrates a network 1400 in accordance with various embodiments. The network 1400 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1400 may include a UE 1402, which may include any mobile or non-mobile computing device designed to communicate with a RAN 1404 via an over-the-air connection. The UE 1402 may be communicatively coupled with the RAN 1404 by a Uu interface. The UE 1402 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1400 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1402 may additionally communicate with an AP 1406 via an over-the-air connection. The AP 1406 may manage a WLAN connection, which may serve to offload some/all network traffic from the RAN 1404. The connection between the UE 1402 and the AP 1406 may be consistent with any IEEE 802.11 protocol, wherein the AP 1406 could be a wireless fidelity (Wi-Fi®) router. In some embodiments, the UE 1402, RAN 1404, and AP 1406 may utilize cellular-WLAN aggregation (for example, LWA/LWIP). Cellular-WLAN aggregation may involve the UE 1402 being configured by the RAN 1404 to utilize both cellular radio resources and WLAN resources.

The RAN 1404 may include one or more access nodes, for example, AN 1408. AN 1408 may terminate air-interface protocols for the UE 1402 by providing access stratum protocols including RRC, PDCP, RLC, MAC, and L1 protocols. In this manner, the AN 1408 may enable data/voice connectivity between CN 1420 and the UE 1402. In some embodiments, the AN 1408 may be implemented in a discrete device or as one or more software entities running on server computers as part of, for example, a virtual network, which may be referred to as a CRAN or virtual baseband unit pool. The AN 1408 be referred to as a BS, gNB, RAN node, eNB, ng-eNB, NodeB, RSU, TRxP, TRP, etc. The AN 1408 may be a macrocell base station or a low power base station for providing femtocells, picocells or other like cells having smaller coverage areas, smaller user capacity, or higher bandwidth compared to macrocells.

In embodiments in which the RAN 1404 includes a plurality of ANs, they may be coupled with one another via an X2 interface (if the RAN 1404 is an LTE RAN) or an Xn interface (if the RAN 1404 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1404 may each manage one or more cells, cell groups, component carriers, etc. to provide the UE 1402 with an air interface for network access. The UE 1402 may be simultaneously connected with a plurality of cells provided by the same or different ANs of the RAN 1404. For example, the UE 1402 and RAN 1404 may use carrier aggregation to allow the UE 1402 to connect with a plurality of component carriers, each corresponding to a Pcell or Scell.

In dual connectivity scenarios, a first AN may be a master node that provides an MCG and a second AN may be secondary node that provides an SCG. The first/second ANs may be any combination of eNB, gNB, ng-eNB, etc.

The RAN 1404 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1402 or AN 1408 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1404 may be an LTE RAN 1410 with eNBs, for example, eNB 1412. The LTE RAN 1410 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1404 may be an NG-RAN 1414 with gNBs, for example, gNB 1416, or ng-eNBs, for example, ng-eNB 1418. The gNB 1416 may connect with 5G-enabled UEs using a 5G NR interface. The gNB 1416 may connect with a 5G core through an NG interface, which may include an N2 interface or an N3 interface. The ng-eNB 1418 may also connect with the 5G core through an NG interface, but may connect with a UE via an LTE air interface. The gNB 1416 and the ng-eNB 1418 may connect with each other over an Xn interface.

In some embodiments, the NG interface may be split into two parts, an NG user plane (NG-U) interface, which carries traffic data between the nodes of the NG-RAN 1414 and a UPF 1448 (e.g., N3 interface), and an NG control plane (NG-C) interface, which is a signaling interface between the nodes of the NG-RAN 1414 and an AMF 1444 (e.g., N2 interface).

The NG-RAN 1414 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1402 can be configured with multiple BWPs where each BWP configuration has a different SCS. When a BWP change is indicated to the UE 1402, the SCS of the transmission is changed as well. Another use case example of BWP is related to power saving. In particular, multiple BWPs can be configured for the UE 1402 with different amount of frequency resources (for example, PRBs) to support data transmission under different traffic loading scenarios. A BWP containing a smaller number of PRBs can be used for data transmission with small traffic load while allowing power saving at the UE 1402 and in some cases at the gNB 1416. A BWP containing a larger number of PRBs can be used for scenarios with higher traffic load.

The RAN 1404 is communicatively coupled to CN 1420 that includes network elements to provide various functions to support data and telecommunications services to customers/subscribers (for example, users of UE 1402). The components of the CN 1420 may be implemented in one physical node or separate physical nodes. In some embodiments, NFV may be utilized to virtualize any or all of the functions provided by the network elements of the CN 1420 onto physical compute/storage resources in servers, switches, etc. A logical instantiation of the CN 1420 may be referred to as a network slice, and a logical instantiation of a portion of the CN 1420 may be referred to as a network sub-slice.

In some embodiments, the CN 1420 may be an LTE CN 1422, which may also be referred to as an EPC. The LTE CN 1422 may include MME 1424, SGW 1426, SGSN 1428, HSS 1430, PGW 1432, and PCRF 1434 coupled with one another over interfaces (or "reference points") as shown. Functions of the elements of the LTE CN 1422 may be briefly introduced as follows.

The MME 1424 may implement mobility management functions to track a current location of the UE 1402 to facilitate paging, bearer activation/deactivation, handovers, gateway selection, authentication, etc.

The SGW 1426 may terminate an S1 interface toward the RAN and route data packets between the RAN and the LTE CN 1422. The SGW 1426 may be a local mobility anchor point for inter-RAN node handovers and also may provide an anchor for inter-3GPP mobility. Other responsibilities may include lawful intercept, charging, and some policy enforcement.

The SGSN 1428 may track a location of the UE 1402 and perform security functions and access control. In addition, the SGSN 1428 may perform inter-EPC node signaling for mobility between different RAT networks; PDN and S-GW selection as specified by MME 1424; MME selection for handovers; etc. The S3 reference point between the MME 1424 and the SGSN 1428 may enable user and bearer information exchange for inter-3GPP access network mobility in idle/active states.

The HSS 1430 may include a database for network users, including subscription-related information to support the network entities' handling of communication sessions. The HSS 1430 can provide support for routing/roaming, authentication, authorization, naming/addressing resolution, location dependencies, etc. An S6a reference point between the HSS 1430 and the MME 1424 may enable transfer of subscription and authentication data for authenticating/authorizing user access to the LTE CN 1420.

The PGW 1432 may terminate an SGi interface toward a data network (DN) 1436 that may include an application/content server 1438. The PGW 1432 may route data packets between the LTE CN 1422 and the data network 1436. The PGW 1432 may be coupled with the SGW 1426 by an S5 reference point to facilitate user plane tunneling and tunnel management. The PGW 1432 may further include a node for policy enforcement and charging data collection (for example, PCEF). Additionally, the SGi reference point between the PGW 1432 and the data network 14 36 may be an operator external public, a private PDN, or an intra-operator packet data network, for example, for provision of IMS services. The PGW 1432 may be coupled with a PCRF 1434 via a Gx reference point.

The PCRF 1434 is the policy and charging control element of the LTE CN 1422. The PCRF 1434 may be communicatively coupled to the app/content server 1438 to determine appropriate QoS and charging parameters for service flows. The PCRF 1432 may provision associated rules into a PCEF (via Gx reference point) with appropriate TFT and QCI.

In some embodiments, the CN 1420 may be a 5GC 1440. The 5GC 1440 may include an AUSF 1442, AMF 1444, SMF 1446, UPF 1448, NSSF 1450, NEF 1452, NRF 1454, PCF 1456, UDM 1458, and AF 1460 coupled with one another over interfaces (or "reference points") as shown. Functions of the elements of the 5GC 1440 may be briefly introduced as follows.

The AUSF 1442 may store data for authentication of UE 1402 and handle authentication-related functionality. The AUSF 1442 may facilitate a common authentication framework for various access types. In addition to communicating with other elements of the 5GC 1440 over reference points as shown, the AUSF 1442 may exhibit an Nausf service-based interface.

The AMF 1444 may allow other functions of the 5GC 1440 to communicate with the UE 1402 and the RAN 1404 and to subscribe to notifications about mobility events with respect to the UE 1402. The AMF 1444 may be responsible for registration management (for example, for registering UE 1402), connection management, reachability management, mobility management, lawful interception of AMF-related events, and access authentication and authorization. The AMF 1444 may provide transport for SM messages between the UE 1402 and the SMF 1446, and act as a transparent proxy for routing SM messages. AMF 1444 may also provide transport for SMS messages between UE 1402 and an SMSF. AMF 1444 may interact with the AUSF 1442 and the UE 1402 to perform various security anchor and context management functions. Furthermore, AMF 1444 may be a termination point of a RAN CP interface, which may include or be an N2 reference point between the RAN 1404 and the AMF 1444; and the AMF 1444 may be a termination point of NAS (N1) signaling, and perform NAS ciphering and integrity protection. AMF 1444 may also support NAS signaling with the UE 1402 over an N3 IWF interface.

AMF 1444 also supports NAS signaling with the UE 1402 over an N3IWF interface. The N3IWF provides access to untrusted entities. N3IWF may be a termination point for the N2 interface between the (R)AN 1404 and the AMF 1444 for the control plane, and may be a termination point for the N3 reference point between the (R)AN 1414 and the 1448 for the user plane. As such, the AMF 1444 handles N2 signalling from the SMF 1446 and the AMF 1444 for PDU sessions and QoS, encapsulate/de-encapsulate packets for IPSec and N3 tunnelling, marks N3 user-plane packets in the uplink, and enforces QoS corresponding to N3 packet marking taking into account QoS requirements associated with such marking received over N2. N3IWF may also relay UL and DL control-plane NAS signalling between the UE 1402 and AMF 1444 via an N1 reference point between the UE 1402 and the AMF 1444, and relay uplink and downlink user-plane packets between the UE 1402 and UPF 1448. The N3IWF also provides mechanisms for IPsec tunnel establishment with the UE 1402. The AMF 1444 may exhibit an Namf service-based interface, and may be a termination point for an N14 reference point between two AMFs 1444 and an N17 reference point between the AMF 1444 and a 5G-EIR (not shown by FIG. 14).

The SMF 1446 may be responsible for SM (for example, session establishment, tunnel management between UPF 1448 and AN 1408); UE IP address allocation and management (including optional authorization); selection and control of UP function; configuring traffic steering at UPF 1448 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1444 over N2 to AN 1408; and determining SSC mode of a session. SM may refer to management of a PDU session, and a PDU session or "session" may refer to a PDU connectivity service that provides or enables the exchange of PDUs between the UE 1402 and the data network 1436.

The UPF 1448 may act as an anchor point for intra-RAT and inter-RAT mobility, an external PDU session point of interconnect to data network 1436, and a branching point to support multi-homed PDU session. The UPF 1448 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1448 may include an uplink classifier to support routing traffic flows to a data network.

The NSSF 1450 may select a set of network slice instances serving the UE 1402. The NSSF 1450 may also determine allowed NSSAI and the mapping to the subscribed S-NSSAIs, if needed. The NSSF 1450 may also determine the AMF set to be used to serve the UE 1402, or a list of candidate AMFs based on a suitable configuration and possibly by querying the NRF 1454. The selection of a set of network slice instances for the UE 1402 may be triggered by the AMF 1444 with which the UE 1402 is registered by interacting with the NSSF 1450, which may lead to a change of AMF. The NSSF 1450 may interact with the AMF 1444 via an N22 reference point; and may communicate with another NSSF in a visited network via an N31 reference point (not shown). Additionally, the NSSF 1450 may exhibit an Nnssf service-based interface.

The NEF 1452 may securely expose services and capabilities provided by 3GPP network functions for third party, internal exposure/re-exposure, AFs (e.g., AF 1460), edge computing or fog computing systems, etc. In such embodiments, the NEF 1452 may authenticate, authorize, or throttle the AFs. NEF 1452 may also translate information exchanged with the AF 1460 and information exchanged with internal network functions. For example, the NEF 1452 may translate between an AF-Service-Identifier and an internal 5GC information. NEF 1452 may also receive information from other NFs based on exposed capabilities of other NFs. This information may be stored at the NEF 1452 as structured data, or at a data storage NF using standardized interfaces. The stored information can then be re-exposed by the NEF 1452 to other NFs and AFs, or used for other purposes such as analytics. Additionally, the NEF 1452 may exhibit an Nnef service-based interface.

The NRF 1454 may support service discovery functions, receive NF discovery requests from NF instances, and provide the information of the discovered NF instances to the NF instances. NRF 1454 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1454 may exhibit the Nnrf service-based interface.

The PCF 1456 may provide policy rules to control plane functions to enforce them, and may also support unified policy framework to govern network behavior. The PCF 1456 may also implement a front end to access subscription information relevant for policy decisions in a UDR of the UDM 1458. In addition to communicating with functions over reference points as shown, the PCF 1456 exhibit an Npcf service-based interface.

The UDM 1458 may handle subscription-related information to support the network entities' handling of communication sessions, and may store subscription data of UE 1402. For example, subscription data may be communicated via an N8 reference point between the UDM 1458 and the AMF 1444. The UDM 1458 may include two parts, an application front end and a UDR. The UDR may store subscription data and policy data for the UDM 1458 and the PCF 1456, and/or structured data for exposure and application data (including PFDs for application detection, application request information for multiple UEs 1402) for the NEF 1452. The Nudr service-based interface may be exhibited by the UDR 221 to allow the UDM 1458, PCF 1456, and NEF 1452 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1458 may exhibit the Nudm service-based interface.

The AF 1460 may provide application influence on traffic routing, provide access to NEF, and interact with the policy framework for policy control.

AF 1460 provides application influence on traffic routing, provide access to NEF 1452, and interact with the policy framework for policy control. The AF 1460 may influence UPF 1448 (re)selection and traffic routing. Based on operator deployment, when AF 1460 is considered to be a trusted entity, the network operator may permit AF 1460 to interact directly with relevant NFs. Additionally, the AF 1460 may be used for edge computing implementations, In some embodiments, the 5GC 1440 may enable edge computing by selecting operator/$3^{rd}$ party services to be geographically close to a point that the UE 1402 is attached to the network. This may reduce latency and load on the network. To provide edge-computing implementations, the 5GC 1440 may select a UPF 1448 close to the UE 1402 and execute traffic steering from the UPF 1448 to data network 1436 via the N6 interface. This may be based on the UE subscription data, UE location, and information provided by the AF 1460. In this way, the AF 1460 may influence UPF (re)selection and traffic routing. Based on operator deployment, when AF 1460 is considered to be a trusted entity, the network operator may permit AF 1460 to interact directly with relevant NFs. Additionally, the AF 1460 may exhibit an Naf service-based interface.

The data network 1436 may represent various network operator services, Internet access, or third party services that may be provided by one or more servers including, for example, application/content server 1438.

The data network (DN) 1436 may represent various network operator services, Internet access, or third party services that may be provided by one or more servers including, for example, application (app)/content server 1438. The DN 1436 may be an operator external public, a private PDN, or an intra-operator packet data network, for example, for provision of IMS services. In this embodiment, the server 1438 can be coupled to an IMS via an S-CSCF or the I-CSCF. In some implementations, the DN 1436 may represent one or more local area DNs (LADNs), which are DNs 1436 (or DN names (DNNs)) that is/are accessible by a UE 1402 in one or more specific areas. Outside of these specific areas, the UE 1402 is not able to access the LADN/DN 1436.

Additionally or alternatively, the DN 1436 may be an Edge DN 1436, which is a (local) Data Network that supports the architecture for enabling edge applications. In these embodiments, the app server 1438 may represent the physical hardware systems/devices providing app server functionality and/or the application software resident in the cloud or at an edge compute node that performs server function(s). In some embodiments, the app/content server 1438 provides an edge hosting environment that provides support required for Edge Application Server's execution. In some implementations, the DN 1436 may be, or include, one or more edge compute nodes, which may be the same or similar to the edge compute nodes such as those discussed herein.

In some embodiments, the 5GS can use one or more edge compute nodes to provide an interface and offload processing of wireless communication traffic. In these embodiments, the edge compute nodes may be included in, or co-located with one or more RAN 1410, 1414. For example, the edge compute nodes can provide a connection between the RAN 1414 and UPF 1448 in the 5GC 1440. The edge compute nodes can use one or more NFV instances instantiated on virtualization infrastructure within the edge compute nodes to process wireless connections to and from the RAN 1414 and UPF 1448.

These embodiments may be implemented using a variety of edge computing/networking technologies in various combinations and layouts of devices located at the edge of a network. Examples of such edge computing/networking technologies that may implement the embodiments herein include Multi-Access Edge Computing (MEC); Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

The interfaces of the 5GC 1440 include reference points and service-based interfaces. The reference points include: N1 (between the UE 1402 and the AMF 1444), N2 (between RAN 1414 and AMF 1444), N3 (between RAN 1414 and UPF 1448), N4 (between the SMF 1446 and UPF 1448), N5 (between PCF 1456 and AF 1460), N6 (between UPF 1448 and DN 1436), N7 (between SIF 1446 and PCF 1456), N8 (between UDM 1458 and AMF 1444), N9 (between two UPFs 1448), N10 (between the UDM 1458 and the SMF 1446), N11. (between the AMF 1444 and the SMF 1446), N12 (between AUSF 1442 and AMF 1444), N13 (between AUSF 1442 and UDM 1458), N14 (between two AMFs 1444; not shown), N15 (between PCF 1456 and AMF 1444 in case of a non-roaming scenario, or between the PCF 1456 in a visited network and AMF 1444 in case of a roaming scenario), N16 (between two SMFs 1446; not shown), and N22 (between AMF 1444 and NSSF 1450). Other reference point representations not shown in FIG. 14. can also be used. The service-based representation of FIG. 14. represents NFs within the control plane that enable other authorized NFs to access their services. The service-based interfaces (SBIs) include: Namf (SBI exhibited by AMF 1444), Nsmf (SBI exhibited by SMF 1446), Nnef (SBI exhibited by NEF 1452), Npcf (SBI exhibited by PCF 1456), Nudm (SBI exhibited by the UDM 1458), Naf (SBI exhibited by AF 1460), Nnrf (SBI exhibited by NRF 1454), Nnssf (SBI exhibited by NSSF 1450), Nausf (SBI exhibited by AUSF 1442). Other service-based interfaces (e.g., Nudr, N5g-eir, and Nudsf) not shown in FIG. 14. can also be used. In some embodiments, the NEF 1452 can provide an interface to edge compute nodes 1436x, which can be used to process wireless connections with the RAN 1414.

As discussed previously, the network 1400 may include an SMSF, which is responsible for SMS subscription checking and verification, and relaying SM messages to/from the UE 1402 to/from other entities, such as an SMS-GMSC/IWMS/SMS-router. The SMS may also interact with AMF 1442 and UDM 1458 for a notification procedure that the UE 1402 is available for SMS transfer (e.g., set a UE not reachable flag, and notifying UDM 1458 when UE 1402 is available for SMS).

The 5GS may also include an SCP (or individual instances of the SCP) that supports indirect communication (see e.g., 3GPP TS 23.501 section 7.1.1); delegated discovery (see e.g., 3GPP TS 23.501 section 7.1.1); message forwarding and routing to destination NF/NF service(s), communication security (e.g., authorization of the NF Service Consumer to access the NF Service Producer API) (see e.g., 3GPP TS 33.501), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., 3GPP TS 23.501 section 6.3). Load balancing, monitoring, overload control functionality provided by the SCP may be implementation specific. The SCP may be deployed in a distributed manner. More than one SCP can be present in the communication path between various NF Services. The SCP, although not an NF instance, can also be deployed distributed, redundant, and scalable.

FIG. 15 schematically illustrates a wireless network 1500 in accordance with various embodiments. The wireless network 1500 may include a UE 1502 in wireless communication with an AN 1504. The UE 1502 and AN 1504 may be similar to, and substantially interchangeable with, like-named components described elsewhere herein.

The UE 1502 may be communicatively coupled with the AN 1504 via connection 1506. The connection 1506 is illustrated as an air interface to enable communicative coupling, and can be consistent with cellular communications protocols such as an LTE protocol or a 5G NR protocol operating at mmWave or sub-6 GHz frequencies.

The UE 1502 may include a host platform 1508 coupled with a modem platform 1510. The host platform 1508 may include application processing circuitry 1512, which may be coupled with protocol processing circuitry 1514 of the modem platform 1510. The application processing circuitry 1512 may run various applications for the UE 1502 that source/sink application data. The application processing circuitry 1512 may further implement one or more layer operations to transmit/receive application data to/from a data network. These layer operations may include transport (for example UDP) and Internet (for example, IP) operations The protocol processing circuitry 1514 may implement one or more of layer operations to facilitate transmission or reception of data over the connection 1506. The layer operations implemented by the protocol processing circuitry 1514 may include, for example, MAC, RLC, PDCP, RRC and NAS operations.

The modem platform 1510 may further include digital baseband circuitry 1516 that may implement one or more layer operations that are "below" layer operations performed by the protocol processing circuitry 1514 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1510 may further include transmit circuitry 1518, receive circuitry 1520, RF circuitry 1522, and RF front end (RFFE) 1524, which may include or connect to one or more antenna panels 1526. Briefly, the transmit circuitry 1518 may include a digital-to-analog converter, mixer, intermediate frequency (IF) components, etc.; the receive circuitry 1520 may include an analog-to-digital converter, mixer, IF components, etc.; the RF circuitry 1522 may include a low-noise amplifier, a power amplifier, power tracking components, etc.; RFFE 1524 may include filters (for example, surface/bulk acoustic wave filters), switches, antenna tuners, beamforming components (for example, phase-array antenna components), etc. The selection and arrangement of the components of the transmit circuitry 1518, receive circuitry 1520, RF circuitry 1522, RFFE 1524, and antenna panels 1526 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1514 may include one or more instances of control circuitry (not shown) to provide control functions for the transmit/receive components.

A UE reception may be established by and via the antenna panels 1526, RFFE 1524, RF circuitry 1522, receive circuitry 1520, digital baseband circuitry 1516, and protocol processing circuitry 1514. In some embodiments, the antenna panels 1526 may receive a transmission from the AN 1504 by receive-beamforming signals received by a plurality of antennas/antenna elements of the one or more antenna panels 1526.

A UE transmission may be established by and via the protocol processing circuitry 1514, digital baseband circuitry 1516, transmit circuitry 1518, RF circuitry 1522, RFFE 1524, and antenna panels 1526. In some embodiments, the transmit components of the UE 1504 may apply a spatial filter to the data to be transmitted to form a transmit beam emitted by the antenna elements of the antenna panels 1526.

Similar to the UE 1502, the AN 1504 may include a host platform 1528 coupled with a modem platform 1530. The host platform 1528 may include application processing circuitry 1532 coupled with protocol processing circuitry 1534 of the modem platform 1530. The modem platform may further include digital baseband circuitry 1536, transmit circuitry 1538, receive circuitry 1540, RF circuitry 1542, RFFE circuitry 1544, and antenna panels 1546. The components of the AN 1504 may be similar to and substantially interchangeable with like-named components of the UE 1502. In addition to performing data transmission/reception as described above, the components of the AN 1508 may perform various logical functions that include, for example, RNC functions such as radio bearer management, uplink and downlink dynamic radio resource management, and data packet scheduling.

Figure 16:
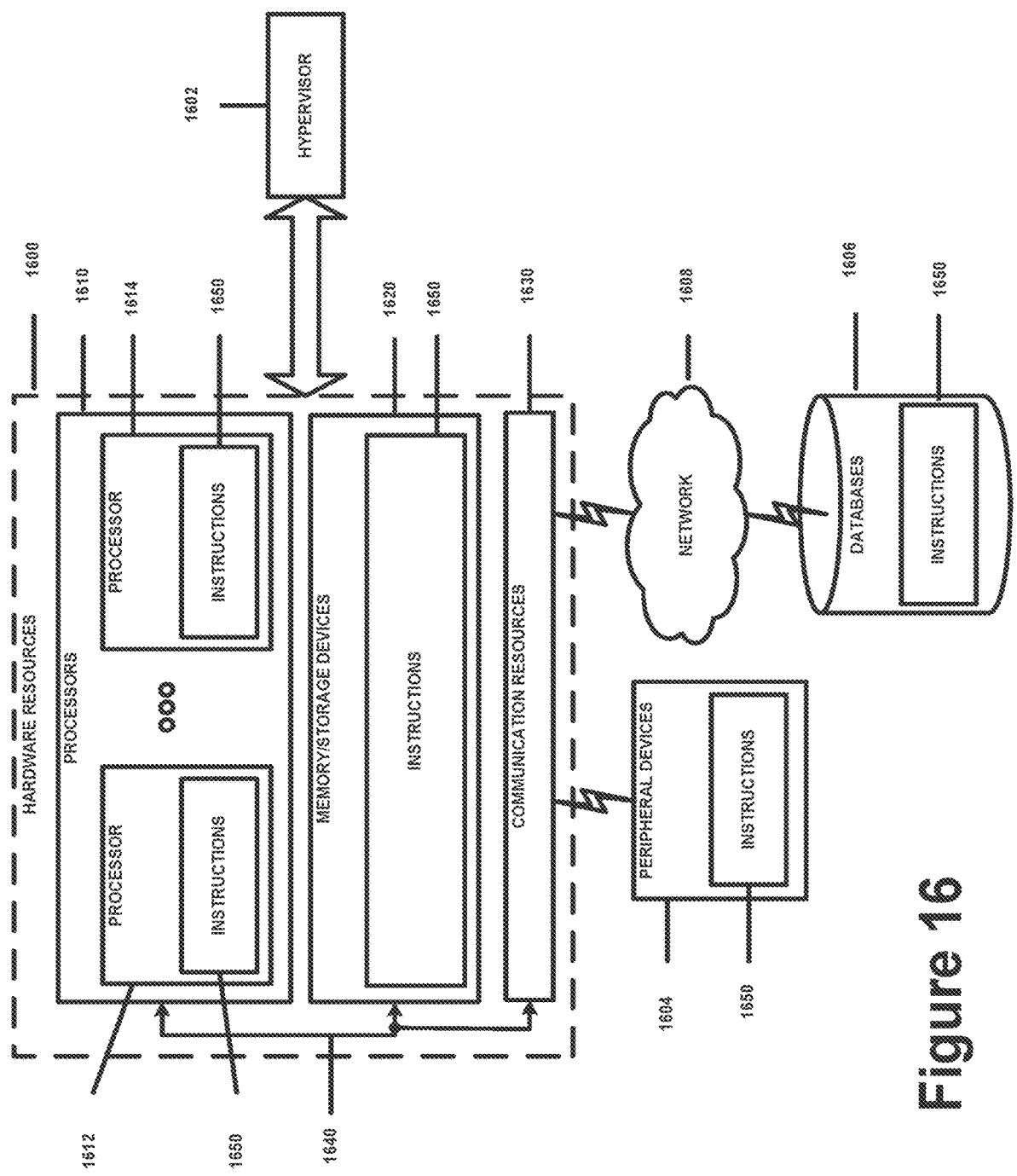
FIG. 16 is a block diagram illustrating components, according to some example embodiments, able to read instructions from a machine-readable or computer-readable medium (e.g., a non-transitory machine-readable storage medium) and perform any one or more of the methodologies discussed herein.

FIG. 16 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1600 including one or more processors (or processor cores) 1610, one or more memory/storage devices 1620, and one or more communication resources 1630, each of which may be communicatively coupled via a bus 1640 or other interface circuitry. For embodiments where node virtualization (e.g., NFV) is utilized, a hypervisor 1602 may be executed to provide an execution environment for one or more network slices/sub-slices to utilize the hardware resources 1600.

The processors 1610 may include, for example, a processor 1612 and a processor 1614. The processors 1610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radiofrequency integrated circuit (RFIC), another processor (including those discussed herein), or any suitable combination thereof.

The memory/storage devices 1620 may include main memory, disk storage, or any suitable combination thereof. The memory/storage devices 1620 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1630 may include interconnection or network interface controllers, components, or other suitable devices to communicate with one or more peripheral devices 1604 or one or more databases 1606 or other network elements via a network 1608. For example, the communication resources 1630 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1650 may comprise software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources 1600 from any combination of the peripheral devices 1604 or the databases 1606. Accordingly, the memory of processors 1610, the memory/storage devices 1620, the peripheral devices 1604, and the databases 1606 are examples of computer-readable and machine-readable media.

Examples of Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

Figure 17:
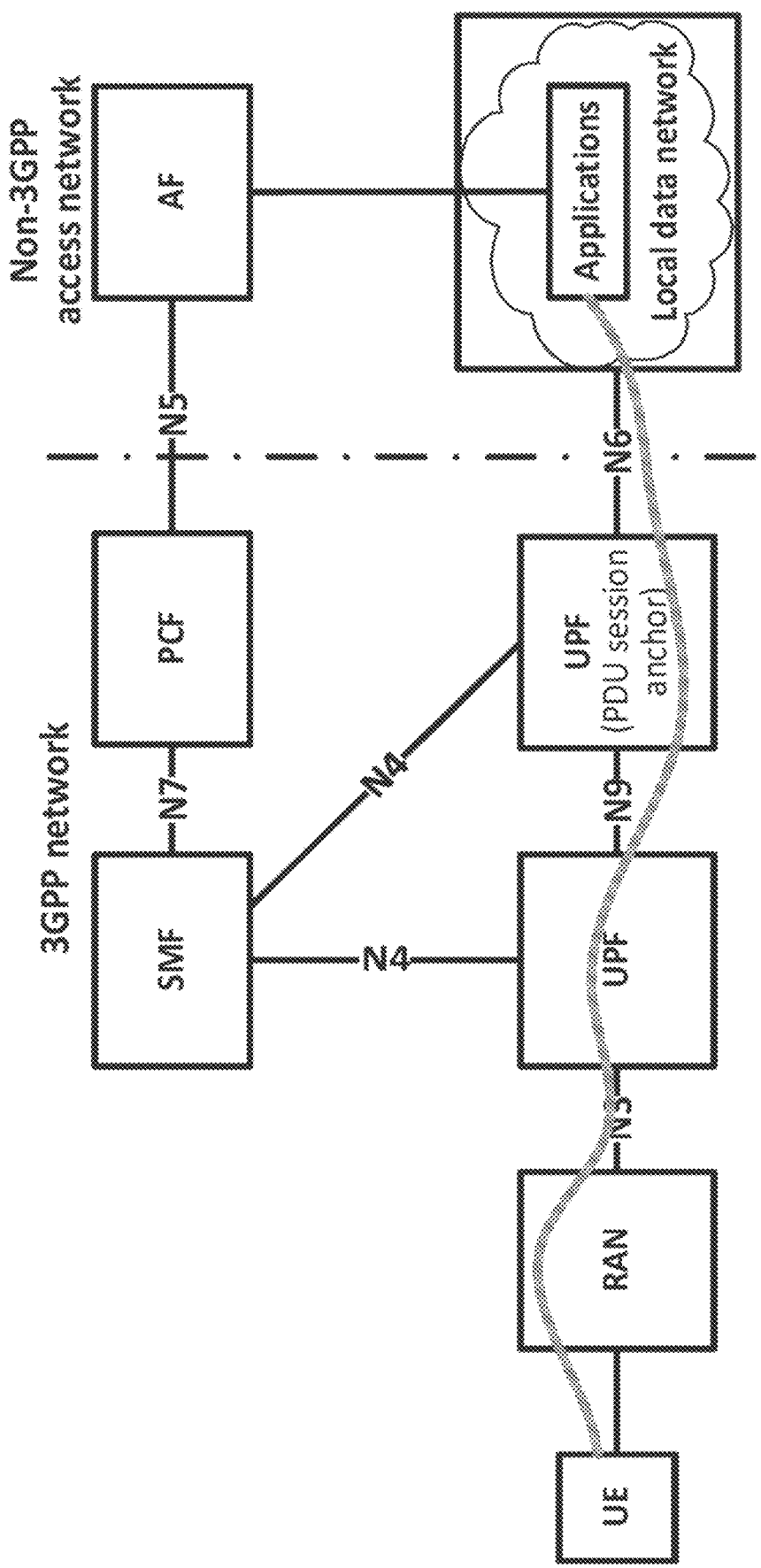
FIG. 17 illustrates an example of an 5G edge computing network in accordance with various embodiments.

5G networks extend beyond the traditional mobile broadband services to provide various new services such as IoT, industrial control, autonomous driving, mission critical communications, etc. that may have ultra-low latency, ultra-high reliability, and high data capacity requirements due to safety and performance concerns. The edge computing feature has been added in the 5GC system architecture to support such services by hosting some applications closer in the local data network in order to reduce the end-to-end latency and the load on the transport network. An example of an 5G edge computing network is shown by FIG. 17.

Figure 18:
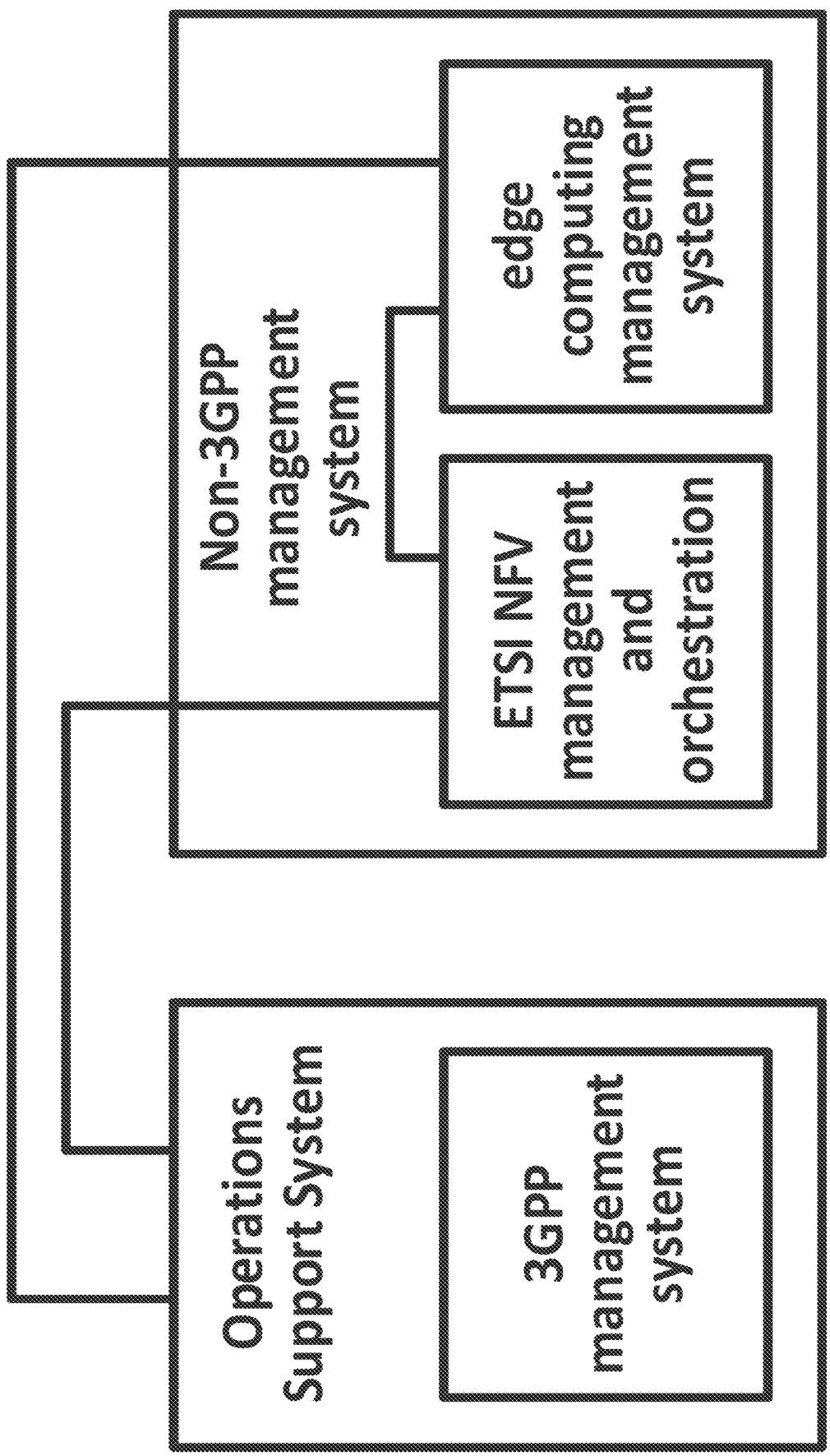
FIG. 18 illustrates an example of an architecture to enable the deployment of edge applications in accordance with various embodiments.

FIG. 18 shows an example of an architecture to enable the deployment of edge applications, where the Application Client is an application resident in a UE performing client function(s), and the Edge Application Server (EAS) is an application server resident in the Edge Data Network that is the local data network, performing server functions. The Application Client connects to the Edge Application Server in order to avail (or obtain) the services of the application with the benefits of Edge Computing.

The deployment of edge computing in 3GPP networks requires cooperation with other SDOs, as AF and AS are not 3GPP defined nodes. The deployment of network functions in 3GPP networks and non-3GPP networks to support edge computing requires communication between 3GPP management system and non-3GPP management systems.

FIG. 18 shows an example peer-to-peer (P2P) edge computing management deployment scenario where the deployment of edge computing in 3GPP networks needs communication among 3GPP management system, non-3GPP management system, including edge computing management system, and ETSI NFV MANO.

In the example of FIG. 18, the 3GPP management system can initiate the edge computing deployment by requesting the edge computing management system to deploy the local data network, and NFVO to connect the UPF and local data network with the QoS for N6 requirements for the connection (e.g., virtual link) between UPF and local data network. The edge computing management system can initiate the edge computing deployment by requesting the 3GPP management system to deploy the UPF, and NFVO to connect the UPF and local data network with the QoS requirements for the connection between UPF and local data network.

Figure 19:
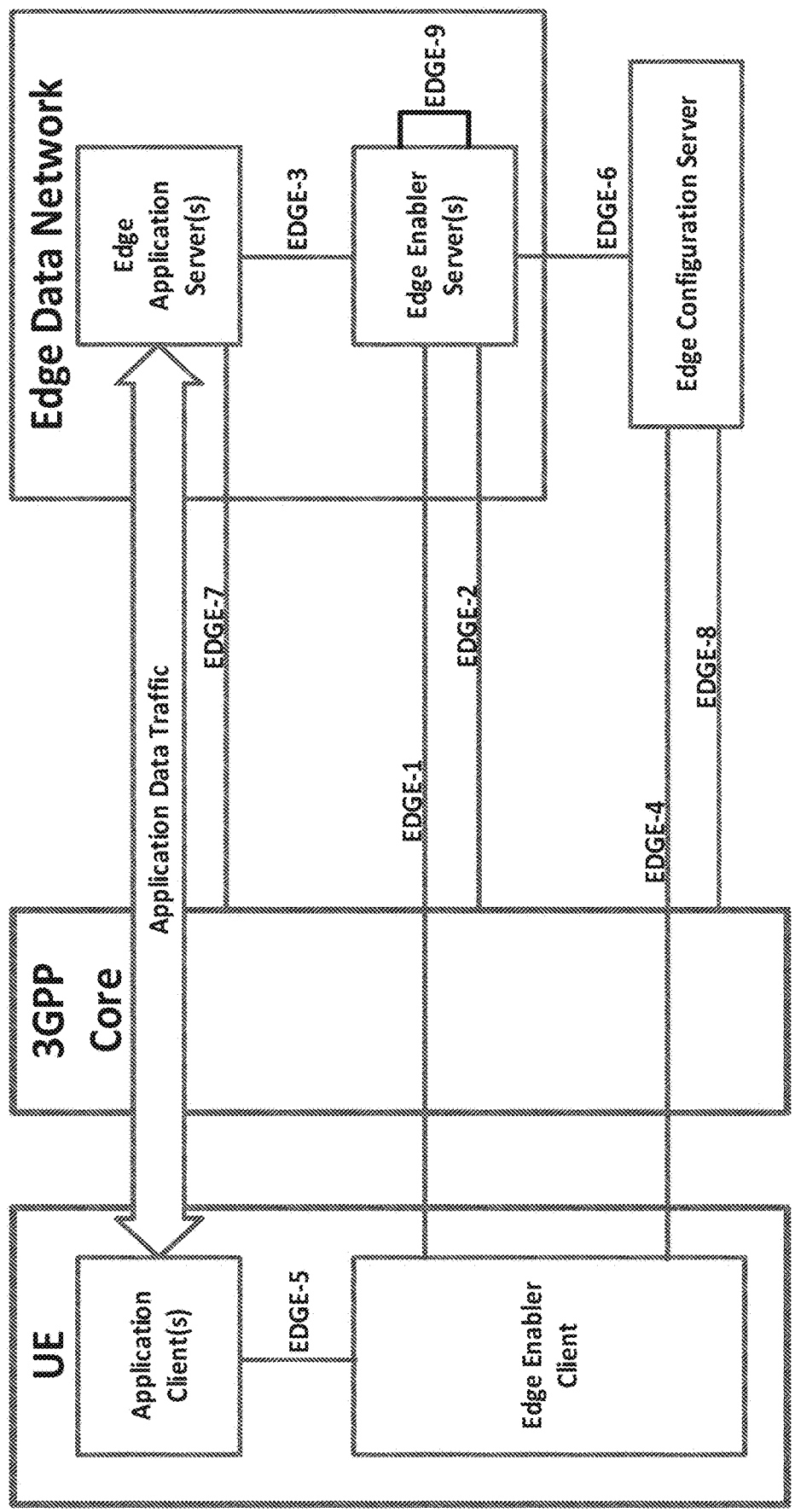
FIG. 19 illustrates an example of an application architecture for enabling Edge Applications in accordance with various embodiments.

FIG. 19 shows an example of an application architecture for enabling Edge Applications. The Edge Data Network is a local Data Network (e.g., DN 1436 of FIG. 14 infra). Edge Application Server(s) and the Edge Enabler Server are contained within the EDN. The Edge Configuration Server provides configurations related to the EES, including details of the Edge Data Network hosting the EES. The UE contains Application Client(s) and the Edge Enabler Client. The Edge Application Server(s), the Edge Enabler Server, and the Edge Configuration Server may interact with the 3GPP Core Network.

The interactions related to enabling Edge Computing, between the Edge Enabler Server and the Edge Enabler Client are supported by the EDGE-1 reference point. EDGE-1 reference point supports: Registration and de-registration of the Edge Enabler Client to the Edge Enabler Server; Retrieval and provisioning of configuration information for the UE; and Discovery of Edge Application Servers available in the Edge Data Network.

The interactions related to Edge Enabler Layer, between the Edge Enabler Server and the 3GPP Network are supported by the EDGE-2 reference point. EDGE-2 reference point supports: Access to 3GPP Network functions and APIs for retrieval of network capability information, e.g., via SCEF and NEF APIs, and with the EES acting as a trusted AF in 5GC. EDGE-2 reference point reuses SA2 defined 3GPP reference points, N33, or interfaces of EPS or 5GS considering different deployment models.

The interactions related to Edge Enabler Layer, between the Edge Enabler Server and the Edge Application Servers are supported by the EDGE-3 reference point. EDGE-3 reference point supports: Registration of Edge Application Servers with availability information (e.g., time constraints, location constraints); De-registration of Edge Application Servers from the Edge Enabler Server; and Providing access to network capability information (e.g., location information). The following cardinality rules apply for EDGE-3 (Between EAS and EES): a) One EAS may communicate with only one EES; b) One EES may communicate with one or more EAS(s) concurrently.

The interactions related to Edge Enabler Layer, between the Edge Data Network Configuration Server and the Edge Enabler Client are supported by the EDGE-4 reference point. EDGE-4 reference point supports: Provisioning of Edge Data Network configuration information to the Edge Enabler Client in the UE.

The interactions between Application Client(s) and the Edge Enabler Client in the UE are supported by the EDGE-5 reference point. EDGE-5 reference point supports: Obtaining information about Edge Application Servers that Application Client require to connect; Notifications about events related to the connection between Application Clients and their corresponding Edge Application Servers, such as: when an Application Client needs to reconnect to a different Edge Application Server; Providing Application Client information (such as its profile) to be used for various tasks such as, identifying the appropriate Edge Application Server instance to connect to; and Provide the identity of the desired Edge Application Server to the Edge Enabler Client to enable it to use that identity as a filter when requesting information about Edge Application Servers.

The interactions related to Edge Enabler Layer, between the Edge Data Network Configuration Server and the Edge Enabler Server are supported by the EDGE-6 reference point. EDGE-6 reference point supports: Registration of Edge Enabler Server information to the Edge Enabler Network Configuration Server.

The interactions related to Edge Enabler Layer, between the Edge Enabler Server and the 3GPP Network are supported by the EDGE-2 (or EDGE-7) reference point. EDGE-7 reference point supports: Access to 3GPP Network functions and APIs for retrieval of network capability information, e.g., via SCEF and NEF APIs, and with the EAS acting as a trusted AF in 5GC. EDGE-7 reference point reuses SA2 defined 3GPP reference points, N6, or interfaces of EPS or 5GS considering different deployment models.

The interactions between the Edge Data Network Configuration Server and the 3GPP Network are supported by the EDGE-8 reference point. EDGE-8 reference point supports: Edge Data Network configurations provisioning to the 3GPP network utilizing network exposure services.

EDGE-9 reference point enables interactions between two Edge Enabler Servers. EDGE-9 reference point may be provided between EES within different EDN and within the same EDN.

The Edge Enabler Server (EES) provides supporting functions needed for Edge Application Servers and Edge Enabler Client. Functionalities of Edge Enabler Server are: a) provisioning of configuration information to Edge Enabler Client, enabling exchange of application data traffic with the Edge Application Server; b) supporting the functionalities of API invoker and API exposing function; c) interacting with 3GPP Core Network for accessing the capabilities of network functions either directly (e.g., via PCF) or indirectly (e.g., via SCEF/NEF/SCEF+NEF); and d) support the functionalities of application context transfer.

The following cardinality rules apply for Edge Enabler Server: a) One or more EES(s) may be located in an EDN; b) One or more EES(s) may be located in an EDN per ECSP The Edge Application Server (EAS) is the application server resident in the Edge Data Network, performing the server functions. The Application Client connects to the Edge Application Server in order to avail the services of the application with the benefits of Edge Computing. It is possible that the server functions of an application are available only as Edge Application Server. However, if the server functions of the application are available as both, Edge Application Server and an Application Server resident in cloud, it is possible that the functions of the Edge Application Server and the Application Server are not the same. In addition, if the functions of the Edge Application Server and the Application Server are different, the Application Data Traffic may also be different.

The Edge Application Server may consume the 3GPP Core Network capabilities in different ways, such as: a) it may invoke 3GPP Core Network function APIs directly, if it is an entity trusted by the 3GPP Core Network; b) it may invoke 3GPP Core Network capabilities through the Edge Enabler Server; and c) it may invoke the 3GPP Core Network capability through the capability exposure functions (e.g., SCEF or NEF).

The following cardinality rules apply for Edge Application Servers: a) One or more EAS(s) may be located in an EDN. The EAS(s) belonging to the same EAS ID can be provided by multiple ECSP(s) in an EDN.

The Edge Enabler Server ID (EESID) is the FQDN of that Edge Enabler Server and each Edge Enabler Server ID is unique within PLMN domain.

The Edge Application Server ID (EASID) identifies a particular application for e.g., SA6Video, SA6Game etc. For example, all Edge SA6Video Servers will share the same Edge Application Server ID. The format for the EAS ID is out of scope of this specification. Table E28.2.4-1 shows Edge Application Server Profile IEs

TABLE E28.2.4-1

Edge Application Server Profile

| Information element | Status | Description |
| --- | --- | --- |
| EAS ID | M | The identifier of the EAS |
| EAS Endpoint | M | Endpoint information (e.g., URI, FQDN, IP address) used to communicate with the EAS. This information may be discovered by EEC and exposed to Application Clients so that application clients can establish contact with the EAS. |
| Application Client ID(s) | O | Identifies the Application Client(s) that can be served by the EAS |
| EAS Provider Identifier | O | The identifier of the EAS Provider |
| EAS Type | O | The category or type of EAS (e.g., V2X) |
| EAS description | O | Human-readable description of the EAS |
| EAS Schedule | O | The availability schedule of the EAS (e.g., time windows) |
| EAS Service Area | O | The geographical service area that the EAS serves |
| EAS Service KPIs | O | Service characteristics provided by EAS, detailed in Table 8.2.5-1 |
| Service continuity support | O | Indicates if the EAS supports service continuity or not. |
| EAS Availability Reporting Period | O | The availability reporting period (e.g., heart beat period) that indicates to the EES how often it needs to check the EAS's availability after a successful registration. |
| EAS Required Service APIs | O | A list of the Service APIs that are required by the EAS |
| EAS Status | O | The status of the EAS (e.g., enabled, disabled, etc.) |

Edge Application Server Service KPIs provide information about service characteristics provided by the Edge Application Server (see e.g., table E28.2.5-1)

TABLE E28.2.5-1

Edge Application Server Service KPIs

| Information element | Status | Description |
|---|---|---|
| Maximum Request rate | O | Maximum request rate from the Application Client supported by the server. |
| Maximum Response time | O | The maximum response time advertised for the Application Client's service requests. |
| Availability | O | Advertised percentage of time the server is available for the Application Client's use. |
| Available Compute | O | The maximum compute resource available for the Application Client. |
| Available Graphical Compute | O | The maximum graphical compute resource available for the Application Client. |
| Available Memory | O | The maximum memory resource available for the Application Client. |
| Available Storage | O | The maximum storage resource available for the Application Client. |
| Connection Bandwidth | O | The connection bandwidth in Kbit/s advertised for the Application Client's use. |

NOTE:
The maximum response time includes the round-trip time of the request and response packet, the processing time at the server and the time required by the server to consume 3GPP Core Network capabilities, if any.

The Edge Enabler Server profile includes information about the EES and the services it provides (see e.g., table E28.2.6-1).

TABLE E28.2.6-1

Edge Enabler Server Profile

| Information element | Status | Description |
|---|---|---|
| EES ID | M | The identifier of the EES |
| EES Endpoint | M | Endpoint information (e.g., URI, FQDN, IP address) used to communicate with the EES. This information is provided to the EEC to connect to the EES. |
| Edge Application Server Profiles | M | List of Edge Application Servers registered with the EES. |
| EES Provider Identifier | O | The identifier of the EES Provider (such as ECSP) |

The network capability exposure to Edge Application Server(s) depends on the deployment scenarios and the business relationship of the ASP/ECSP with the PLMN operator. The following mechanisms are supported: Direct network capability exposure and/or Network capability exposure via Edge Enabler Server.

In some implementations, the network capability exposure to EAS(s) depends on the deployment scenarios and the business relationship of the ASP/ECSP with the PLMN operator. The following mechanisms are supported: Direct network capability exposure and/or Network capability exposure via Edge Enabler Server. In some implementations, the charging functionalities with different deployment options depending on business relationships among Edge Application Service Provider, Edge Computing Service Provider, and SFC service provider are out of scope of the present disclosure (SA5 study).

Figure 21:
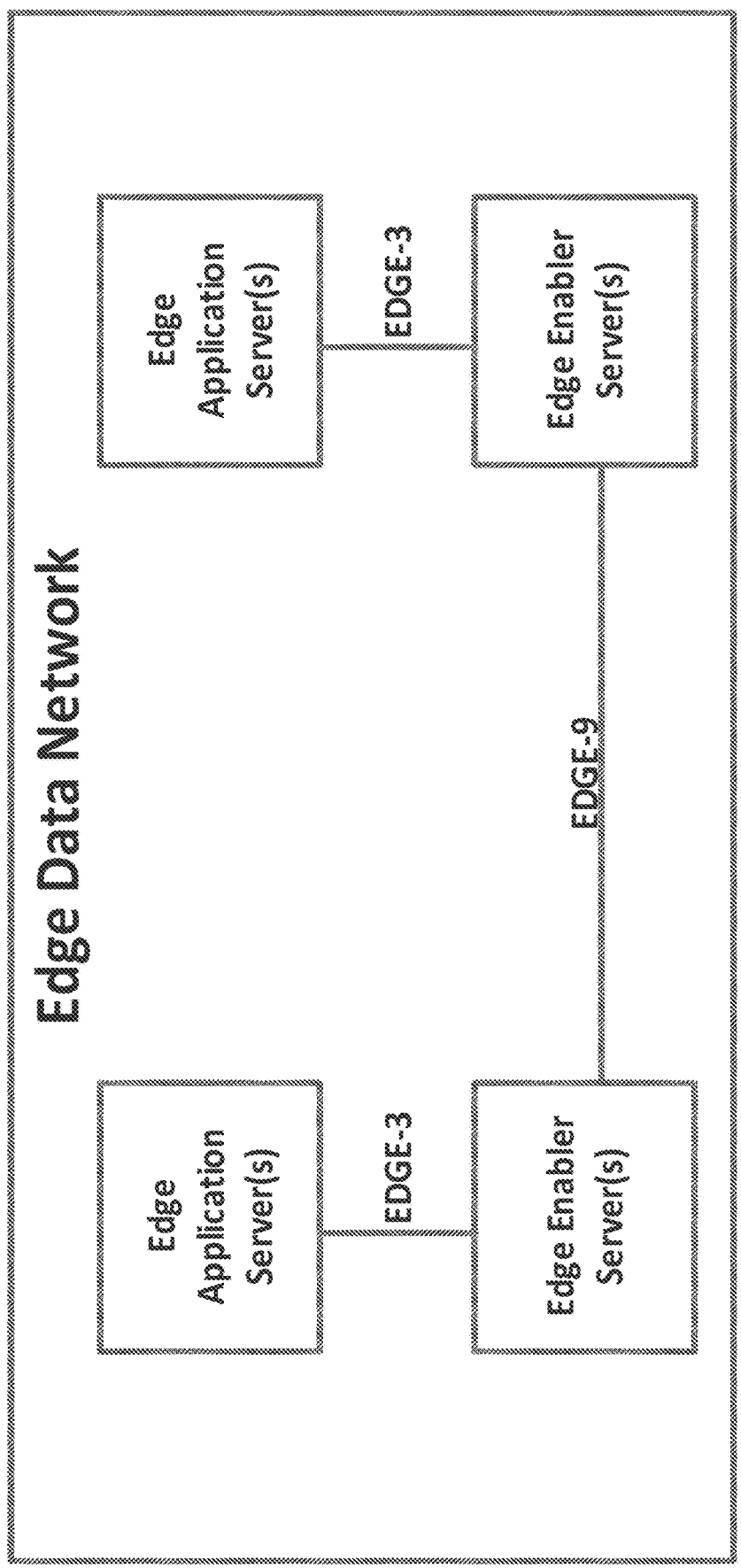
FIG. 21 illustrates an example of an EDGE-9 reference point being provided within the same EDN in accordance with various embodiments.

The EDGE-9 reference point enables interactions between two Edge Enabler Servers. The EDGE-9 reference point may be provided between EES within different EDNs as shown by FIG. 20 and within the same EDN as shown by FIG. 21.

Figure 22:
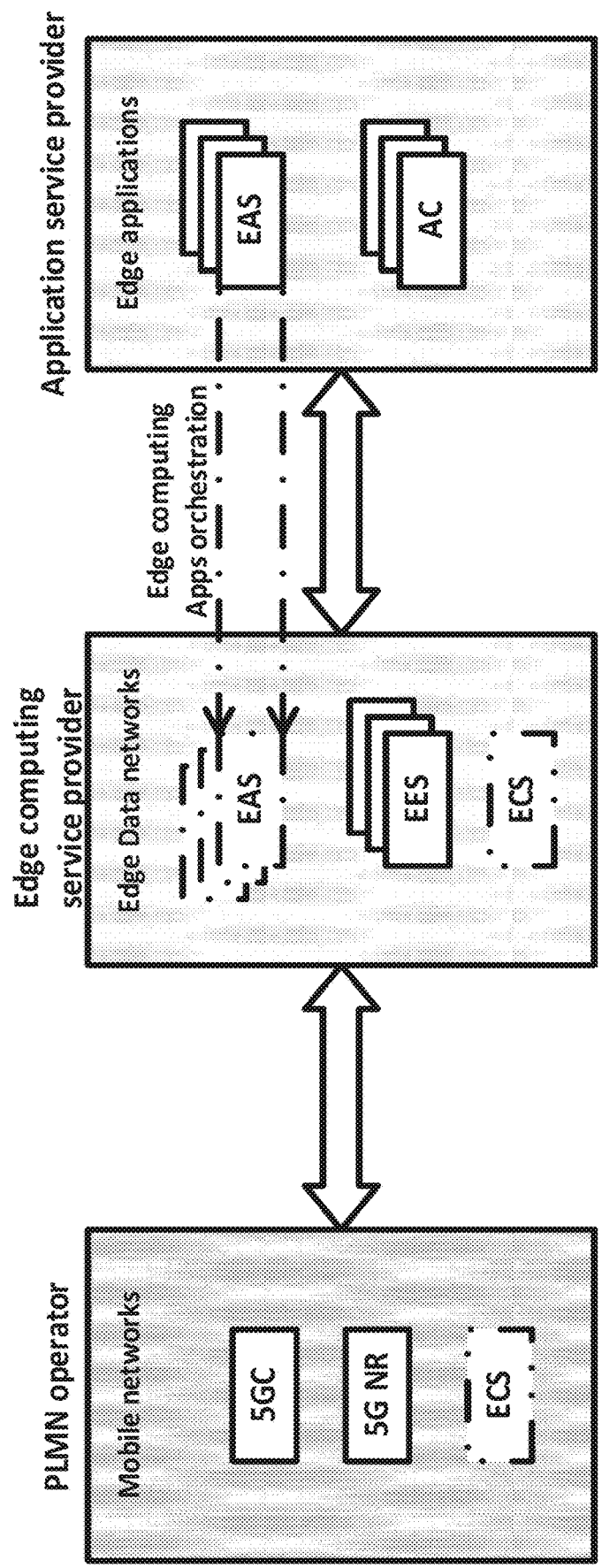
FIG. 22 illustrates an example of roles and relationship of service providers involved in the deployment of edge computing services in accordance with various embodiments.

FIG. 22 shows the roles and relationship of service providers involved in the deployment of edge computing services. The application service provider (ASP) is responsible for the creation of edge application servers (EAS) and application clients (AC). The edge computing service provider (ECSP) is responsible for the deployment of edge data networks (EDN) that contain EAS and edge enable server (EES) that provides the configuration information to Edge Enabler Client (EEC), enabling AC to exchange application data traffic with the EAS. PLMN operator is responsible for the deployment of 5G network functions, such as 5GC and 5G NR.

The end user is the consumer of the applications/services provided by the ASP and can have ASP service agreement with a single or multiple application service providers. The end user has a PLMN subscription arrangement with the PLMN operator. The UE used by the end user is allowed to be registered on the PLMN operator network. The ASP consumes the edge services (e.g., infrastructure, platform, etc.) provided by the edge computing service provider (ECSP) and can have ECSP service agreement(s) with a single or multiple ECSP. The ECSP may be a mobile network operator or a 3rd party service provider offering Edge Computing services. A single PLMN operator can have the PLMN operator service agreement with a single or multiple edge computing service providers. A single ECSP can have PLMN operator service agreement with a single or multiple PLMN operators which provide edge computing support. The ECSP and the PLMN operator can be part of the same organization or different organizations.

Example Procedures

Figure 23:
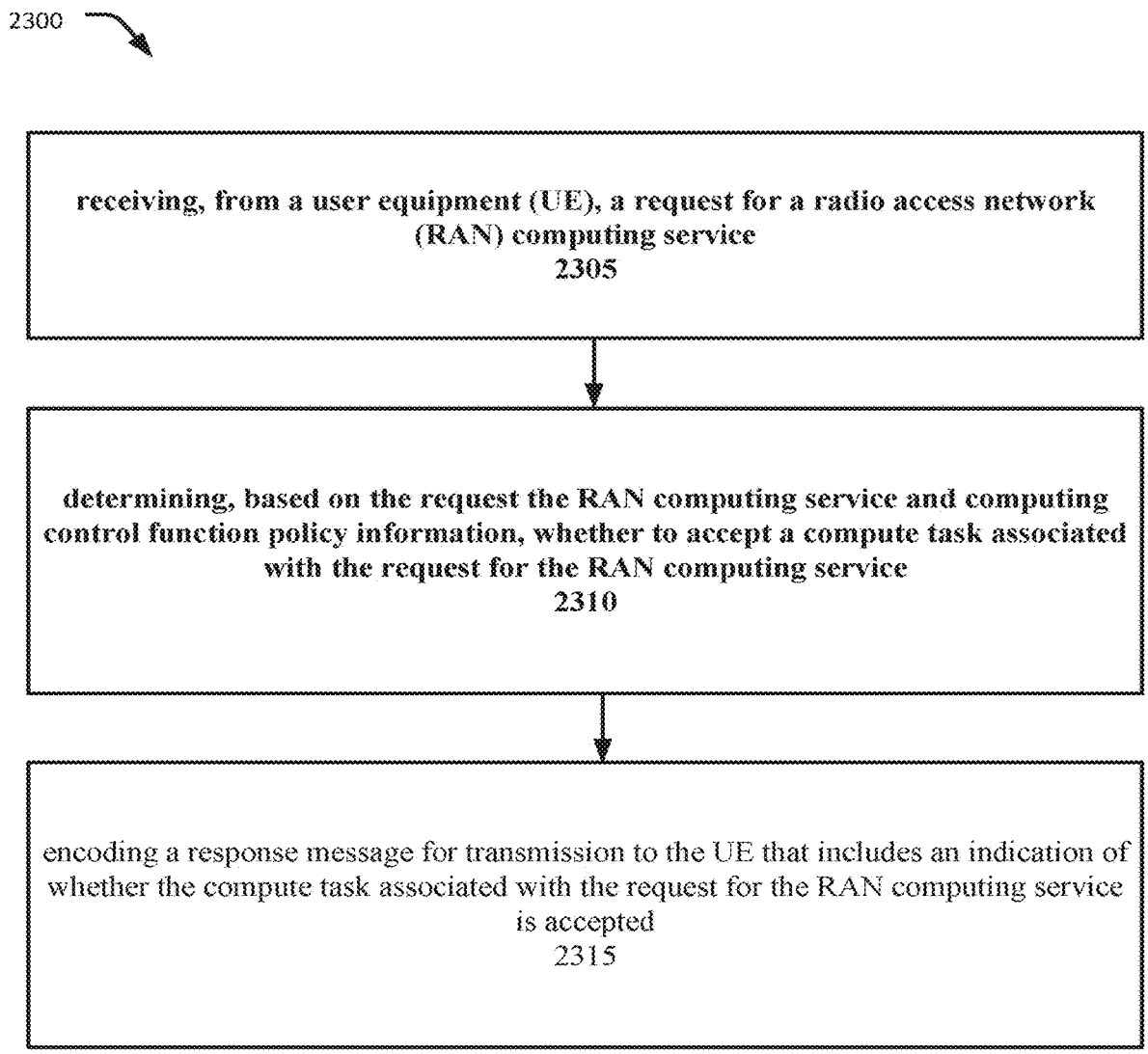
FIG. 23 depicts an example procedure for practicing the various embodiments discussed herein.

In some embodiments, the electronic device(s), network(s), system(s), chip(s) or component(s), or portions or implementations thereof, of FIGS. 1-3, 14-16, or some other figure herein, may be configured to perform one or more processes, techniques, or methods as described herein, or portions thereof. One such process is depicted in FIG. 23. For example, the process 2300 may include, at 2305, receiving, from a user equipment (UE), a request for a radio access network (RAN) computing service. The process further includes, at 2310, determining, based on the request the RAN computing service and computing control function policy information, whether to accept a compute task associated with the request for the RAN computing service. The process further includes, at 2315, encoding a response message for transmission to the UE that includes an indication of whether the compute task associated with the request for the RAN computing service is accepted.

Figure 24:
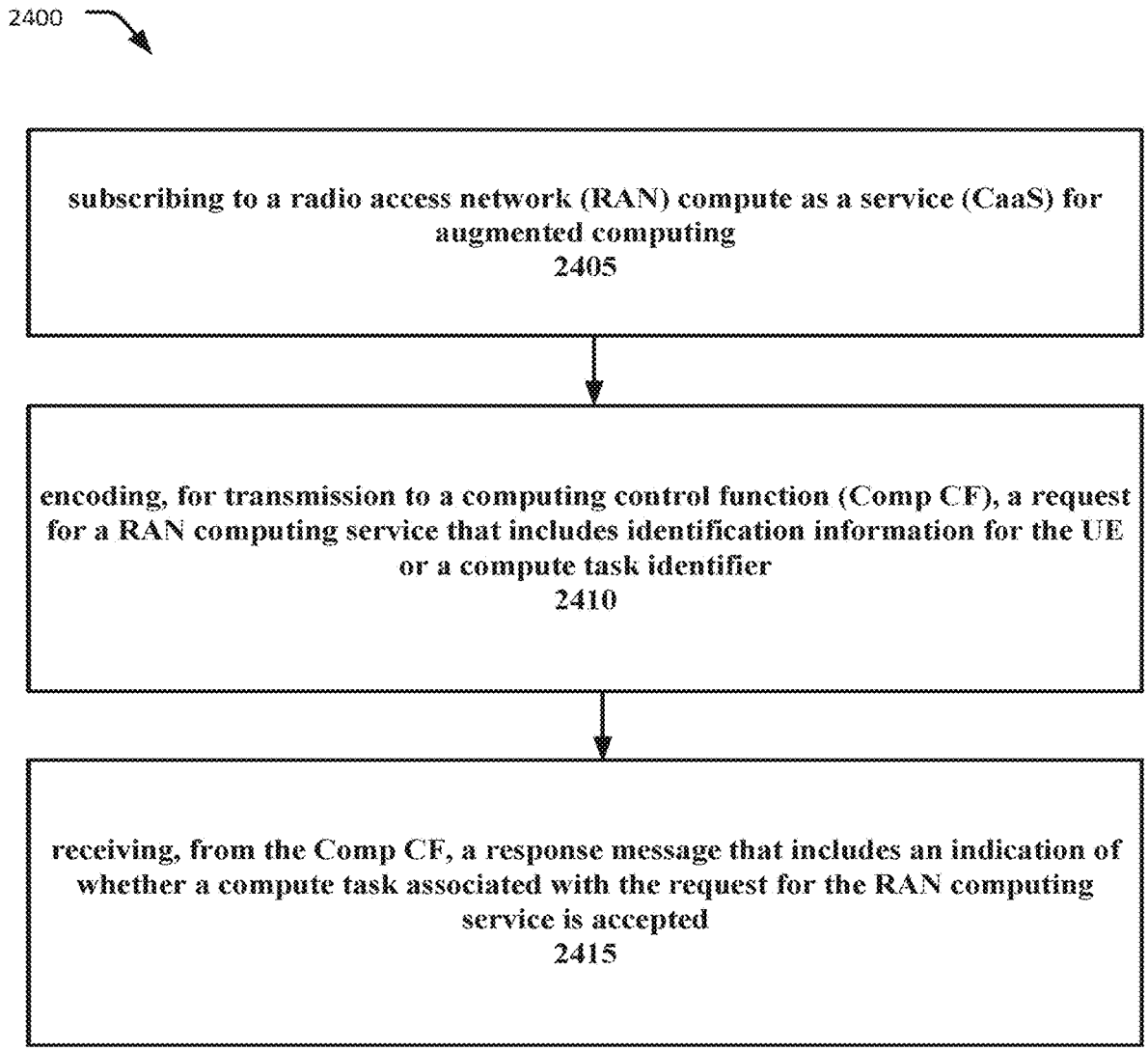
FIG. 24 depicts another example procedure for practicing the various embodiments.

Another such process is illustrated in FIG. 24. In this example process 2400 includes, at 2405, subscribing to a radio access network (RAN) compute as a service (CaaS) for augmented computing. The process further includes, at 2410, encoding, for transmission to a computing control function (Comp CF), a request for a RAN computing service that includes identification information for the UE or a compute task identifier. The process further includes, at 2415, receiving, from the Comp CF, a response message that includes an indication of whether a compute task associated with the request for the RAN computing service is accepted.

Another such process is illustrated in FIG. 25. In this example, process 2500 includes, at 2505, encoding a radio resource control (RRC) message for transmission to a next-generation NodeB (gNB) that includes an RRC radio access network (RAN) compute setup request including UE compute-specific identification (ID) information and an encapsulated message to be transported onto an interface between a RAN computing control function (Comp CF) and a central unit control plane (CU-CP). The process further includes, at 2510, receiving, from the RAN Comp CF, a RAN compute session establishment response.

Figure 26:
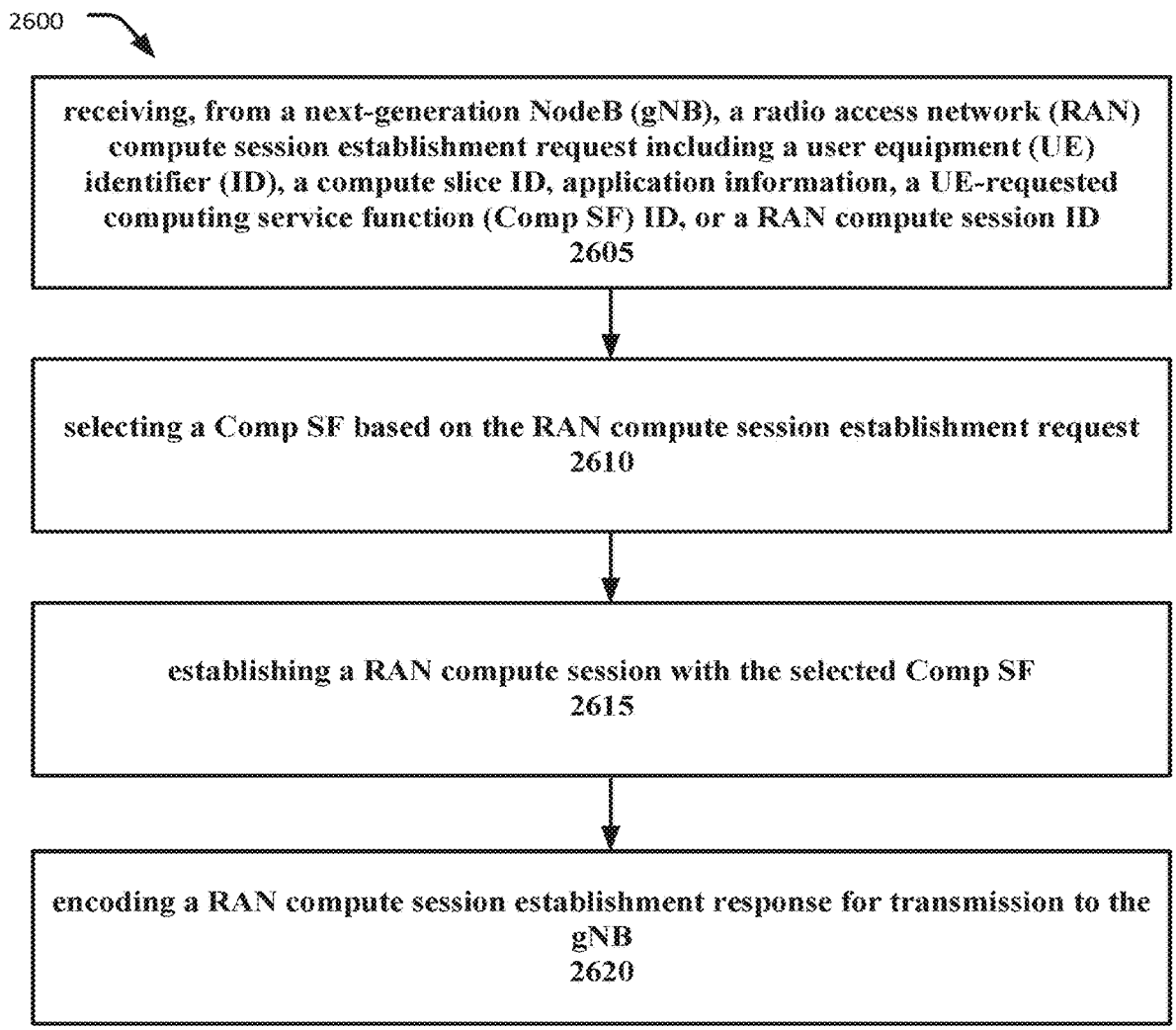
FIG. 26 depicts another example procedure for practicing the various embodiments.

Another such process is illustrated in FIG. 26. In this example, process 2600 includes, at 2605, receiving, from a next-generation NodeB (gNB), a radio access network (RAN) compute session establishment request including a user equipment (UE) identifier (ID), a compute slice ID, application information, a UE-requested computing service function (Comp SF) ID, or a RAN compute session ID. The process further includes, at 2610, selecting a Comp SF based on the RAN compute session establishment request. The process further includes, at 2615, establishing a RAN compute session with the selected Comp SF. The process further includes, at 2620, encoding a RAN compute session establishment response for transmission to the gNB.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method in which a UE has a compute task to be offloaded to the RAN (e.g. gNB) wherein separate functions such as RAN Compute CF (for control) and RAN Compute SF (service) support the computation request and respond with corresponding message.

Example 2 may include the method of example 1 or some other example herein, wherein the UE in RRC_CONNECTED establishes end to end RAN Compute session (by sending a newly defined message and corresponding parameters including at least the UE ID and the RAN compute session ID and app information) based on applications supported by the UE requiring compute offloads to pre-establish the necessary resources (bearers, tunnels) with the network.

Example 3 may include the method of example 1 or some other example herein, wherein the compute context is kept at RAN Compute control function or the gNB CU CP as part of the UE context.

Example 4 may include the method of example 1 or some other example herein, wherein the UE can use a compute specific ID to associate to the compute context and compute request messages.

Example 5 may include the method of example 2 or some other example herein, wherein the compute specific bearers are established for exchanging compute related signaling messages and data between UE and the RAN node.

Example 6 may include the method of example 2 or some other example herein, wherein a tunnel or pipe is established between RAN node and the Compute function for transfer of the compute signalling and data.

Example 7 may include the method of example 1 and example 2 or some other example herein, wherein a UE in RRC_INACTIVE sends compute specific request while sending resume request or equivalent message to only transmit compute specific data so corresponding bearers can be resumed.

Example 8 may include the method of example 1 or some other example herein, wherein the UE sends compute message along with necessary parameters such as but not limited to MAC-I, security context function ID, compute slice ID, UE-requested Compute SF ID and BSR to the RAN node while in RRC_INACTIVE or RRC_CONNECTED state.

Example 9 may include the method of example 8 or some other example herein, wherein the RAN node (e.g. gNB) decrypts the request upon receiving the security context for the specific UE ID from the context function or core network.

Example 10 may include the method of examples 8 and 9 or some other example herein, wherein the RAN node forwards the compute request message to the RAN Comp Control Function which selects a service function to perform the computation.

Example 11 may include the method of example 10 or some other example herein, wherein the RAN Comp CF accepts the request and processes the compute message and returns a response accordingly.

Example 12 includes a method comprising:
receiving a radio area network (RAN) computing ("compute") setup request message that includes service request details associated with a requested compute application or task for a user equipment (UE);
selecting, based on the service request details, a RAN compute service function (Comp SF); and
establishing a compute context with the selected RAN Comp SF.

Example 13 includes the method of example 12 or some other example herein, wherein the RAN compute setup request message is received from a control unit-control plane (CU-CP) function.

Example 14 includes the method of example 13 or some other example herein, further comprising retrieving information regarding a pre-existing compute context for the UE from the CU-CP.

Example 15 includes the method of example 12 or some other example herein, wherein establishing the compute context with the selected RAN Comp SF includes providing at least a portion of the service request details to the selected RAN Comp SF.

Example 16 includes the method of example 12 or some other example herein, wherein the service request details include: a compute-specific identifier for the UE, a compute-slice identifier, compute-slice application information, a UE requested Comp SF identifier, a RAN compute session identifier, or a requested quality of service (QoS) requirement.

Example 17 includes the method of example 12 or some other example herein, further comprising encoding a response message for transmission to a next-generation NodeB (gNB) that indicates an indication of the establishment of the compute context.

Example 18 includes the method of example 17 or some other example herein, wherein the response message includes an indication of: an identifier for the UE, a Comp SF tunnel identifier, a RAN compute session identifier, a task identifier, or QoS information.

Example 19 includes the method of any of examples 12-18 or some other example herein, wherein the method is performed by a RAN compute control function (Comp CF) or portion thereof.

Example A01 includes a Comp CC at a UE side to enable the UE to request for dynamic workload migration to the RAN to offload a compute task; Comp CC also generates and manages the information related to dynamic workload migration, such as identifiers, description and status of the compute task; metadata for the requirements of a compute task; and/or metadata about how to handle the compute task at the network.

Example A02 includes a Comp CF in the RAN to interact with Comp CC at the UE side and other RAN functions to: accept a compute task to be offloaded to the RAN based on information such as RAN compute resource status, channel conditions, compute rules and policies; select a Comp SF to handle the compute task; generate and manage computing context information in CU and DU for appropriate routing; and generate and manage computing context information in Comp SF to handle the compute task.

Example A03 includes a Comp SF in the RAN to interact with Comp CF and other RAN functions to: report a compute task's status; and generate charging related information for offloading a compute task.

Example A04 includes the example of examples A01-A03 and/or some other example(s) herein, wherein interaction and message flow to enable dynamic workload migration in 5G networks.

Example A05 includes the example of examples A01-A04 and/or some other example(s) herein, wherein the interaction and message flow to enable dynamic workload migration in 6G networks.

Example A06 includes the example of examples A01-A05 and/or some other example(s) herein, wherein the RAN split architecture with Comp CF and Comp SF interfacing with DU, CU-CP, CU-UP.

Example A07 includes the example of examples A01-A06 and/or some other example(s) herein, wherein the overall flow chart to enable dynamic workload migration based on the RAN architecture with Comp CC, Comp CF and Comp SF.

Example B01 includes a method comprising: receiving, by a Radio Access Network (RAN) computing control function (Comp CF), a subscription request from a user equipment (UE), the subscription request is for subscribing to a RAN compute as a service (CaaS) for augmented computing.

Example B02 includes the method of example B01 and/or some other example(s) herein, wherein the subscription request includes subscription information, the subscription information including one or more of how much computing resource or special HW/SW capabilities that the UE can request.

Example B03 includes the method of examples B01-B02 and/or some other example(s) herein, wherein upon registration, the UE obtains service authorization and set up security related information from an Access and Mobility Management Function (AMF) to use the RAN CaaS if the UE has service subscription of the RAN CaaS.

Example B04 includes the method of example B03 and/or some other example(s) herein, wherein the related context information can be transferred to appropriate entities (e.g., one or more CU-CPs and CU-UPs.

Example B05 includes the method of example B04 and/or some other example(s) herein, wherein the UE enters an RRC inactive state after obtaining the indication for allowing RAN Comp services.

Example B06 includes the method of examples B01-B05 and/or some other example(s) herein, wherein the UE obtains information about RAN Comp status and capability.

Example B07 includes the method of example B06 and/or some other example(s) herein, wherein the RAN Comp status and capability is indicated by an on-demand SIB.

Example B08 includes the method of example B07 and/or some other example(s) herein, wherein the on-demand SIB is a special SIB defined to include compute related information (e.g., workload).

Example B09 includes the method of examples B01-B08 and/or some other example(s) herein, wherein the UE resumes an RRC connection for entering RRC-Connected state and requests dynamic workload offloading to the RAN CaaS.

Example B10 includes the method of example B09 and/or some other example(s) herein, wherein the request for workload offloading is carried by RRC message as information elements (IEs) over existing SRB or newly defined signalling radio bearer for compute.

Example B11 includes the method of examples B09-B10 and/or some other example(s) herein, wherein the request for workload offloading is carried over an existing DRB or newly defined compute specific data radio bearer.

Example B12 includes the method of examples B09-B11 and/or some other example(s) herein, wherein the request for workload offloading is embedded into L2 messages, e.g., in the MAC CE BSR-like to indicate the requested compute resource and requirements.

Example B13 includes the method of examples B09-B12 and/or some other example(s) herein, wherein the request for workload offloading is carried by new protocol to include the information about compute task requirements.

Example B14 includes the method of examples B09-B13 and/or some other example(s) herein, wherein the request for workload offloading includes information about UE identity, compute task identifiers like type, and special requirements about the compute task.

Example B15 includes the method of examples B09-B14 and/or some other example(s) herein, further comprising: receiving the request for workload offloading from the UE via a DU and/or CU-CP.

Example B16 includes the method of examples B09-B15 and/or some other example(s) herein, wherein the AMF is to select the Comp CF based on compute task related information included in the request for workload offloading and/or the request for RAN CaaS if there are more than one Comp CF.

Example B17 includes the method of examples B09-B16 and/or some other example(s) herein, wherein the Comp CF selection is further based on different network slices, compute service classes, workloads of different Comp CFs, and/or other like parameters.

Example B18 includes the method of examples B09-B17 and/or some other example(s) herein, further comprising: receiving the request for RAN CaaS from the AMF; and determining whether to accept a compute task based on rules and/or policies in the Comp CF and information about RAN comp client status.

Example B19 includes the method of examples B09-B18 and/or some other example(s) herein, further comprising: interacting, by the Comp CF, with an OAM for compute resource management, compute offloading rule and policy configuration, and the like.

Example B20 includes the method of example B19 and/or some other example(s) herein, further comprising: receiving, by the Comp CF, updates about RAN compute resource less frequently than a request is handled.

Example B21 includes the method of example B20 and/or some other example(s) herein, further comprising: determining, by the Comp CF, whether to accept the compute task based on RAN Comp CF compute capabilities for compute service orchestration, scheduling, management, and/or configuration.

Example B22 includes the method of example B21 and/or some other example(s) herein, further comprising: selecting, by the Comp CF after acceptance of the compute task, a Comp SF to handle the UE's compute task.

Example B23 includes the method of example B22 and/or some other example(s) herein, further comprising: creating, by the Comp CF, task handling rules about the compute task in the selected Comp SF; and sending information such as task ID, status, and task handling rules to the selected Comp SF.

Example B24 includes the method of examples B22-B23 and/or some other example(s) herein, further comprising: updating, by the Comp CF, a compute context information in one or more communication functions including a CU-CP and a CU-UP to enable correct routing for compute data.

Example B25 includes the method of example B24 and/or some other example(s) herein, further comprising: sending, by the Comp CF, the identifiers of a compute task, a compute session, or Comp CF/SF to the Comp SF.

Example B26 includes the method of examples B01-B25, and/or some other example(s) herein, wherein the method is performed by one or more cloud compute clusters providing cloud RAN services, or by one or more edge compute nodes co-located with at least one RAN or RAN node.

Example X1 includes an apparatus of a computing control function (Comp CF) comprising:
  memory to store rules and policy information for the Comp CF; and
  processing circuitry, coupled with the memory, to:
    receive, from a user equipment (UE), a request for a radio access network (RAN) computing service;
    determine, based on the request the RAN computing service and the policy information, whether to accept a compute task associated with the request for the RAN computing service; and
    encode a response message for transmission to the UE that includes an indication of whether the compute task associated with the request for the RAN computing service is accepted.

Example X2 includes the apparatus of example X1 or some other example herein, wherein to determine whether to accept the compute task associated with the request for the RAN computing service is further based on status information for a RAN computing client.

Example X3 includes the apparatus of example X1 or some other example herein, wherein to determine whether to accept the compute task associated with the request for the RAN computing service is further based on information from an operations administration and management (OAM) function that includes compute resource management information, or compute offloading rule and policy configuration information.

Example X4 includes the apparatus of example X1 or some other example herein, wherein to determine whether to accept the compute task associated with the request for the RAN computing service includes to accept the compute task and to select a computing service function (Comp SF) to handle the compute task.

Example X5 includes the apparatus of example X1 or some other example herein, wherein to determine whether to accept the compute task associated with the request for the RAN computing service includes to accept the compute task and to update compute context information in one or more communication functions.

Example X6 includes the apparatus of any of examples X1-X5, wherein the request for the RAN computing service includes identification information for the UE, an identification of an application, a description of the compute task, or a compute task identifier.

Example X7 includes one or more computer-readable media storing instructions that, when executed by one or more processors, cause a user equipment (UE) to:
  subscribe to a radio access network (RAN) compute as a service (CaaS) for augmented computing;
  encode, for transmission to a computing control function (Comp CF), a request for a RAN computing service that includes identification information for the UE, a compute task identifier, an identification of an application, a description of the compute task; and
  receive, from the Comp CF, a response message that includes an indication of whether a compute task associated with the request for the RAN computing service is accepted.

Example X8 includes the one or more computer-readable media of example X7 or some other example herein, wherein to subscribe to the RAN CaaS for augmented computing is to receive subscription information that includes a quantity of computing resources, hardware capabilities, or software capabilities the UE is permitted to request.

Example X9 includes the one or more computer-readable media of example X7 or some other example herein, wherein to subscribe to the RAN CaaS for augmented computing is to register with a RAN computing service, and receive service authorization and security information to use the RAN computing service.

Example X10 includes the one or more computer-readable media of example X9 or some other example herein, wherein the media further stores instructions to cause the UE to receive dynamic information regarding the RAN computing service and capability.

Example X11 includes the one or more computer-readable media of example X7 or some other example herein, wherein the response message includes an indication that the compute task associated with the request for the RAN computing service is accepted, and the media further stores instructions for causing the UE to provide data associated with the compute task to a computing service function (Comp SF) to handle the compute task.

Example X12 includes one or more computer-readable media storing instructions that, when executed by one or more processors, cause a user equipment (UE) to:
  encode a radio resource control (RRC) message for transmission to a next-generation NodeB (gNB) that includes an RRC radio access network (RAN) compute setup request including UE compute-specific identification (ID) information and an encapsulated message to be transported onto an interface between a RAN computing control function (Comp CF) and a central unit control plane (CU-CP); and receive, from the Comp CF, a RAN compute session establishment response.

Example X13 includes the one or more computer-readable media of example X12 or some other example herein, wherein the encapsulated message includes an indication of: a UE ID, compute-slice identification or application information, a UE-requested computing service function (Comp SF) ID, or a RAN compute session ID.

Example X14 includes the one or more computer-readable media of example X12 or some other example herein, wherein the RAN compute session establishment response includes an indication of: a Comp SF tunnel ID, a RAN compute session ID, or quality of service (QoS) information.

Example X15 includes the one or more computer-readable media of example X12 or some other example herein, wherein the media further stores instructions for causing the UE to encode an RRC reconfiguration complete message for transmission to the gNB that includes an indication of a successful set up of a compute specific data radio bearer.

Example X16 includes the one or more computer-readable media of example X12 or some other example herein, wherein the media further stores instructions to cause the UE to encode an uplink compute message for transmission to the gNB.

Example X17 includes the one or more computer-readable media of any of examples X12-X16, wherein the UE is in an RRC_CONNECTED mode.

Example X18 includes one or more computer-readable media storing instructions that, when executed by one or more processors, cause a computing control function (Comp CF) to:

receive, from a next-generation NodeB (gNB), a radio access network (RAN) compute session establishment request including a user equipment (UE) identifier (ID), a compute slice ID, application information, a UE-requested computing service function (Comp SF) ID, or a RAN compute session ID;

select a Comp SF based on the RAN compute session establishment request;

establish a RAN compute session with the selected Comp SF; and encode a RAN compute session establishment response for transmission to the gNB.

Example X19 includes the one or more computer-readable media of example X18 or some other example herein, wherein the RAN compute session establishment response includes an indication of: a Comp SF tunnel ID, a RAN compute session ID, or quality of service (QoS) information.

Example X20 includes the one or more computer-readable media of example X18 or some other example herein, wherein the RAN compute session establishment response includes an indication of a UE-generated task ID.

Example X21 includes the one or more computer-readable media of example X18 or some other example herein, wherein the RAN compute session establishment response includes an indication of tunnel information for forwarding uplink (UL) compute messages and routing downlink (DL) compute-related responses.

Example Z01 may include an apparatus comprising means to perform one or more elements of a method described in or related to any of examples 1-X21, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X21, or any other method or process described herein.

Example Z03 may include an apparatus comprising logic, modules, or circuitry to perform one or more elements of a method described in or related to any of examples 1-X21, or any other method or process described herein.

Example Z04 may include a method, technique, or process as described in or related to any of examples 1-X21, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X21, or portions thereof.

Example Z06 may include a signal as described in or related to any of examples 1-X21, or portions or parts thereof.

Example Z07 may include a datagram, packet, frame, segment, protocol data unit (PDU), or message as described in or related to any of examples 1-X21, or portions or parts thereof, or otherwise described in the present disclosure.

Example Z08 may include a signal encoded with data as described in or related to any of examples 1-X21, or portions or parts thereof, or otherwise described in the present disclosure.

Example Z09 may include a signal encoded with a datagram, packet, frame, segment, protocol data unit (PDU), or message as described in or related to any of examples 1-X21, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X21, or portions thereof.

Example Z11 may include a computer program comprising instructions, wherein execution of the program by a processing element is to cause the processing element to carry out the method, techniques, or process as described in or related to any of examples 1-X21, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

An example implementation is an edge computing system, including respective edge processing devices and nodes to invoke or perform the operations of examples A01-A07, B01-B26, or other subject matter described herein.

Another example implementation is a client endpoint node, operable to invoke or perform the operations of examples A01-A07, B01-B26, or other subject matter described herein. Another example implementation is an aggregation node, network hub node, gateway node, or core data processing node, within or coupled to an edge computing system, operable to invoke or perform the operations of examples A01-A07, B01-B26, or other subject matter described herein. Another example implementation is an access point, base station, road-side unit, street-side unit, or on-premise unit, within or coupled to an edge computing system, operable to invoke or perform the operations of examples A01-A07, B01-B26, or other subject matter described herein. Another example implementation is an edge provisioning node, service orchestration node, application orchestration node, or multi-tenant management node, within or coupled to an edge computing system, operable to invoke or perform the operations of examples A01-A07, B01-B26, or other subject matter described herein. Another example implementation is an edge node operating an edge provisioning service, application or service orchestration service, virtual machine deployment, container deployment, function deployment, and compute management, within or coupled to an edge computing system, operable to invoke or perform the operations of examples A01-A07, B01-B26, or other subject matter described herein. Another example implementation is an edge computing system operable as an edge mesh, as an edge mesh with side car loading, or with mesh-to-mesh communications, operable to invoke or perform the operations of examples A01-A07, B01-B26, or other subject matter described herein. Another example implementation is an edge computing system including aspects of network functions, acceleration functions, acceleration hardware, storage hardware, or computation hardware resources, operable to invoke or perform the use cases discussed herein, with use of examples A01-A07, B01-B26, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of examples A01-A07, B01-B26, or other subject matter described herein. Another example implementation is an edge computing system adapted for mobile wireless communications, including configurations according to an 3GPP 4G/LTE or 5G network capabilities, operable to invoke or perform the use cases discussed herein, with use of examples A01-A07, B01-B26, or other subject matter described herein. Another example implementation is a computing system adapted for network communications, including configurations according to an O-RAN capabilities, operable to invoke or perform the use cases discussed herein, with use of examples A01-A07, B01-B26, or other subject matter described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Furthermore, any of the disclosed embodiments and example implementations can be embodied in the form of various types of hardware, software, firmware, middleware, or combinations thereof, including in the form of control logic, and using such hardware or software in a modular or integrated manner. Additionally, any of the software components or functions described herein can be implemented as software, program code, script, instructions, etc., operable to be executed by processor circuitry. These components, functions, programs, etc., can be developed using any suitable computer language such as, for example, Python, PyTorch, NumPy, Ruby, Ruby on Rails, Scala, Smalltalk, Java™, C++, C#, "C", Kotlin, Swift, Rust, Go (or "Golang"), EMCAScript, JavaScript, TypeScript, Jscript, ActionScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), extensible HTML (XHTML), Extensible Markup Language (XML), XML User Interface Language (XUL), Scalable Vector Graphics (SVG), RESTful API Modeling Language (RAML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™, Rholang, Michelson, Counterfactual, Plasma, Plutus, Sophia, Salesforce® Apex®, and/or any other programming language or development tools including proprietary programming languages and/or development tools. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AM | Acknowledged Mode |
| | AMBR Aggregate Maximum Bit Rate |

| | | |
|---|---|---|
| AMF | Access and Mobility Management Function | |
| AN | Access Network | |
| ANR | Automatic Neighbour Relation | |
| AP | Application Protocol, Antenna Port, Access Point | |
| API | Application Programming Interface | |
| APN | Access Point Name | |
| ARP | Allocation and Retention Priority | |
| ARQ | Automatic Repeat Request | |
| AS | Access Stratum | |
| ASN.1 | Abstract Syntax Notation One | |
| AUSF | Authentication Server Function | |
| AWGN | Additive White Gaussian Noise | |
| BAP | Backhaul Adaptation Protocol | |
| BCH | Broadcast Channel | |
| BER | Bit Error Ratio | |
| BFD | Beam Failure Detection | |
| BLER | Block Error Rate | |
| BPSK | Binary Phase Shift Keying | |
| BRAS | Broadband Remote Access Server | |
| BSS | Business Support System | |
| BS | Base Station | |
| BSR | Buffer Status Report | |
| BW | Bandwidth | |
| BWP | Bandwidth Part | |
| C-RNTI | Cell Radio Network Temporary Identity | |
| CA | Carrier Aggregation, Certification Authority | |
| CAPEX | CAPital EXpenditure | |
| CBRA | Contention Based Random Access | |
| CC | Component Carrier, Country Code, Cryptographic Checksum | |
| CCA | Clear Channel Assessment | |
| CCE | Control Channel Element | |
| CCCH | Common Control Channel | |
| CE | Coverage Enhancement | |
| CDM | Content Delivery Network | |
| CDMA | Code-Division Multiple Access | |
| CFRA | Contention Free Random Access | |
| CG | Cell Group | |
| CI | Cell Identity | |
| CID | Cell-ID (e.g., positioning method) | |
| CIM | Common Information Model | |
| CIR | Carrier to Interference Ratio | |
| CK | Cipher Key | |
| CM | Connection Management, Conditional Mandatory | |
| CMAS | Commercial Mobile Alert Service | |
| CMD | Command | |
| CMS | Cloud Management System | |
| CO | Conditional Optional | |
| CoMP | Coordinated Multi-Point | |
| CORESET | Control Resource Set | |
| COTS | Commercial Off-The-Shelf | |
| CP | Control Plane, Cyclic Prefix, Connection Point | |
| CPD | Connection Point Descriptor | |
| CPE | Customer Premise Equipment | |
| | CPICHCommon Pilot Channel | |
| CQI | Channel Quality Indicator | |
| CPU | CSI processing unit, Central Processing Unit | |
| C/R | Command/Response field bit | |
| CRAN | Cloud Radio Access Network, Cloud RAN | |
| CRB | Common Resource Block | |
| CRC | Cyclic Redundancy Check | |
| CRI | Channel-State Information Resource CSI-RS Resource Indicator | |
| C-RNTI | Cell RNTI | |
| CS | Circuit Switched | |
| CSAR | Cloud Service Archive | |
| CSI | Channel-State Information | |
| CSI-IM | CSI Interference Measurement | |
| CSI-RS | CSI Reference Signal | |
| CSI-RSRP | CSI reference signal received power | |
| CSI-RSRQ | CSI reference signal received quality | |
| CSI-SINR | CSI signal-to-noise and interference ratio | |
| CSMA | Carrier Sense Multiple Access | |
| CSMA/CA | CSMA with collision avoidance | |
| CSS | Common Search Space, Cell-specific Search Space | |
| CTS | Clear-to-Send | |
| CW | Codeword | |
| CWS | Contention Window Size | |

| | | |
|---|---|---|
| D2D | Device-to-Device | |
| DC | Dual Connectivity, Direct Current | |
| DCI | Downlink Control Information | |
| DF | Deployment Flavour | |
| DL | Downlink | |
| DMTF | Distributed Management Task Force | |
| DPDK | Data Plane Development Kit | |
| DM-RS, DMRS | Demodulation Reference Signal | |
| DN | Data network | |
| DRB | Data Radio Bearer | |
| DRS | Discovery Reference Signal | |
| DRX | Discontinuous Reception | |
| DSL | Domain Specific Language. Digital Subscriber Line | |
| DSLAM | DSL Access Multiplexer | |
| DwPTS | Downlink Pilot Time Slot | |
| E-LAN | Ethernet Local Area Network | |
| E2E | End-to-End | |
| ECCA | extended clear channel assessment, extended CCA | |
| ECCE | Enhanced Control Channel Element, Enhanced CCE | |
| ED | Energy Detection | |
| EDGE | Enhanced Datarates for GSM Evolution (GSM Evolution) | |
| EGMF | Exposure Governance Management Function | |
| EGPRS | Enhanced GPRS | |
| EIR | Equipment Identity Register | |
| eLAA | enhanced Licensed Assisted Access, enhanced LAA | |
| EM | Element Manager | |
| eMBB | Enhanced Mobile Broadband | |
| EMS | Element Management System | |
| eNB | evolved NodeB, E-UTRAN Node B EN-DC E-UTRA-NR Dual Connectivity | |
| EPC | Evolved Packet Core | |
| EPDCCH | enhanced PDCCH, enhanced Physical Downlink Control Cannel | |
| EPRE | Energy per resource element | |
| EPS | Evolved Packet System | |
| EREG | enhanced REG, enhanced resource element groups | |
| ETSI | European Telecommunications Standards Institute | |
| ETWS | Earthquake and Tsunami Warning System | |
| eUICC | embedded UICC, embedded Universal Integrated Circuit Card | |
| E-UTRA | Evolved UTRA | |
| E-UTRAN | Evolved UTRAN | |
| EV2X | Enhanced V2X | |
| F1AP | F1 Application Protocol | |
| F1-C | F1 Control plane interface | |
| F1-U | F1 User plane interface | |
| FACCH | Fast Associated Control CHannel | |
| FACCH/F | Fast Associated Control Channel/Full rate | |
| FACCH/H | Fast Associated Control Channel/Half rate | |
| FACH | Forward Access Channel | |
| FAUSCH | Fast Uplink Signalling Channel | |
| FB | Functional Block | |
| FBI | Feedback Information | |
| FCC | Federal Communications Commission | |
| FCCH | Frequency Correction CHannel | |
| FDD | Frequency Division Evolved Duplex | |
| FDM | Frequency Division Evolved Multiplex | |
| FDMA | Frequency Division Multiple Access | |
| FE | Front End | |
| FEC | Forward Error Correction | |
| FFS | For Further Study | |
| FFT | Fast Fourier Transformation | |
| feLAA | further enhanced Licensed Assisted Access, further enhanced LAA | |
| FN | Frame Number | |
| FPGA | Field-Programmable Gate Array | |
| FR | Frequency Range | |
| G-RNTI | GERAN Radio Network Temporary Identity | |
| GERAN | GSM EDGE RAN, GSM EDGE Radio Access Network | |
| GGSN | Gateway GPRS Support Node | |
| GLONASS | GLObal'naya NAvigatsionnaya Sputnikovaya Sistema (Engl.: Global Navigation Satellite System) | |
| gNB | Next Generation NodeB | |

| | | |
|---|---|---|
| gNB-CU | gNB-centralized unit, Next Generation NodeB centralized unit | |
| gNB-DU | gNB-distributed unit, Next Generation NodeB distributed unit | |
| GNSS | Global Navigation Satellite System | |
| GPRS | General Packet Radio Service | |
| GSM | Global System for Mobile Communications, Groupe Spécial Mobile | |
| GTP | GPRS Tunneling Protocol | |
| GTP-UGPRS | Tunnelling Protocol for User Plane | |
| GTS | Go To Sleep Signal (related to WUS) | |
| GUMMEI | Globally Unique MME Identifier | |
| GUTI | Globally Unique Temporary UE Identity | |
| HARQ | Hybrid ARQ, Hybrid Automatic Repeat Request | |
| HANDO | Handover | |
| HFN | HyperFrame Number | |
| HHO | Hard Handover | |
| HLR | Home Location Register | |
| HN | Home Network | |
| HO | Handover | |
| HPLMN | Home Public Land Mobile Network | |
| HSDPA | High Speed Downlink Packet Access | |
| HSN | Hopping Sequence Number | |
| HSPA | High Speed Packet Access | |
| HSS | Home Subscriber Server | |
| HSUPA | High Speed Uplink Packet Access | |
| HTTP | Hyper Text Transfer Protocol | |
| HTTPS | Hyper Text Transfer Protocol Secure (https is http/1.1 over SSL, i.e. port 443) | |
| I-Block | Information Block | |
| ICCID | Integrated Circuit Card Identification | |
| IAB | Integrated Access and Backhaul | |
| ICIC | Inter-Cell Interference Coordination | |
| ID | Identity, identifier | |
| IDFT | Inverse Discrete Fourier Transform | |
| IE | Information element | |
| IBE | In-Band Emission | |
| IEEE | Institute of Electrical and Electronics Engineers | |
| IEI | Information Element Identifier | |
| IEIDL | Information Element Identifier Data Length | |
| IETF | Internet Engineering Task Force | |
| IF | Infrastructure | |
| IM | Interference Measurement, Intermodulation, IP Multimedia | |
| IMC | IMS Credentials | |
| IMEI | International Mobile Equipment Identity | |
| IMGI | International mobile group identity | |
| IMPI | IP Multimedia Private Identity | |
| IMPU | IP Multimedia PUblic identity | |
| IMS | IP Multimedia Subsystem | |
| IMSI | International Mobile Subscriber Identity | |
| IoT | Internet of Things | |
| IP | Internet Protocol Ipsec IP Security, Internet Protocol Security | |
| IP-CAN | IP-Connectivity Access Network | |
| IP-M | IP Multicast | |
| IPv4 | Internet Protocol Version 4 | |
| IPV6 | Internet Protocol Version 6 | |
| IR | Infrared | |
| IS | In Sync | |
| IRP | Integration Reference Point | |
| ISDN | Integrated Services Digital Network | |
| ISIM | IM Services Identity Module | |
| ISO | International Organisation for Standardisation | |
| ISP | Internet Service Provider | |
| IWF | Interworking-Function | |
| I-WLAN | Interworking WLAN Constraint length of the convolutional code, USIM Individual key | |
| kB | Kilobyte (1000 bytes) | |
| kbps | kilo-bits per second | |
| Kc | Ciphering key | |
| Ki | Individual subscriber authentication key | |
| KPI | Key Performance Indicator | |
| KQI | Key Quality Indicator | |
| KSI | Key Set Identifier | |
| ksps | kilo-symbols per second | |
| KVM | Kernel Virtual Machine | |

| | |
|---|---|
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MnS | Management Service |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications mMTCmassive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |

| | | |
|---|---|---|
| NCT | Network Connectivity Topology | |
| NC-JT | Non-Coherent Joint Transmission | |
| NEC | Network Capability Exposure | |
| NE-DC | NR-E-UTRA Dual Connectivity | |
| NEF | Network Exposure Function | |
| NF | Network Function | |
| NFP | Network Forwarding Path | |
| NFPD | Network Forwarding Path Descriptor | |
| NFV | Network Functions Virtualization | |
| NFVI | NFV Infrastructure | |
| NFVO | NFV Orchestrator | |
| NG | Next Generation, Next Gen | |
| NGEN-DC | NG-RAN E-UTRA-NR Dual Connectivity | |
| NM | Network Manager | |
| NMS | Network Management System | |
| N-POP | Network Point of Presence | |
| NMIB, N-MIB | Narrowband MIB | |
| NPBCH | Narrowband Physical Broadcast CHannel | |
| NPDCCH | Narrowband Physical Downlink Control CHannel | |
| NPDSCH | Narrowband Physical Downlink Shared CHannel | |
| NPRACH | Narrowband Physical Random Access CHannel | |
| NPUSCH | Narrowband Physical Uplink Shared CHannel | |
| NPSS | Narrowband Primary Synchronization Signal | |
| NSSS | Narrowband Secondary Synchronization Signal | |
| NR | New Radio, Neighbour Relation | |
| NRF | NF Repository Function | |
| NRS | Narrowband Reference Signal | |
| NS | Network Service | |
| NSA | Non-Standalone operation mode | |
| NSD | Network Service Descriptor | |
| NSR | Network Service Record | |
| NSSAI | Network Slice Selection Assistance Information | |
| S-NNSAI | Single-NSSAI | |
| NSSF | Network Slice Selection Function | |
| NW | Network | |
| NWUS | Narrowband wake-up signal, Narrowband WUS | |
| NZP | Non-Zero Power | |
| O&M | Operation and Maintenance | |
| ODU2 | Optical channel Data Unit-type 2 | |
| OFDM | Orthogonal Frequency Division Multiplexing | |
| OFDMA | Orthogonal Frequency Division Multiple Access | |
| OOB | Out-of-band | |
| OOS | Out of Sync | |
| OPEX | OPerating EXpense | |
| OSI | Other System Information | |
| OSS | Operations Support System | |
| OTA | over-the-air | |
| PAPR | Peak-to-Average Power Ratio | |
| PAR | Peak to Average Ratio | |
| PBCH | Physical Broadcast Channel | |
| PC | Power Control, Personal Computer | |
| PCC | Primary Component Carrier, Primary CC | |
| PCell | Primary Cell | |
| PCI | Physical Cell ID, Physical Cell Identity | |
| PCEF | Policy and Charging Enforcement Function | |
| PCF | Policy Control Function | |
| PCRF | Policy Control and Charging Rules Function | |
| PDCP | Packet Data Convergence Protocol, Packet Data Convergence Protocol layer | |
| PDCCH | Physical Downlink Control Channel | |
| PDCP | Packet Data Convergence Protocol | |
| PDN | Packet Data Network, Public Data Network | |
| PDSCH | Physical Downlink Shared Channel | |
| PDU | Protocol Data Unit | |
| PEI | Permanent Equipment Identifiers | |
| PFD | Packet Flow Description | |
| P-GW | PDN Gateway | |
| PHICH | Physical hybrid-ARQ indicator channel | |
| PHY | Physical layer | |
| PLMN | Public Land Mobile Network | |
| PIN | Personal Identification Number | |
| PM | Performance Measurement | |

| Abbreviation | Expansion |
|---|---|
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSFCH | Physical Sidelink Feedback Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QOS Flow ID, QOS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group REG Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time Rx Reception, Receiving, Receiver |
| S1AP | S1 Application Protocol |

| | | | | |
|---|---|---|---|---|
| S1-MME | S1 for the control plane | | SiP | System in Package |
| S1-U | S1 for the user plane | | SL | Sidelink |
| | | | SLA | Service Level Agreement |
| S-GW | Serving Gateway | | SM | Session Management |
| S-RNTI | SRNC Radio Network Temporary Identity | | SMF | Session Management Function |
| S-TMSI | SAE Temporary Mobile Station Identifier | | SMS | Short Message Service |
| | | | SMSF | SMS Function |
| SA | Standalone operation mode | | SMTC | SSB-based Measurement Timing Configuration |
| SAE | System Architecture Evolution | | SN | Secondary Node, SequenceNumber |
| SAP | Service Access Point | | SoC | System on Chip |
| SAPD | Service Access Point Descriptor | | SON | Self-Organizing Network |
| SAPI | Service Access Point Identifier | | SpCell | Special Cell |
| | | | SP-CSI-RNTI | Semi-Persistent CSI RNTI |
| SCC | Secondary Component Carrier, Secondary CC | | SPS | Semi-Persistent Scheduling |
| SCell | Secondary Cell | | SQN | Sequence number |
| SC-FDMA | Single Carrier Frequency Division Multiple Access | | SR | Scheduling Request |
| | | | SRB | Signalling Radio Bearer |
| SCG | Secondary Cell Group | | SRS | Sounding Reference Signal |
| SCM | Security Context Management | | SS | Synchronization Signal |
| SCS | Subcarrier Spacing | | SSB | SS Block |
| SCTP | Stream Control Transmission Protocol | | SSBRI | SSB Resource Indicator |
| SDAP | Service Data Adaptation Protocol, Service Data Adaptation Protocol layer | | SSC | Session and Service Continuity |
| | | | SS-RSRP | Synchronization Signal based Reference Signal Received Power |
| SDL | Supplementary Downlink | | | |
| SDNF | Structured Data Storage Network Function | | SS-RSRQ | Synchronization Signal based Reference Signal Received Quality |
| SDP | Session Description Protocol | | SS-SINR | Synchronization Signal based Signal to Noise and Interference Ratio |
| SDSF | Structured Data Storage Function | | | |
| SDU | Service Data Unit | | | |
| SEAF | Security Anchor Function | | SSS | Secondary Synchronization Signal |
| SeNB | secondary eNB | | | |
| SEPP | Security Edge Protection Proxy | | SSSG | Search Space Set Group |
| SFI | Slot format indication | | SSSIF | Search Space Set Indicator |
| SFTD | Space-Frequency Time Diversity, SFN and frame timing difference | | SST | Slice/Service Types |
| | | | SU-MIMO | Single User MIMO |
| SFN | System Frame Number or Single Frequency Network | | SUL | Supplementary Uplink |
| | | | TA | Timing Advance, Tracking Area |
| SgNB | Secondary gNB | | | |
| SGSN | Serving GPRS Support Node | | TAC | Tracking Area Code |
| S-GW | Serving Gateway | | TAG | Timing Advance Group |
| | SI System Information | | | |
| SI-RNTI | System Information RNTI | | TAU | Tracking Area Update |
| | | | TB | Transport Block |
| SIB | System Information Block | | TBS | Transport Block Size |
| SIM | Subscriber Identity Module | | TBD | To Be Defined |
| SIP | Session Initiated Protocol | | TCI | Transmission Configuration Indicator |

| | |
|---|---|
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDR | Unified Data Repository |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VOIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | extensible Markup Language |
| XRES | Expected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus of a computing control function (Comp CF) comprising:
   memory to store rules and policy information for the Comp CF; and
   processing circuitry, coupled with the memory, to configure the Comp CF to:
     receive, from a user equipment (UE), a request for a radio access network (RAN) computing service;
     determine, based on the request, the RAN computing service, and the policy information, whether to accept a compute task of the UE associated with the request for the RAN computing service for offload from the UE; and
     encode a response message for transmission to the UE that includes an indication of whether the compute task associated with the request for the RAN computing service is accepted.

2. The apparatus of claim 1, wherein the processing circuitry configures the Comp CF to determine whether to accept the compute task associated with the request for the RAN computing service further based on status information for a RAN computing client.

3. The apparatus of claim 1, wherein the processing circuitry configures the Comp CF to determine whether to accept the compute task associated with the request for the RAN computing service further based on information from an operations administration and management (OAM) function that includes at least one of compute resource management information or compute offloading rule and policy configuration information.

4. The apparatus of claim 1, wherein the processing circuitry configures the Comp CF to select a computing service function (Comp SF) to handle the compute task in response to a determination to accept the compute task.

5. The apparatus of claim 1, wherein the processing circuitry configures the Comp CF to update compute context information in one or more communication functions in response to a determination to accept the compute task.

6. The apparatus of claim 1, wherein the request for the RAN computing service includes at least one of identification information for the UE, an identification of an application, a description of the compute task, or a compute task identifier.

7. One or more non-transitory computer-readable media storing instructions that, when executed by one or more processors, cause a user equipment (UE) to:
   subscribe to a radio access network (RAN) compute as a service (CaaS) for augmented computing;
   encode, for transmission to a computing control function (Comp CF), a request for a RAN computing service that includes identification information for the UE, a compute task identifier, an identification of an application, and a description of a compute task; and
   receive, from the Comp CF in response to the request, a response message that includes an indication of whether the compute task of the UE associated with the request for the RAN computing service is accepted for offload from the UE.

8. The one or more non-transitory computer-readable media of claim 7, wherein the instructions, when executed by one or more processors, cause the UE to subscribe to the RAN CaaS for augmented computing based on received subscription information that includes at least one of a quantity of computing resources, hardware capabilities, or software capabilities that the UE is permitted to request.

9. The one or more non-transitory computer-readable media of claim 7, wherein the instructions, when executed by one or more processors, cause the UE to subscribe to the RAN CaaS for augmented computing via registration with a RAN computing service, and reception of service authorization and security information to use the RAN computing service.

10. The one or more non-transitory computer-readable media of claim 9, wherein the media further stores instructions to cause the UE to receive dynamic information regarding the RAN computing service and capability.

11. The one or more non-transitory computer-readable media of claim 7, wherein the response message includes an indication that the compute task associated with the request for the RAN computing service is accepted, and the media further stores instructions for causing the UE to, in response to reception of the response message, provide data associated with the compute task to a computing service function (Comp SF) to handle the compute task.

12. One or more non-transitory computer-readable media storing instructions that, when executed by one or more processors, cause a user equipment (UE) to:
   encode a radio resource control (RRC) message for transmission to a next-generation NodeB (gNB) that includes an RRC radio access network (RAN) compute setup request including UE compute-specific identification (ID) information and an encapsulated message to be transported onto an interface between a RAN computing control function (Comp CF) and a central unit control plane (CU-CP); and receive, from the Comp CF in response to the RRC message, a RAN compute session establishment response.

13. The one or more non-transitory computer-readable media of claim 12, wherein the encapsulated message includes an indication of at least one of: a UE ID, compute-slice identification or application information, a UE-requested computing service function (Comp SF) ID, or a RAN compute session ID.

14. The one or more non-transitory computer-readable media of claim 12, wherein the RAN compute session establishment response includes an indication of at least one of: a Comp SF tunnel ID, a RAN compute session ID, or quality of service (QoS) information.

15. The one or more non-transitory computer-readable media of claim 12, wherein the media further stores instructions for causing the UE to encode an RRC reconfiguration complete message for transmission to the gNB, the RRC reconfiguration complete message including an indication of a successful set up of a compute specific data radio bearer.

16. The one or more non-transitory computer-readable media of claim 12, wherein the media further stores instructions to cause the UE to encode an uplink compute message for transmission to the gNB in response to reception of the RAN compute session establishment response.

17. The one or more non-transitory computer-readable media of claim 12, wherein the UE is in an RRC_CONNECTED mode during establishment of a RAN compute session, which includes transmission of the RRC message and reception of the RAN compute session establishment response.

18. One or more non-transitory computer-readable media storing instructions that, when executed by one or more processors, cause a computing control function (Comp CF) to:

receive, from a next-generation NodeB (gNB), a radio access network (RAN) compute session establishment request including at least one of a user equipment (UE) identifier (ID), a compute slice ID, application information, a UE-requested computing service function (Comp SF) ID, or a RAN compute session ID;

select a Comp SF based on the RAN compute session establishment request;

establish a RAN compute session with the selected Comp SF; and encode a RAN compute session establishment response for transmission to the gNB after establishment of the RAN compute session.

19. The one or more non-transitory computer-readable media of claim 18, wherein the RAN compute session establishment response includes an indication of at least one of: a Comp SF tunnel ID, a RAN compute session ID, or quality of service (QoS) information.

20. The one or more non-transitory computer-readable media of claim 18, wherein the RAN compute session establishment response includes an indication of a UE-generated task ID.

21. The one or more non-transitory computer-readable media of claim 18, wherein the RAN compute session establishment response includes an indication of tunnel information for forwarding uplink (UL) compute messages and routing downlink (DL) compute-related responses.

* * * * *